US012205483B1

(12) United States Patent
Cao et al.

(10) Patent No.: US 12,205,483 B1
(45) Date of Patent: Jan. 21, 2025

(54) SELECTING PATHS FOR INDOOR OBSTACLE AVOIDANCE BY UNMANNED AERIAL VEHICLES

(71) Applicant: Amazon Technologies, Inc., Seattle, WA (US)

(72) Inventors: Yibo Cao, Beijing (CN); Chong Huang, Goleta, CA (US); Dawei Li, San Jose, CA (US); Yang Liu, Saratoga, CA (US); Kah Kuen Fu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/341,312

(22) Filed: Jun. 26, 2023

(51) Int. Cl.
  *G08G 5/00* (2006.01)
  *B64U 10/13* (2023.01)
  *B64U 101/70* (2023.01)

(52) U.S. Cl.
  CPC .......... *G08G 5/0069* (2013.01); *B64U 10/13* (2023.01); *G08G 5/0078* (2013.01); *B64U 2101/70* (2023.01)

(58) Field of Classification Search
  CPC .... G08G 5/0069; G08G 5/0078; B64U 10/13; B64U 2101/70; G05D 1/0088; G05D 1/622; G05D 1/617; G05D 1/0238; G05D 1/0289
  See application file for complete search history.

(56) References Cited

U.S. PATENT DOCUMENTS

| | | | | |
|---|---|---|---|---|
| 3,417,729 A | * | 12/1968 | Gilday | B64C 27/006 416/61 |
| 3,575,527 A | * | 4/1971 | Watanabe | F04D 29/052 416/169 R |
| 3,805,723 A | * | 4/1974 | Bernaerts | B63H 3/002 416/61 |

(Continued)

FOREIGN PATENT DOCUMENTS

| | | |
|---|---|---|
| CN | 101385059 A | 3/2009 |
| CN | 103224026 A | 7/2013 |
| CN | 203039518 U | 7/2013 |
| CN | 103365297 A | 10/2013 |

(Continued)

OTHER PUBLICATIONS

Bullock et al., "Analysis of the Use of Digital Road Maps in Vehicle Navigation," 1994, IEEE, p. 494-501 (Year: 1994).

(Continued)

*Primary Examiner* — Medhat Badawi
(74) *Attorney, Agent, or Firm* — Athorus, PLLC

(57) ABSTRACT

An aerial vehicle is configured to calculate ranges to objects around the aerial vehicle when operating within indoor spaces, using a LIDAR sensor or another range sensor. The aerial vehicle calculates ranges within a plurality of sectors around the aerial vehicle and identifies a minimum distance measurement for each of the sectors. Sets of adjacent sectors having distance measurements above a threshold are identified, and bearings and minimum distance measurements of the sets of adjacent sectors are determined. When the aerial vehicle detects an object within a flight path, the aerial vehicle selects one of the sets of adjacent sectors based on the minimum distance measurements and executes a braking maneuver in a direction of the selected one of the sets of adjacent sectors.

20 Claims, 21 Drawing Sheets

(56) References Cited

U.S. PATENT DOCUMENTS

| | | | | |
|---|---|---|---|---|
| 4,865,248 A * | 9/1989 | Barth | E05B 35/086 | 312/215 |
| 4,954,962 A * | 9/1990 | Evans, Jr. | G05D 1/0246 | 701/28 |
| 5,040,116 A * | 8/1991 | Evans, Jr. | G05D 1/0246 | 701/28 |
| 5,283,739 A * | 2/1994 | Summerville | G05D 1/0289 | 700/255 |
| 5,371,581 A * | 12/1994 | Wangler | G01S 17/933 | 340/963 |
| 5,386,462 A * | 1/1995 | Schlamp | G07F 11/62 | 379/93.12 |
| 5,452,374 A * | 9/1995 | Cullen | G06T 7/70 | 382/296 |
| 5,497,236 A * | 3/1996 | Wolff | H04N 1/047 | 358/406 |
| 5,731,884 A * | 3/1998 | Inoue | H04N 1/4076 | 358/3.06 |
| 5,847,522 A * | 12/1998 | Barba | H02K 7/1025 | 318/269 |
| 5,901,253 A * | 5/1999 | Tretter | G06T 3/606 | 382/292 |
| 5,995,898 A * | 11/1999 | Tuttle | G07C 5/085 | 427/255.31 |
| 6,031,612 A * | 2/2000 | Shirley | G01B 11/2531 | 356/511 |
| 6,266,577 B1 * | 7/2001 | Popp | B25J 9/1682 | 700/248 |
| 6,344,796 B1 * | 2/2002 | Ogilvie | G07C 9/27 | 340/568.1 |
| 6,374,155 B1 * | 4/2002 | Wallach | G05D 1/0295 | 701/25 |
| 6,426,699 B1 * | 7/2002 | Porter | A47F 10/00 | 340/568.1 |
| 6,507,670 B1 * | 1/2003 | Moed | G06T 5/77 | 382/172 |
| 6,543,983 B1 * | 4/2003 | Felder | B23Q 7/1442 | 414/389 |
| 6,636,781 B1 * | 10/2003 | Shen | B25J 9/065 | 703/2 |
| 6,676,460 B1 * | 1/2004 | Motsenbocker | B63H 5/165 | 440/71 |
| 6,690,997 B2 * | 2/2004 | Rivalto | G06Q 10/08 | 700/242 |
| 6,694,217 B2 * | 2/2004 | Bloom | G07C 9/21 | 700/242 |
| 6,705,523 B1 * | 3/2004 | Stamm | G06Q 10/08 | 235/383 |
| 6,804,607 B1 * | 10/2004 | Wood | G05D 1/1062 | 340/425.5 |
| 6,919,803 B2 * | 7/2005 | Breed | G08B 29/181 | 340/568.1 |
| 6,954,290 B1 * | 10/2005 | Braudaway | H04N 1/00045 | 358/488 |
| 6,961,711 B1 * | 11/2005 | Chee | G07F 7/00 | 705/26.1 |
| 6,965,440 B1 * | 11/2005 | Nakagiri | G06F 3/1262 | 715/251 |
| 6,970,838 B1 * | 11/2005 | Kamath | G06Q 30/0617 | 705/26.81 |
| 7,006,952 B1 * | 2/2006 | Matsumoto | G06F 7/60 | 703/2 |
| 7,016,536 B1 * | 3/2006 | Ling | G06V 30/15 | 382/290 |
| 7,031,519 B2 * | 4/2006 | Elmenhurst | G06F 18/254 | 382/101 |
| 7,129,817 B2 * | 10/2006 | Yamagishi | G07C 9/37 | 340/5.71 |
| 7,133,743 B2 * | 11/2006 | Tilles | G07F 17/13 | 700/242 |
| 7,145,699 B2 * | 12/2006 | Dolan | G06V 30/1478 | 358/452 |
| 7,149,611 B2 * | 12/2006 | Beck | B64U 30/26 | 701/32.4 |
| 7,171,879 B2 * | 2/2007 | Gass | B27G 21/00 | 83/477.1 |
| 7,188,513 B2 * | 3/2007 | Wilson | G01N 1/2226 | 73/864.81 |
| 7,335,071 B1 * | 2/2008 | Motsenbocker | B63H 23/30 | 440/71 |
| 7,337,686 B2 * | 3/2008 | Sagi-Dolev | G01V 11/00 | 73/866 |
| 7,337,944 B2 * | 3/2008 | Devar | A47G 29/16 | 232/19 |
| 7,339,993 B1 * | 3/2008 | Brooks | H04N 21/440281 | 375/240.1 |
| 7,459,880 B1 * | 12/2008 | Rosen | H01M 10/465 | 320/101 |
| 7,639,386 B1 * | 12/2009 | Siegel | G06Q 40/03 | 358/1.18 |
| 7,668,404 B2 * | 2/2010 | Adams | G06V 10/24 | 382/101 |
| 7,673,831 B2 * | 3/2010 | Steele | F42B 12/365 | 244/1 TD |
| 7,685,953 B2 * | 3/2010 | Giles | B63J 99/00 | 114/72 |
| 7,693,745 B1 * | 4/2010 | Pomerantz | G07F 17/13 | 705/26.5 |
| 7,894,939 B2 * | 2/2011 | Zini | G05D 1/028 | 700/245 |
| 7,925,375 B2 * | 4/2011 | Schininger | G07F 11/54 | 700/214 |
| 7,946,526 B2 * | 5/2011 | Zimet | B64U 10/17 | 244/17.23 |
| 7,946,530 B1 * | 5/2011 | Talmage, Jr. | B64C 27/006 | 244/140 |
| 7,966,093 B2 * | 6/2011 | Zhuk | G05D 1/0088 | 706/50 |
| 8,015,023 B1 * | 9/2011 | Lee | G06Q 10/08 | 700/226 |
| 8,078,317 B2 * | 12/2011 | Allinson | G07F 11/62 | 700/242 |
| 8,126,642 B2 * | 2/2012 | Trepagnier | G05D 1/024 | 701/28 |
| 8,131,607 B2 * | 3/2012 | Park | G06Q 10/047 | 705/28 |
| 8,145,351 B2 * | 3/2012 | Schininger | G07F 9/009 | 221/12 |
| 8,195,328 B2 * | 6/2012 | Mallett | G16H 40/67 | 221/102 |
| 8,286,236 B2 * | 10/2012 | Jung | G06Q 50/18 | 713/168 |
| 8,412,588 B1 * | 4/2013 | Bodell | G06Q 30/0643 | 706/919 |
| 8,418,959 B2 * | 4/2013 | Kang | B64U 70/97 | 244/116 |
| 8,429,754 B2 * | 4/2013 | Jung | G06F 21/10 | 726/21 |
| 8,473,189 B2 | 6/2013 | Christoph | | |
| 8,511,606 B1 * | 8/2013 | Lutke | B64U 50/38 | 320/109 |
| 8,577,538 B2 | 11/2013 | Lenser et al. | | |
| 8,599,027 B2 * | 12/2013 | Sanchez | G01S 13/931 | 340/435 |
| 8,602,349 B2 * | 12/2013 | Petrov | G05D 1/0866 | 244/17.23 |
| 8,639,400 B1 * | 1/2014 | Wong | A63H 27/12 | 701/16 |
| 8,736,820 B2 * | 5/2014 | Choe | G05D 1/024 | 356/9 |
| 8,752,166 B2 * | 6/2014 | Jung | B33Y 50/02 | 700/95 |
| 8,791,790 B2 * | 7/2014 | Robertson | G07C 9/20 | 455/411 |
| 8,874,301 B1 * | 10/2014 | Rao | B60K 28/04 | 340/576 |
| 8,899,903 B1 * | 12/2014 | Saad | B65G 67/00 | 320/109 |

(56) References Cited

U.S. PATENT DOCUMENTS

| | | | | |
|---|---|---|---|---|
| 8,948,914 B2* | 2/2015 | Zini | ............... | G05B 19/41895 |
| | | | | 700/258 |
| 8,956,100 B2* | 2/2015 | Davi | ............... | B60P 1/02 |
| | | | | 414/334 |
| 8,989,053 B1* | 3/2015 | Skaaksrud | ............... | H04W 4/80 |
| | | | | 370/255 |
| 9,033,285 B2* | 5/2015 | Iden | ............... | B61C 17/12 |
| | | | | 701/19 |
| 9,051,043 B1* | 6/2015 | Peeters | ............... | G05D 1/102 |
| 9,079,587 B1* | 7/2015 | Rupp | ............... | G05D 1/0289 |
| 9,139,310 B1* | 9/2015 | Wang | ............... | B60L 58/12 |
| 9,163,909 B2* | 10/2015 | Chengalva | ............... | G05D 1/0088 |
| 9,193,452 B2* | 11/2015 | Carreker | ............... | B64C 27/52 |
| 9,195,959 B1* | 11/2015 | Lopez | ............... | G06Q 30/0635 |
| 9,216,587 B2* | 12/2015 | Ando | ............... | B41J 29/38 |
| 9,216,857 B1* | 12/2015 | Kalyan | ............... | G06Q 10/087 |
| 9,230,236 B2 | 1/2016 | Villamar | | |
| 9,235,213 B2* | 1/2016 | Villamar | ............... | G06Q 10/087 |
| 9,244,147 B1* | 1/2016 | Soundararajan | ............... | G01S 1/44 |
| 9,256,852 B1* | 2/2016 | Myllymaki | ............... | B60P 3/007 |
| 9,261,578 B2* | 2/2016 | Im | ............... | G01S 5/02526 |
| 9,321,531 B1* | 4/2016 | Takayama | ............... | B64D 47/06 |
| 9,336,506 B2 | 5/2016 | Shucker et al. | | |
| 9,336,635 B2* | 5/2016 | Robertson | ............... | G07C 9/00571 |
| 9,358,975 B1* | 6/2016 | Watts | ............... | G05D 1/0223 |
| 9,373,149 B2 | 6/2016 | Abhyanker | | |
| 9,381,916 B1* | 7/2016 | Zhu | ............... | B60W 30/0956 |
| 9,397,518 B1* | 7/2016 | Theobald | ............... | B25J 5/005 |
| 9,404,761 B2* | 8/2016 | Meuleau | ............... | G01C 21/3453 |
| 9,409,644 B2* | 8/2016 | Stanek | ............... | G05D 1/0202 |
| 9,411,337 B1* | 8/2016 | Theobald | ............... | G05D 1/0225 |
| 9,412,280 B1* | 8/2016 | Zwillinger | ............... | G05D 1/0676 |
| 9,436,183 B2* | 9/2016 | Thakur | ............... | G01C 21/3407 |
| 9,436,926 B2* | 9/2016 | Cousins | ............... | G05D 1/0246 |
| 9,448,559 B2* | 9/2016 | Kojo | ............... | G08G 1/20 |
| 9,489,490 B1* | 11/2016 | Theobald | ............... | G16H 20/13 |
| 9,510,316 B2 | 11/2016 | Skaaksrud | | |
| 9,535,421 B1* | 1/2017 | Canoso | ............... | G05D 1/0214 |
| 9,545,852 B2* | 1/2017 | Streett | ............... | H02J 7/35 |
| 9,561,941 B1* | 2/2017 | Watts | ............... | G05D 1/0268 |
| 9,568,335 B2* | 2/2017 | Thakur | ............... | G05D 1/0217 |
| 9,582,950 B2* | 2/2017 | Shimizu | ............... | G07C 9/28 |
| 9,600,645 B2* | 3/2017 | Fadell | ............... | H04L 67/12 |
| 9,619,776 B1* | 4/2017 | Ford | ............... | B64U 80/86 |
| 9,623,553 B1 | 4/2017 | Theobald et al. | | |
| 9,623,562 B1* | 4/2017 | Watts | ............... | B25J 13/006 |
| 9,650,136 B1* | 5/2017 | Haskin | ............... | B64U 10/13 |
| 9,652,912 B2* | 5/2017 | Fadell | ............... | G06Q 10/08 |
| 9,656,805 B1* | 5/2017 | Evans | ............... | G05B 19/4182 |
| 9,671,791 B1* | 6/2017 | Paczan | ............... | G05D 1/0088 |
| 9,677,564 B1* | 6/2017 | Woodworth | ............... | B64U 20/30 |
| 9,682,481 B2 | 6/2017 | Lutz et al. | | |
| 9,697,730 B2* | 7/2017 | Thakur | ............... | G08G 1/0112 |
| 9,718,564 B1* | 8/2017 | Beckman | ............... | B61L 23/04 |
| 9,720,414 B1* | 8/2017 | Theobald | ............... | B25J 5/007 |
| 9,731,821 B2* | 8/2017 | Hoareau | ............... | G06Q 10/083 |
| 9,733,646 B1* | 8/2017 | Nusser | ............... | B65G 57/03 |
| 9,746,852 B1* | 8/2017 | Watts | ............... | G01S 17/86 |
| 9,746,853 B2* | 8/2017 | Scheepjens | ............... | G05D 1/0212 |
| 9,778,653 B1* | 10/2017 | McClintock | ............... | G06Q 10/08 |
| 9,786,187 B1* | 10/2017 | Bar-Zeev | ............... | G05D 1/104 |
| 9,796,529 B1* | 10/2017 | Hoareau | ............... | G06Q 10/08 |
| 9,828,092 B1* | 11/2017 | Navot | ............... | G01C 21/20 |
| 9,858,604 B2* | 1/2018 | Apsley | ............... | G06Q 30/0635 |
| 9,886,035 B1* | 2/2018 | Watts | ............... | G05D 1/0088 |
| 9,896,204 B1* | 2/2018 | Willison | ............... | G08G 5/0069 |
| 9,959,771 B1* | 5/2018 | Carlson | ............... | G08G 5/0013 |
| 9,959,773 B2 | 5/2018 | Raptopoulos et al. | | |
| 9,974,612 B2* | 5/2018 | Pinter | ............... | A61B 5/015 |
| 10,022,753 B2* | 7/2018 | Chelian | ............... | B07C 5/362 |
| 10,022,867 B2 | 7/2018 | Saboo et al. | | |
| 10,048,697 B1* | 8/2018 | Theobald | ............... | B65G 47/61 |
| 10,108,185 B1* | 10/2018 | Theobald | ............... | G05B 19/4189 |
| 10,137,984 B1* | 11/2018 | Flick | ............... | G08G 5/0039 |
| 10,558,226 B1* | 2/2020 | Bigdeli | ............... | G06V 10/22 |
| 10,745,132 B1* | 8/2020 | Kimchi | ............... | B64U 10/13 |
| 10,780,988 B2* | 9/2020 | Buchmueller | ............... | F16D 43/00 |
| 10,860,115 B1* | 12/2020 | Tran | ............... | G06F 3/0346 |
| 11,164,149 B1* | 11/2021 | Williams | ............... | G06K 19/06028 |
| 11,619,952 B2* | 4/2023 | Kwon | ............... | G05D 1/0094 |
| | | | | 701/3 |
| 11,628,932 B2* | 4/2023 | Seung | ............... | B64U 30/293 |
| | | | | 244/17.23 |
| 11,649,050 B1* | 5/2023 | Miller | ............... | B64C 39/024 |
| | | | | 701/11 |
| 11,726,184 B2* | 8/2023 | Ferreira | ............... | H04N 25/773 |
| | | | | 356/4.01 |
| D1,008,873 S | 12/2023 | Lin | | |
| 11,851,162 B1 | 12/2023 | Daube et al. | | |
| 11,868,146 B2* | 1/2024 | Yasunaga | ............... | G05D 1/106 |
| 11,933,613 B2* | 3/2024 | Michini | ............... | G08G 5/003 |
| 2001/0045449 A1* | 11/2001 | Shannon | ............... | G07C 9/21 |
| | | | | 232/19 |
| 2002/0016726 A1* | 2/2002 | Ross | ............... | G06Q 10/08 |
| | | | | 705/339 |
| 2002/0035450 A1* | 3/2002 | Thackston | ............... | G05B 19/4099 |
| | | | | 703/1 |
| 2002/0072979 A1* | 6/2002 | Sinha | ............... | G06Q 10/087 |
| | | | | 705/26.7 |
| 2002/0087375 A1* | 7/2002 | Griffin | ............... | G06Q 10/0835 |
| | | | | 705/336 |
| 2002/0107751 A1* | 8/2002 | Rajagopalan | ............... | G06Q 30/0627 |
| | | | | 705/26.7 |
| 2002/0111914 A1* | 8/2002 | Terada | ............... | G06Q 30/02 |
| | | | | 705/60 |
| 2002/0116289 A1* | 8/2002 | Yang | ............... | G06Q 10/08 |
| | | | | 705/26.81 |
| 2002/0123930 A1* | 9/2002 | Boyd | ............... | G06Q 30/0254 |
| | | | | 705/14.1 |
| 2002/0156645 A1* | 10/2002 | Hansen | ............... | G07F 17/13 |
| | | | | 705/26.1 |
| 2003/0040980 A1* | 2/2003 | Nakajima | ............... | G07F 17/13 |
| | | | | 705/26.8 |
| 2003/0072031 A1* | 4/2003 | Kuwata | ............... | H04N 1/00188 |
| | | | | 358/1.15 |
| 2003/0121968 A1* | 7/2003 | Miller | ............... | G07F 17/13 |
| | | | | 235/375 |
| 2003/0141411 A1* | 7/2003 | Pandya | ............... | G06Q 10/02 |
| | | | | 244/114 R |
| 2004/0002898 A1* | 1/2004 | Kuhlmann | ............... | G06Q 30/0635 |
| | | | | 705/26.81 |
| 2004/0068416 A1* | 4/2004 | Solomon | ............... | G05D 1/0088 |
| | | | | 446/454 |
| 2004/0112660 A1* | 6/2004 | Johansson | ............... | B63B 27/19 |
| | | | | 180/167 |
| 2004/0160335 A1* | 8/2004 | Reitmeier | ............... | G06V 40/12 |
| | | | | 340/4.12 |
| 2004/0162638 A1* | 8/2004 | Solomon | ............... | G05D 1/0088 |
| | | | | 700/247 |
| 2004/0257199 A1* | 12/2004 | Fitzgibbon | ............... | G07C 9/00182 |
| | | | | 340/5.71 |
| 2005/0068178 A1* | 3/2005 | Lee | ............... | G06Q 30/06 |
| | | | | 700/214 |
| 2005/0093865 A1* | 5/2005 | Jia | ............... | H04N 1/38 |
| | | | | 345/426 |
| 2005/0102240 A1* | 5/2005 | Misra | ............... | G06Q 30/06 |
| | | | | 705/59 |
| 2005/0244060 A1* | 11/2005 | Nagarajan | ............... | H04N 1/41 |
| | | | | 382/302 |
| 2005/0285934 A1* | 12/2005 | Carter | ............... | H04N 7/147 |
| | | | | 348/14.06 |
| 2006/0053534 A1* | 3/2006 | Mullen | ............... | F41H 7/005 |
| | | | | 2/456 |
| 2006/0118162 A1* | 6/2006 | Saelzer | ............... | H02J 3/38 |
| | | | | 136/246 |
| 2006/0136237 A1* | 6/2006 | Spiegel | ............... | G06Q 10/0835 |
| | | | | 705/13 |
| 2006/0287829 A1* | 12/2006 | Pashko-Paschenko | ............... | |
| | | | | B60Q 9/005 |
| | | | | 340/436 |

(56) References Cited

U.S. PATENT DOCUMENTS

| | | | |
|---|---|---|---|
| 2007/0016496 A1* | 1/2007 | Bar | G06Q 10/087 705/28 |
| 2007/0073552 A1* | 3/2007 | Hileman | G06Q 10/08 705/333 |
| 2007/0102565 A1* | 5/2007 | Speer | B64U 50/14 244/2 |
| 2007/0150375 A1* | 6/2007 | Yang | G06Q 10/08 705/26.81 |
| 2007/0170237 A1* | 7/2007 | Neff | A47G 29/122 232/36 |
| 2007/0210953 A1* | 9/2007 | Abraham | G08G 5/045 342/36 |
| 2007/0233337 A1* | 10/2007 | Plishner | G05D 1/0295 701/23 |
| 2007/0244763 A1* | 10/2007 | Williams | G06Q 10/10 705/26.1 |
| 2007/0246601 A1* | 10/2007 | Layton | B64C 29/0025 244/12.2 |
| 2007/0262195 A1* | 11/2007 | Bulaga | B64C 27/52 244/12.4 |
| 2007/0293978 A1* | 12/2007 | Wurman | G05B 19/4189 700/213 |
| 2008/0012697 A1* | 1/2008 | Smith | B60Q 9/00 340/439 |
| 2008/0027591 A1* | 1/2008 | Lenser | G05D 1/0038 701/28 |
| 2008/0100258 A1* | 5/2008 | Ward | H01M 10/465 320/101 |
| 2008/0109246 A1* | 5/2008 | Russell | G06Q 10/04 414/800 |
| 2008/0111816 A1* | 5/2008 | Abraham | G06Q 30/06 345/420 |
| 2008/0141921 A1* | 6/2008 | Hinderks | B63H 5/125 114/274 |
| 2008/0150679 A1* | 6/2008 | Bloomfield | B60R 25/24 340/5.72 |
| 2008/0154659 A1* | 6/2008 | Bettes | G06Q 10/08 705/7.36 |
| 2008/0167817 A1* | 7/2008 | Hessler | G01C 21/005 701/514 |
| 2008/0184906 A1* | 8/2008 | Kejha | B64D 27/02 102/374 |
| 2008/0189012 A1* | 8/2008 | Kaufmann | B62D 15/025 701/41 |
| 2008/0301009 A1* | 12/2008 | Plaster | G06Q 10/087 705/28 |
| 2009/0027253 A1* | 1/2009 | van Tooren | G08G 5/045 342/29 |
| 2009/0062974 A1* | 3/2009 | Tamamoto | G05D 1/0295 701/25 |
| 2009/0063166 A1* | 3/2009 | Palmer | B65D 19/42 211/133.4 |
| 2009/0079388 A1* | 3/2009 | Reddy | G06Q 40/12 320/109 |
| 2009/0086275 A1* | 4/2009 | Liang | G06V 10/25 358/3.21 |
| 2009/0091435 A1* | 4/2009 | Bolourchi | B60K 28/066 340/575 |
| 2009/0106124 A1* | 4/2009 | Yang | G06Q 30/0601 705/26.1 |
| 2009/0149985 A1* | 6/2009 | Chirnomas | G07F 11/26 705/26.1 |
| 2009/0164379 A1* | 6/2009 | Jung | G06Q 10/06 705/310 |
| 2009/0165127 A1* | 6/2009 | Jung | G06Q 10/06 726/21 |
| 2009/0236470 A1* | 9/2009 | Goossen | B64F 1/04 244/115 |
| 2009/0254457 A1* | 10/2009 | Folsom | G06Q 30/0601 705/26.1 |
| 2009/0254482 A1* | 10/2009 | Vadlamani | G06F 21/10 705/59 |
| 2009/0299903 A1* | 12/2009 | Hung | G06Q 20/40 235/462.11 |
| 2009/0303507 A1* | 12/2009 | Abeloe | B33Y 30/00 358/1.9 |
| 2009/0314883 A1* | 12/2009 | Arlton | B64U 80/40 244/63 |
| 2010/0007479 A1* | 1/2010 | Smith | B60W 50/14 340/576 |
| 2010/0030608 A1* | 2/2010 | Kaminsky | G06Q 10/10 707/E17.014 |
| 2010/0031351 A1* | 2/2010 | Jung | G06F 21/10 700/98 |
| 2010/0088163 A1* | 4/2010 | Davidson | G06Q 10/08 340/425.5 |
| 2010/0088175 A1* | 4/2010 | Lundquist | G06Q 30/0234 705/26.1 |
| 2010/0100269 A1* | 4/2010 | Ekhaguere | G08G 5/0086 701/26 |
| 2010/0169185 A1* | 7/2010 | Cottingham | G06F 3/01 715/708 |
| 2010/0206145 A1* | 8/2010 | Tetelbaum | B27G 19/02 83/13 |
| 2010/0287065 A1* | 11/2010 | Alivandi | G06Q 30/02 705/26.1 |
| 2010/0299067 A1* | 11/2010 | McCollough | G08G 5/04 701/301 |
| 2010/0299222 A1* | 11/2010 | Hamilton, IV | G06Q 20/12 705/26.1 |
| 2011/0035149 A1* | 2/2011 | McAndrew | G08G 5/006 701/466 |
| 2011/0074570 A1* | 3/2011 | Feldstein | G08B 13/196 348/E7.087 |
| 2011/0087350 A1* | 4/2011 | Fogel | G06T 19/00 700/98 |
| 2011/0112761 A1* | 5/2011 | Hurley | G06Q 10/08 701/465 |
| 2011/0153052 A1* | 6/2011 | Pettibone | G06F 30/13 700/98 |
| 2011/0166707 A1* | 7/2011 | Romanov | G01S 5/16 700/255 |
| 2011/0178711 A1* | 7/2011 | Christoph | G01S 7/51 701/301 |
| 2011/0210866 A1* | 9/2011 | David | G08G 1/166 340/901 |
| 2011/0227435 A1* | 9/2011 | Maeda | B60L 50/16 310/77 |
| 2011/0246331 A1* | 10/2011 | Luther | G06Q 30/0627 705/26.63 |
| 2011/0253831 A1* | 10/2011 | Cheng | A63H 27/12 244/17.11 |
| 2011/0264311 A1* | 10/2011 | Lee | H04N 7/183 348/E7.085 |
| 2011/0282476 A1* | 11/2011 | Hegemier | G06Q 30/0621 705/26.5 |
| 2011/0301787 A1* | 12/2011 | Chaperon | A63H 27/12 701/2 |
| 2011/0313878 A1* | 12/2011 | Norman | G06F 30/12 705/26.5 |
| 2012/0039694 A1* | 2/2012 | Suzanne | E04H 5/02 414/339 |
| 2012/0078592 A1* | 3/2012 | Sims, Jr. | G06F 30/00 703/1 |
| 2012/0091260 A1* | 4/2012 | Callou | G05D 1/0858 244/17.13 |
| 2012/0109419 A1* | 5/2012 | Mercado | G07C 9/00182 701/2 |
| 2012/0219397 A1* | 8/2012 | Baker | B65G 1/1373 414/796 |
| 2012/0221438 A1* | 8/2012 | Cook, Jr. | G06Q 30/0641 705/26.61 |
| 2012/0227389 A1* | 9/2012 | Hinderks | F02B 75/002 60/317 |
| 2012/0229325 A1* | 9/2012 | Dutruc | G01S 7/03 342/29 |
| 2012/0234969 A1* | 9/2012 | Savoye | B64U 10/13 244/17.11 |

(56) References Cited

U.S. PATENT DOCUMENTS

| | | | |
|---|---|---|---|
| 2012/0235606 A1* | 9/2012 | Takeuchi | H02K 7/116 318/371 |
| 2012/0323365 A1* | 12/2012 | Taylor | G05D 1/0225 901/1 |
| 2013/0006739 A1* | 1/2013 | Horvitz | G06Q 30/0222 705/14.23 |
| 2013/0073477 A1* | 3/2013 | Grinberg | G06Q 30/00 705/332 |
| 2013/0081245 A1* | 4/2013 | Vavrina | B60L 53/51 29/281.1 |
| 2013/0093582 A1* | 4/2013 | Walsh | G08G 1/166 340/436 |
| 2013/0126611 A1* | 5/2013 | Kangas | G06K 7/10178 235/385 |
| 2013/0148123 A1* | 6/2013 | Hayashi | G03F 9/7003 356/401 |
| 2013/0206915 A1* | 8/2013 | Desaulniers | B64U 10/20 244/165 |
| 2013/0218446 A1* | 8/2013 | Bradley | G06Q 10/00 701/123 |
| 2013/0218799 A1* | 8/2013 | Lehmann | G06Q 10/063 705/337 |
| 2013/0261792 A1* | 10/2013 | Gupta | G05B 15/02 700/232 |
| 2013/0262251 A1 | 10/2013 | Wan et al. | |
| 2013/0262252 A1* | 10/2013 | Lakshman | G06Q 30/06 705/26.1 |
| 2013/0262276 A1* | 10/2013 | Wan | G06Q 10/00 705/28 |
| 2013/0262336 A1* | 10/2013 | Wan | G06Q 10/087 705/339 |
| 2013/0264381 A1* | 10/2013 | Kim | G07F 17/13 232/24 |
| 2013/0320133 A1* | 12/2013 | Ratti | B64C 33/025 244/22 |
| 2013/0324164 A1* | 12/2013 | Vulcano | H04W 4/02 455/457 |
| 2013/0332062 A1* | 12/2013 | Kreitmair-Steck | G01S 7/062 701/301 |
| 2014/0010656 A1* | 1/2014 | Nies | F03D 7/0244 29/889 |
| 2014/0022055 A1 | 1/2014 | Levien et al. | |
| 2014/0025230 A1* | 1/2014 | Levien | A63H 27/12 701/2 |
| 2014/0030444 A1* | 1/2014 | Swaminathan | C23C 16/48 427/569 |
| 2014/0031964 A1* | 1/2014 | Sidhu | G05B 19/41865 700/99 |
| 2014/0032034 A1* | 1/2014 | Raptopoulos | G05D 1/0088 701/25 |
| 2014/0040065 A1* | 2/2014 | DuBois | G06Q 30/0621 705/26.5 |
| 2014/0052661 A1* | 2/2014 | Shakes | G06Q 10/0836 705/339 |
| 2014/0058959 A1* | 2/2014 | Isbjornssund | G06Q 50/184 705/310 |
| 2014/0081445 A1* | 3/2014 | Villamar | G06Q 10/087 701/19 |
| 2014/0089073 A1* | 3/2014 | Jacobs | G06Q 20/326 705/16 |
| 2014/0136282 A1* | 5/2014 | Fedele | G06Q 10/06 705/7.31 |
| 2014/0136414 A1* | 5/2014 | Abhyanker | G06Q 20/3224 701/25 |
| 2014/0149244 A1* | 5/2014 | Abhyanker | G06Q 30/0605 705/26.2 |
| 2014/0156053 A1* | 6/2014 | Mahdavi | B29C 64/112 700/119 |
| 2014/0180914 A1* | 6/2014 | Abhyanker | G06Q 10/0832 705/332 |
| 2014/0200697 A1* | 7/2014 | Cheng | G06Q 30/06 700/98 |
| 2014/0214684 A1* | 7/2014 | Pell | G06Q 30/02 705/57 |
| 2014/0244433 A1* | 8/2014 | Cruz | G06T 7/001 705/26.8 |
| 2014/0254896 A1* | 9/2014 | Zhou | G06Q 20/3829 705/16 |
| 2014/0271200 A1* | 9/2014 | Sutton | B64C 27/33 29/889 |
| 2014/0283104 A1* | 9/2014 | Nilsson | H04N 1/32117 726/26 |
| 2014/0309813 A1* | 10/2014 | Ricci | G06V 20/59 701/1 |
| 2014/0325218 A1* | 10/2014 | Shimizu | H04L 12/10 713/168 |
| 2014/0330456 A1* | 11/2014 | Lopez Morales | G06Q 10/08 701/3 |
| 2015/0006005 A1* | 1/2015 | Yu | G06Q 10/08 701/22 |
| 2015/0066178 A1* | 3/2015 | Stava | B22F 10/47 700/98 |
| 2015/0069968 A1* | 3/2015 | Pounds | B60L 53/35 320/109 |
| 2015/0098819 A1* | 4/2015 | Tourin | G01M 5/0091 416/61 |
| 2015/0102154 A1* | 4/2015 | Duncan | B64U 80/86 701/300 |
| 2015/0112837 A1* | 4/2015 | O'Dea | G06Q 20/24 705/26.41 |
| 2015/0112885 A1* | 4/2015 | Fadell | G08B 29/185 705/330 |
| 2015/0120094 A1* | 4/2015 | Kimchi | G05D 1/00 701/3 |
| 2015/0120602 A1* | 4/2015 | Huffman | G06Q 10/083 700/214 |
| 2015/0127712 A1* | 5/2015 | Fadell | H04L 12/2807 709/202 |
| 2015/0129716 A1* | 5/2015 | Yoffe | B64F 1/029 244/110 C |
| 2015/0153175 A1 | 6/2015 | Skaaksrud | |
| 2015/0154545 A1 | 6/2015 | Skaaksrud et al. | |
| 2015/0158599 A1* | 6/2015 | Sisko | B64F 1/20 244/114 R |
| 2015/0175276 A1* | 6/2015 | Koster | A47G 29/14 244/114 R |
| 2015/0183528 A1* | 7/2015 | Walsh | B64U 70/90 244/114 R |
| 2015/0185034 A1* | 7/2015 | Abhyanker | G05D 1/0088 701/23 |
| 2015/0191255 A1* | 7/2015 | Zolich | B64F 1/16 340/946 |
| 2015/0202770 A1* | 7/2015 | Patron | G06Q 50/01 901/50 |
| 2015/0227882 A1* | 8/2015 | Bhatt | G06Q 10/083 705/330 |
| 2015/0246727 A1* | 9/2015 | Masticola | G08B 29/145 701/2 |
| 2015/0253777 A1* | 9/2015 | Binney | G05D 1/0214 701/28 |
| 2015/0254611 A1* | 9/2015 | Perez | G06Q 10/08355 705/5 |
| 2015/0259078 A1* | 9/2015 | Filipovic | G08B 13/1965 244/114 R |
| 2015/0286216 A1* | 10/2015 | Miwa | G05D 1/0808 701/4 |
| 2015/0314881 A1* | 11/2015 | Tsaliah | B64D 17/725 244/146 |
| 2015/0317597 A1* | 11/2015 | Shucker | G05D 1/0202 235/375 |
| 2015/0332206 A1* | 11/2015 | Trew | G06Q 10/0836 705/330 |
| 2015/0367850 A1* | 12/2015 | Clarke | B60T 7/22 701/28 |
| 2015/0370251 A1* | 12/2015 | Siegel | B64D 1/22 701/2 |
| 2016/0001877 A1* | 1/2016 | Paulos | B64U 30/29 701/3 |

(56) References Cited

U.S. PATENT DOCUMENTS

| | | | |
|---|---|---|---|
| 2016/0009413 A1* | 1/2016 | Lee | G08G 5/0069 701/16 |
| 2016/0019495 A1* | 1/2016 | Kolchin | G06Q 10/0833 705/333 |
| 2016/0033966 A1* | 2/2016 | Farris | B64U 70/90 701/16 |
| 2016/0051110 A1* | 2/2016 | Cao | A47L 9/009 15/324 |
| 2016/0058181 A1* | 3/2016 | Han | H04N 23/00 312/236 |
| 2016/0068267 A1* | 3/2016 | Liu | G05D 1/042 701/4 |
| 2016/0070265 A1* | 3/2016 | Liu | G05D 1/652 701/25 |
| 2016/0085238 A1* | 3/2016 | Hayes | G08G 5/0082 701/4 |
| 2016/0104099 A1* | 4/2016 | Villamar | G06Q 10/08 705/26.81 |
| 2016/0104113 A1* | 4/2016 | Gorlin | G06Q 10/08355 705/338 |
| 2016/0107750 A1* | 4/2016 | Yates | B64U 10/25 244/2 |
| 2016/0114488 A1* | 4/2016 | Mascorro Medina | B25J 9/1697 901/1 |
| 2016/0117931 A1* | 4/2016 | Chan | G08G 5/0069 701/120 |
| 2016/0125746 A1* | 5/2016 | Kunzi | G01S 7/003 701/11 |
| 2016/0129592 A1* | 5/2016 | Saboo | B25J 5/007 700/248 |
| 2016/0130015 A1* | 5/2016 | Caubel | B64C 27/001 244/120 |
| 2016/0132059 A1* | 5/2016 | Mason | B25J 9/1697 701/28 |
| 2016/0144734 A1* | 5/2016 | Wang | B64C 29/0016 701/17 |
| 2016/0144982 A1* | 5/2016 | Sugumaran | B64F 1/005 244/108 |
| 2016/0180618 A1* | 6/2016 | Ho | G07C 9/00563 340/5.52 |
| 2016/0196755 A1* | 7/2016 | Navot | G05D 1/0088 701/4 |
| 2016/0196756 A1* | 7/2016 | Prakash | B64U 70/95 701/3 |
| 2016/0200438 A1* | 7/2016 | Bokeno | G05D 1/102 244/2 |
| 2016/0207627 A1* | 7/2016 | Hoareau | B64D 1/02 |
| 2016/0214717 A1* | 7/2016 | De Silva | B64D 5/00 |
| 2016/0214728 A1* | 7/2016 | Rossi | B64U 30/291 |
| 2016/0221671 A1 | 8/2016 | Fisher et al. | |
| 2016/0235236 A1* | 8/2016 | Byers | A47G 29/14 |
| 2016/0236778 A1 | 8/2016 | Takayama et al. | |
| 2016/0239789 A1* | 8/2016 | Hanks | G06Q 10/083 |
| 2016/0239803 A1* | 8/2016 | Borley | G06Q 10/08355 |
| 2016/0257401 A1* | 9/2016 | Buchmueller | G08G 5/0065 |
| 2016/0258775 A1* | 9/2016 | Santilli | G06Q 10/0833 |
| 2016/0266578 A1* | 9/2016 | Douglas | G05D 1/0282 |
| 2016/0282126 A1* | 9/2016 | Watts | G06Q 10/08 |
| 2016/0299233 A1* | 10/2016 | Levien | G01S 19/215 |
| 2016/0321503 A1* | 11/2016 | Zhou | B64U 50/38 |
| 2016/0334229 A1* | 11/2016 | Ross | G08B 25/00 |
| 2016/0340021 A1* | 11/2016 | Zhang | B64U 20/50 |
| 2016/0364660 A1* | 12/2016 | Brown | G01C 21/20 |
| 2016/0364679 A1* | 12/2016 | Cao | G06Q 10/083 |
| 2016/0364823 A1* | 12/2016 | Cao | G06Q 50/40 |
| 2016/0364989 A1* | 12/2016 | Speasl | G08G 5/0069 |
| 2016/0371984 A1* | 12/2016 | Macfarlane | G06V 20/176 |
| 2017/0011333 A1* | 1/2017 | Greiner | G06K 7/10722 |
| 2017/0011340 A1* | 1/2017 | Gabbai | G06Q 10/08355 |
| 2017/0032315 A1* | 2/2017 | Gupta | G06Q 10/08 |
| 2017/0087999 A1* | 3/2017 | Miller | B60L 58/12 |
| 2017/0096222 A1* | 4/2017 | Spinelli | B64U 70/20 |
| 2017/0098378 A1* | 4/2017 | Soundararajan et al. | |
| 2017/0100837 A1* | 4/2017 | Zevenbergen | B60L 53/80 |
| 2017/0101017 A1 | 4/2017 | Streett | |
| 2017/0113352 A1* | 4/2017 | Lutz | B25J 9/1682 |
| 2017/0147975 A1* | 5/2017 | Natarajan | G07C 9/00182 |
| 2017/0152060 A1 | 6/2017 | Morisawa | |
| 2017/0154347 A1* | 6/2017 | Bateman | G06Q 10/0838 |
| 2017/0164319 A1 | 6/2017 | Skaaksrud et al. | |
| 2017/0167881 A1* | 6/2017 | Rander | B60W 60/0016 |
| 2017/0193442 A1* | 7/2017 | Ekkel | G06Q 10/083 |
| 2017/0199522 A1* | 7/2017 | Li | G07C 5/0866 |
| 2017/0255896 A1* | 9/2017 | Van Dyke | A47G 29/141 |
| 2017/0286905 A1* | 10/2017 | Richardson | G06Q 10/0836 |
| 2017/0300855 A1* | 10/2017 | Lund | B64F 5/10 |
| 2017/0305526 A1* | 10/2017 | Thomassey | B64C 27/26 |
| 2017/0308098 A1 | 10/2017 | Yu et al. | |
| 2017/0316379 A1* | 11/2017 | Lepek | G06Q 10/047 |
| 2017/0330145 A1* | 11/2017 | Studnicka | G07C 9/00896 |
| 2017/0345245 A1* | 11/2017 | Torresani | H04W 4/80 |
| 2017/0372256 A1* | 12/2017 | Kantor | H04W 4/024 |
| 2018/0024554 A1* | 1/2018 | Brady | G06Q 10/0833 701/23 |
| 2018/0088586 A1* | 3/2018 | Hance | G06Q 10/08 |
| 2018/0127211 A1* | 5/2018 | Jarvis | G05D 1/0285 |
| 2018/0137454 A1* | 5/2018 | Kulkarni | G05D 1/102 |
| 2018/0203464 A1 | 7/2018 | Yu et al. | |
| 2018/0257775 A1 | 9/2018 | Baek et al. | |
| 2019/0135403 A1* | 5/2019 | Perry | B64D 17/00 |
| 2019/0161190 A1* | 5/2019 | Gil | G01S 19/15 |
| 2020/0272144 A1 | 8/2020 | Yang et al. | |
| 2020/0284883 A1* | 9/2020 | Ferreira | H04N 25/773 |
| 2020/0324898 A1* | 10/2020 | Youmans | G06V 20/64 |
| 2020/0369384 A1* | 11/2020 | Kelly | G05D 1/106 |
| 2021/0089055 A1* | 3/2021 | Tran | G06N 3/08 |
| 2021/0094686 A1* | 4/2021 | Metzner | G05D 1/0094 |
| 2022/0009647 A1* | 1/2022 | Johannesson | B64U 20/96 |
| 2022/0144424 A1 | 5/2022 | Metzner et al. | |
| 2022/0162001 A1* | 5/2022 | Gherardi | B65G 1/1373 |
| 2022/0163980 A1* | 5/2022 | Beer | G08G 5/0052 |
| 2023/0298268 A1* | 9/2023 | Oleynikova | G06T 1/20 |

FOREIGN PATENT DOCUMENTS

| | | |
|---|---|---|
| CN | 104760704 A | 7/2015 |
| CN | 109118826 A | 1/2019 |
| DE | 102011086497 A1 | 5/2013 |
| EP | 3415436 A1 | 12/2018 |
| FR | 2692064 A1 | 12/1993 |
| GB | 2455374 A | 6/2009 |
| JP | S48088255 U | 10/1973 |
| JP | S56048952 | 11/1981 |
| JP | H0712088 A | 1/1995 |
| JP | 2004126800 A | 4/2004 |
| JP | 2009297449 A | 12/2009 |
| JP | 2010095246 A | 4/2010 |
| JP | 2011211025 A | 10/2011 |
| JP | 2012037204 A | 2/2012 |
| WO | 2007052246 A1 | 5/2007 |
| WO | 2008147484 A2 | 12/2008 |
| WO | 2008147484 A3 | 2/2009 |
| WO | 2009153588 A1 | 12/2009 |
| WO | 2010070717 A1 | 6/2010 |
| WO | 2012012752 A2 | 1/2012 |
| WO | 2012012752 A9 | 6/2012 |
| WO | 2013140085 A1 | 9/2013 |
| WO | 2013148123 A1 | 10/2013 |
| WO | 2014064431 A2 | 5/2014 |
| WO | 2014068982 A1 | 5/2014 |
| WO | 2014080409 A1 | 5/2014 |
| WO | 2014064431 A3 | 7/2014 |
| WO | 2017064202 A1 | 4/2017 |
| WO | 2018156991 A1 | 8/2018 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_

(56) References Cited

OTHER PUBLICATIONS driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.
DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Hawas et al., "Infrastructureless Inter-Vehicular Real-Time Route Guidance," 2008, IEEE, p. 1213-1219 (Year: 2008).
Kais, Mikael et al., "An Intelligent architecture for automated transportation in our cities", 2001 European Control Conference (ECC), Porto, Portugal, Sep. 4-7, 2001, pp. 277-282 (Year: 2001).
Kladis et al., "Event-Based Energy Optimum Route Planning in the Context of Unmanned Aerial Vehicles for Multi-Objective Exploration Missions," 2009, IEEE, p. 1281-1286 (Year: 2009).
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.
Mike Murphy, "Google wants to deliver packages from self-driving trucks," published Feb. 9, 2016, URL: https://qz.com/613277/google-wants-to-deliver-packages-from-self-driving-trucks/, 4 pages.
Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013, URL: https://web.archive.org/web/20190616235755/http://www.aeraccess-group.com/product/indoor/nanohawk [Retrieved from the Internet: Dec. 10, 2020]; the whole document.
Navaravong et al., "Formation Reconfiguration for Mobile Robots with Network Connectivity Constraints," 2012, IEEE, p. 18-24 (Year: 2012).
Parent, Michel et al., "Intelligent Transportation in Cities with CTS", The IEEE 5th International Conference on Intelligent Transportation Systems, Sep. 3-6, 2002, Singapore, pp. 826-830 (Year: 2002).
Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.
Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, pages.
URL: https://web.archive.org/web/20160804001046/https://www.starship.xyz/, download date: Aug. 4, 2016, 21 pages.
Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.
Andrew Amato, "Parrot Announces New Bobop Drone", Dronelife.com, May 12, 2014; http://dronelife.com/2014/05/12/parrot-announces-new-bebop-drone/, accessed Dec. 21, 2016.
Ivan Barajas, "Parrot Unveils New Drone and Controller," May 14, 2014; https://blog.newegg.com/parrot-unveils-drone-controller-oculus-compatible/, accessed Dec. 21, 2016.
Microchip Technology Inc. AT42QT1010 Data Sheet. Copyright © 2017 Microchip Technology Inc. 30 pages.
MicroPilot home page, https://www.micropilot.com/; archived on Jan. 3, 2013 by Internet Archive, http://web.archive.org/web/2013103180733/http://www.micropilot.com/?, accessed May 2, 2016.
Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.
rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.
Wang, David. Application Report: FDC1004: Basics of Capacitive Sensing and Applications. SNOA927A—Dec. 2014—Revised Jun. 2021. Copyright © 2021 Texas Instruments Incorporated. 12 pages.
Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).
Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

* cited by examiner

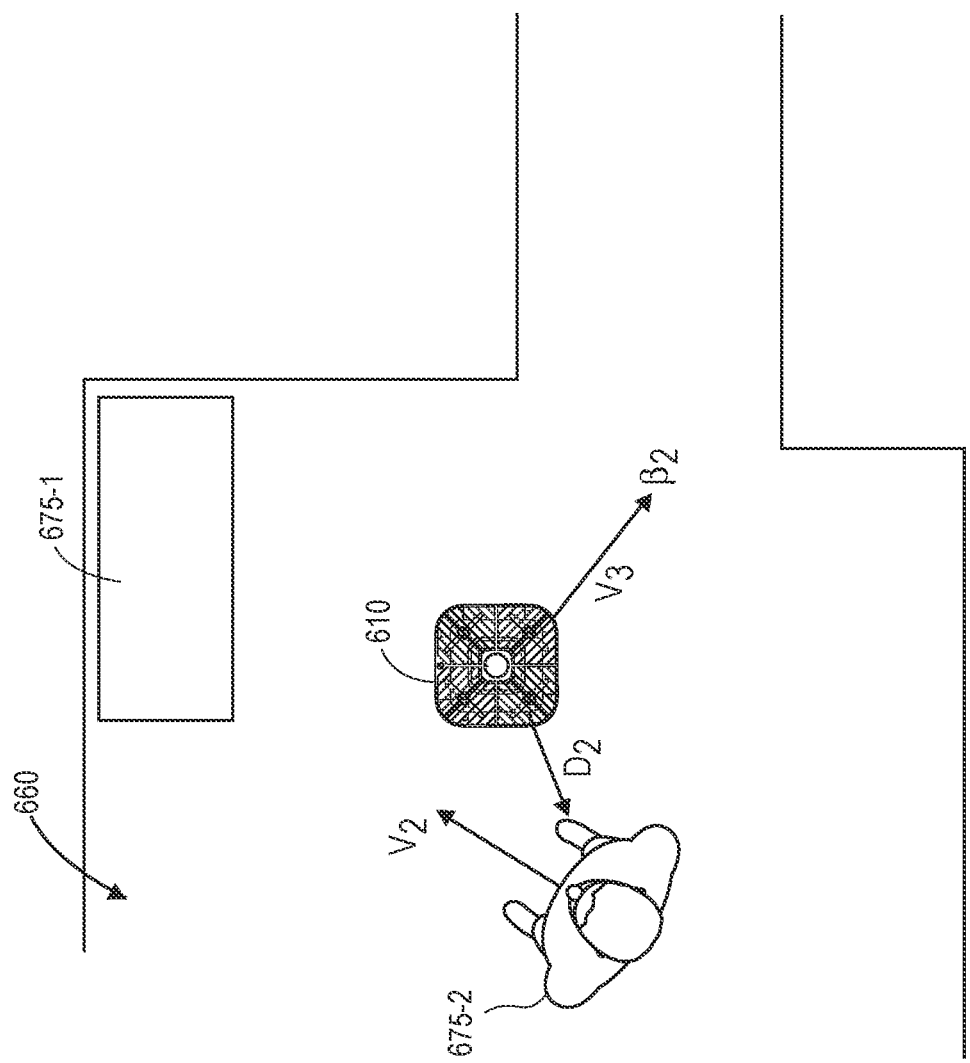

SELECTING PATHS FOR INDOOR OBSTACLE AVOIDANCE BY UNMANNED AERIAL VEHICLES

BACKGROUND

As compared to outdoor operations, operating an unmanned aerial vehicle, or drone, within indoor spaces presents a unique set of challenges for the unmanned aerial vehicle, and creates unique risks for contents of the indoor spaces. For example, an unmanned aerial vehicle that operates outdoors may typically climb above any encountered hazards by increasing altitude, in order to elevate above ground-based or airborne obstacles, which may include humans or other animals, or other stationary or moving objects. An unmanned aerial vehicle that operates indoors, however, is commonly constrained by ceilings at eight to ten foot elevations, or approximately one to five feet above the heights of most humans.

An unmanned aerial vehicle operating outdoors may capture data regarding its positions and orientations using one or more onboard sensors and interpret the data to generate commands or instructions for operating motors or control surfaces to avoid such obstacles. Because indoor spaces are commonly constrained by narrow hallways or other passageways, and feature limited operating areas between floors and ceilings, an unmanned aerial vehicle that operates indoors must often make tight turns or changes in altitude, or travel well below its maximum speeds, in order to avoid contacting objects such as walls, ceilings, floors or others during normal operations.

When an unmanned aerial vehicle operating in an indoor space detects or encounters an object of any kind, the unmanned aerial vehicle must take care to promptly reduce its speed, thereby minimizing a rate at which a range between the unmanned aerial vehicle and the object is decreasing, and select an appropriate course in order to avoid a collision with the object. Given that unmanned aerial vehicles operating in indoor spaces typically travel in close proximity to one or more objects, a course for avoiding a collision with one object may place an unmanned aerial vehicle at risk of colliding with another object.

BRIEF DESCRIPTION OF THE DRAWINGS

FIGS. 6A through 6E are views of aspects of one system in accordance with embodiments of the present disclosure.

DETAILED DESCRIPTION

As is set forth in greater detail below, the present disclosure is directed to systems and methods for selecting routes for obstacle avoidance by unmanned aerial vehicles. The present disclosure describes, inter alia, unmanned aerial vehicles that are configured to determine distances to walls, fixtures or other features surrounding the aerial vehicles during flight operations using time-of-flight sensors, LIDAR (viz., light detection and ranging) sensors, imaging devices, radar sensors, sonar sensors, or other sensors. When an unmanned aerial vehicle encounters objects that pose a collision risk, the unmanned aerial vehicle may select a safe direction for deceleration by executing a braking maneuver based on the determined distances. For example, the unmanned aerial vehicle may determine positions of surrounding objects detected during flight operations, and define sectors, areas or zones around the unmanned aerial vehicle that may safely accommodate the unmanned aerial vehicle while decelerating or executing the braking maneuver. The unmanned aerial vehicle may select one of the sectors, areas or zones, and decelerate in a direction corresponding to the selected sector, area or zone.

An unmanned aerial vehicle may generate and execute any number of commands or instructions (which may be executed by a control system or another component of the unmanned aerial vehicle), in order to cause the unmanned aerial vehicle to remain on a desired course, at a desired speed, or at a desired altitude in accordance with the trajectory. The unmanned aerial vehicles may further continuously or repeatedly monitor for objects within predetermined ranges of their respective directions of travel using one or more range sensors. Upon determining that an object is detected within a predetermined range, an unmanned aerial vehicle may immediately slow, e.g., by one or more braking maneuvers, to decelerate or otherwise reduce a speed of the unmanned aerial vehicle in a direction corresponding to a sector, an area or a zone that has been determined to be clear of objects. Such a braking maneuver may include, for example, reducing a rotational speed or adjusting an operation of one or more rotors or engines, such as by operating one or more motors or propellers to cease thrust or to effect thrust in a direction opposite to a current direction of motion, such as to sharply reduce a speed of the unmanned aerial vehicle, or to bring the unmanned aerial vehicle to a stop.

Figure 1A:
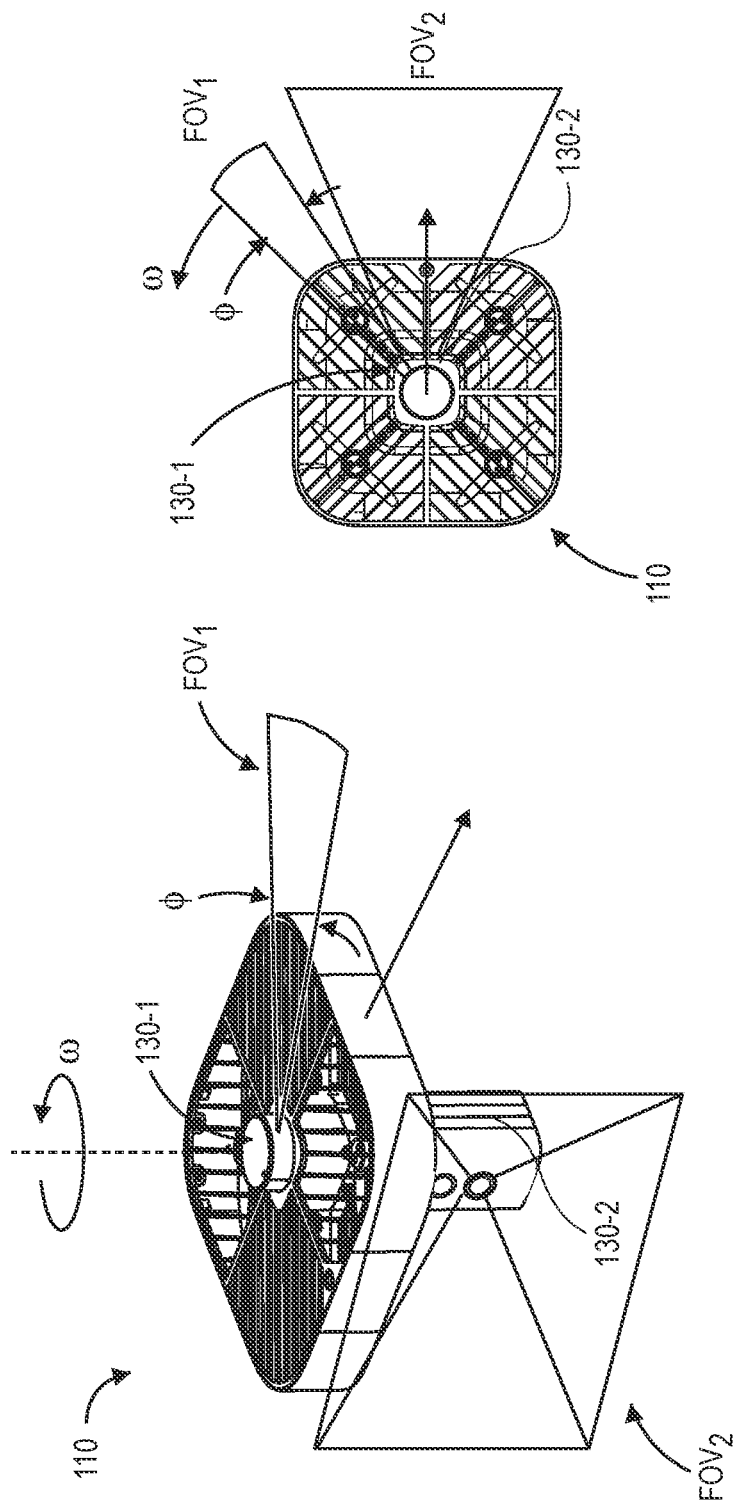
FIGS. 1A through 1G are views of aspects of one system in accordance with embodiments of the present disclosure.

Referring to FIGS. 1A through 1G, views of aspects of one system in accordance with embodiments of the present disclosure are shown. As is shown in FIG. 1A, an aerial vehicle 110 (e.g., a drone, or another unmanned aerial vehicle) is equipped with a pair of range sensors 130-1, 130-2. The range sensor 130-1 may be a LIDAR sensor that extends above the aerial vehicle 110 and is configured to transmit light within a planar field of view $FOV_1$ having a fixed angular width $\phi$ that may rotate at any angular velocity @ relative to one or more principal axes of the aerial vehicle 110.

In some implementations, the range sensor 130-1 may be configured to calculate distances to objects at an angular range of three hundred sixty degrees about the range sensor 130-1, and at any maximum measuring radius, e.g., twelve meters (12 m) or more. For example, in some implementations, the range sensor 130-1 may be configured to transmit light at any measurement frequency, e.g., up to 4,500 Hertz (or 4,500 measurements per second). The transmitted light may be infrared light, or light at any other wavelength or frequency. In some implementations, the range sensor 130-1 may transmit light in a single direction, and capture or receive reflections of the light from one or more objects. A difference between a time at which light is transmitted, and a time at which reflections of the light are received, is commonly called a "time-of-flight," and may be used with the speed of light to calculate distances to objects from which the light was reflected. In some implementations, the range sensor 130-1 may be configured to emit light at a wavelength of approximately 105 nanometers, e.g., within an infrared band, and at a power of approximately twenty-five milliwatts (25 mW).

The range sensor 130-1 may further combine distances calculated based on times-of-flight with information regarding angles at which the light was emitted and received to generate a point cloud or another representation of positions of objects, in any local or global coordinate system, which may be stored by the aerial vehicle 110 and processed or transmitted to one or more external devices or systems for processing. The range sensor 130-1 may also include one or more motor drivers or other components for controlling a start, a stop or a speed of a motor, and may generate and transmit packets of data including any information regarding transmissions or returns, e.g., rotational speeds, start or end angles, time stamps, or other related data.

As is also shown in FIG. 1A, the range sensor 130-2 may be a time-of-flight sensor provided in association with a surface of a fuselage or another component of the aerial vehicle 110. The range sensor 130-2 may be configured to transmit light within a substantially pyramidal field of view $FOV_2$ having a fixed axis or direction relative to the aerial vehicle 110. Alternatively, either or both of the range sensors 130-1, 130-2 may be a time-of-flight sensor, a LIDAR sensor, an imaging device, a radar sensor, a sonar sensor, or any other type or form of sensor, and the aerial vehicle 110 may include any number of other sensors (not shown), in any locations, axes or directions relative to the aerial vehicle 110. In some implementations, the range sensor 130-2 may be a time-of-flight sensor configured to provide distance data for a plurality of zones in a grid layout, e.g., a 4×4 grid of zones, or an 8×8 grid of zones. In some implementations, the range sensor 130-2 may comprise a vertical cavity surface-emitting laser (or "VCSEL") and diffractive optical elements that allow a square field of view to be projected onto a scene, as well as a single-photon avalanche diode (or "SPAD") array and a receiver lens that focuses light onto the SPAD array.

Figure 1B:
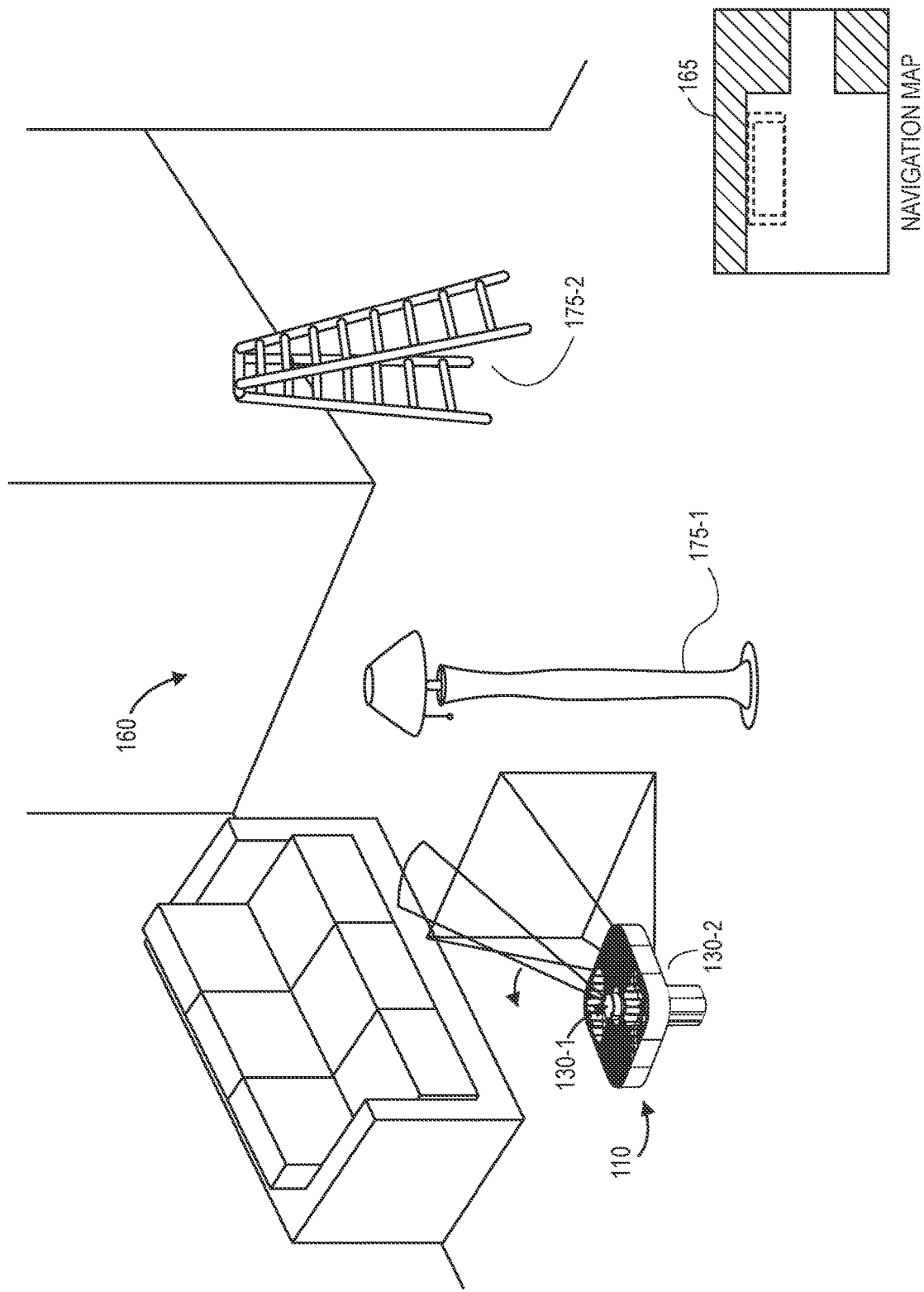

As is shown in FIG. 1B, the aerial vehicle 110 is traveling within a facility 160 such as a home, an office, or any other facility, on a course, at an altitude and at a speed in accordance with a trajectory selected to cause a pose, a velocity and an acceleration of the aerial vehicle 110 to be smooth and trackable, and with minimized pitch or roll. For example, a trajectory for causing the aerial vehicle 110 to travel on the course, at the altitude or at the speed may be calculated in any manner, such as according to an equation or formula that minimizes snap of the aerial vehicle 110, e.g., as piecewise polynomial functions of orders from zero to six, through a plurality of waypoints (or spatial points), and is defined in terms of positions in three-dimensional space and a yaw angle or value, e.g., values of x, y, z, and w. Alternatively, a trajectory for causing the aerial vehicle 110 to travel on the course, at the altitude or at the speed may be calculated in any other manner, or according to any other equation or formula.

The aerial vehicle 110 may be configured to capture information or data using the range sensors 130-1, 130-2 while traveling within the facility 160. As is further shown in FIG. 1B, the facility 160 may include any number of structural features or internal components for accommodating humans, machines or other entities within the facility 160. Additionally, the facility 160 further includes a pair of obstacles, e.g., a floor lamp 175-1 and a ladder 175-2, which are located at or near a flight path of the aerial vehicle 110, e.g., forward of or near the aerial vehicle 110.

As is further shown in FIG. 1B, the aerial vehicle 110 is programmed with a navigation map (or an environment map) 165, which may include locations or positions of surfaces such as ceilings, floors, walls or other structural features, as well as any internal components such as furniture or cabinets, according to any local or global coordinate system.

Figure 1C:
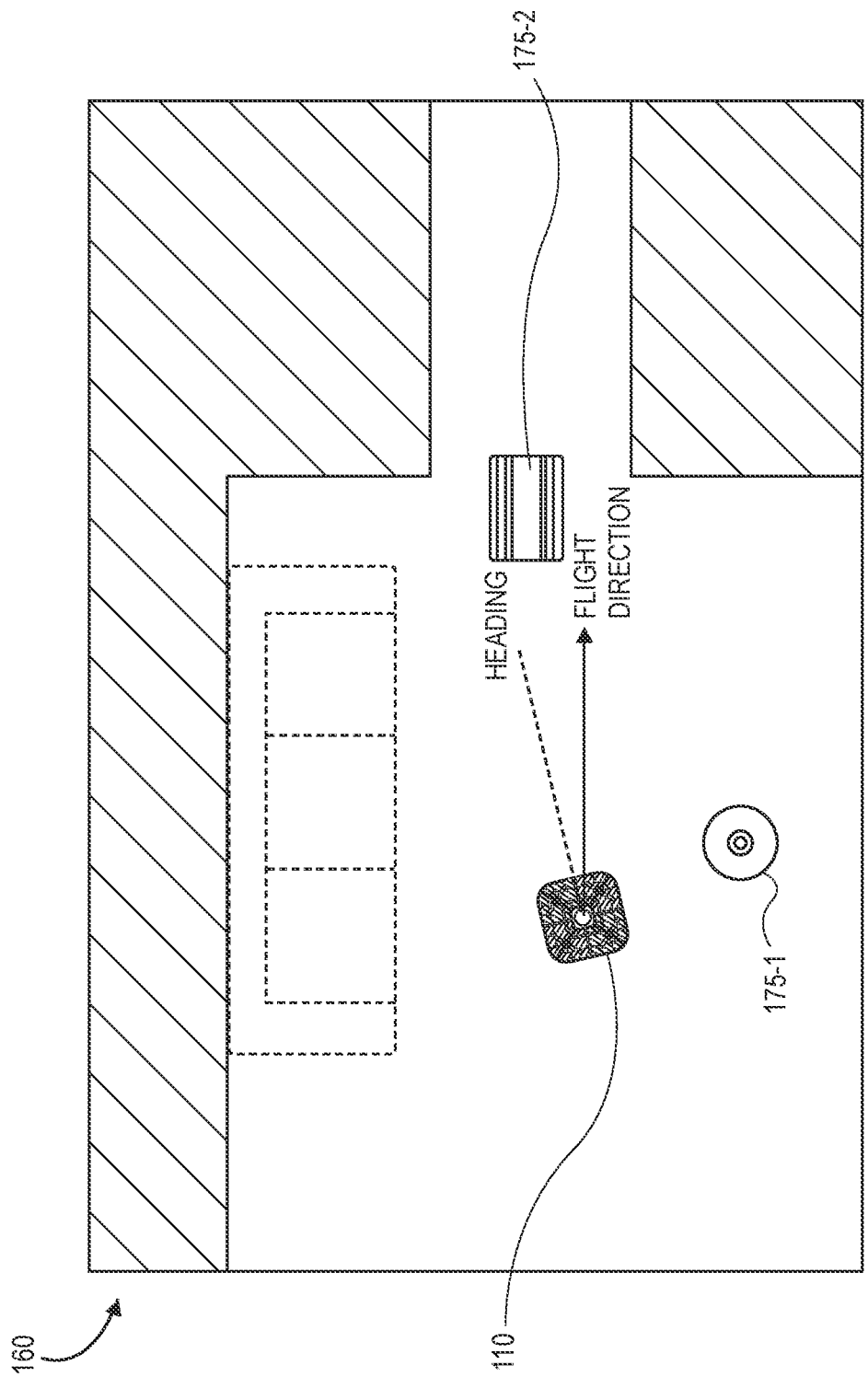

As is shown in FIG. 1C, the aerial vehicle 110 is shown engaged in flight operations within the facility 160. In some implementations, a pose (e.g., a position and/or an orientation) of the aerial vehicle 110 may be determined by one or more inertial sensors or position sensors, which may include a GPS sensor or any other positioning system. For example, as is shown in FIG. 1C, a heading of the aerial vehicle 110 may be determined with respect to a direction of travel of the aerial vehicle 110.

In some other implementations, a position or an orientation of the aerial vehicle 110 may be determined based on information or data captured by one or more other sensors, e.g., the range sensors 130-1, 130-2, which may detect one or more objects having known positions within the facility 160, e.g., according to a local or global coordinate system, and may determine a position or an orientation of the aerial vehicle 110 with respect to such objects.

Figure 1D:
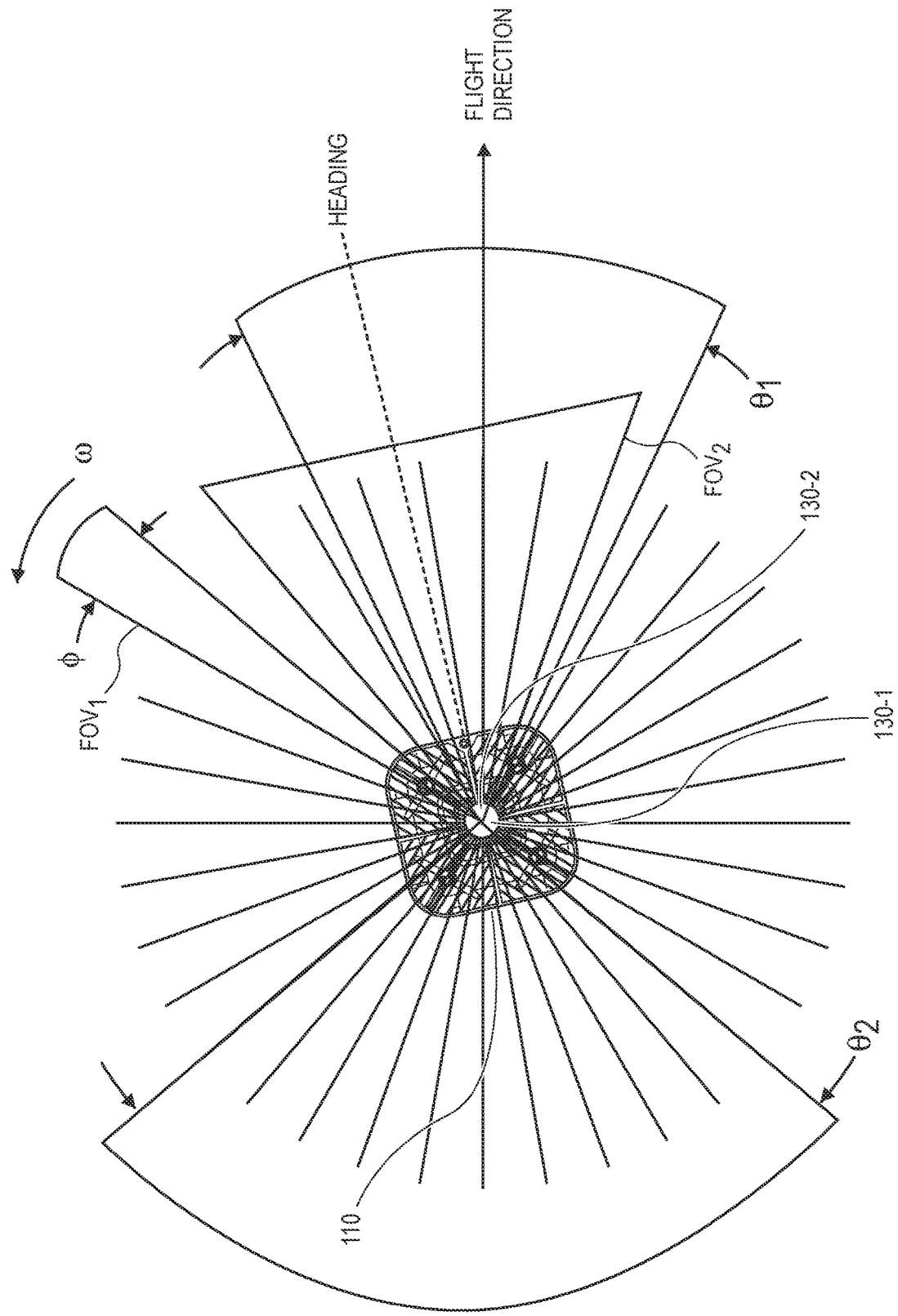

During flight operations, the aerial vehicle 110 may capture information or data using one or more onboard sensors, e.g., the range sensors 130-1, 130-2, or any imaging devices, radar sensors, sonar sensors, or others, and determine whether any objects are present within a predetermined range or distance of the aerial vehicle 110, e.g., about an entire perimeter or circumferential range around the aerial vehicle 110, or within a portion of the perimeter or circumferential range. For example, as is shown in FIG. 1D, the range sensor 130-1 may transmit and receive light within the planar field of view $FOV_1$ having the fixed angular width $\phi$, which may rotate at any angular velocity $\omega$ relative to one or more principal axes, e.g., about a yaw axis of the aerial vehicle 110, or about an axis parallel to the yaw axis of the aerial vehicle 110. The predetermined range or distance may be defined by a functional or operational limit of one or both of the range sensors 130-1, 130-2, e.g., a maximum measuring radius such as twelve meters (12 m) or more.

As is shown in FIG. 1D, the range sensor 130-1 may be configured to transmit and receive light at regular intervals about the one or more principal axes. For example, in some implementations, the fixed angular width $\phi$ of the field of view $FOV_1$ may be approximately five degrees, and the range sensor 130-1 may transmit and receive light within the field of view $FOV_1$ at seventy-two different intervals about the one or more principal axes, and determine whether any objects are present forward of the aerial vehicle 110 and within a predetermined range D based on any reflections of the transmitted light received by the range sensor 130-1. The range sensor 130-2 may be configured to transmit light within a substantially pyramidal field of view $FOV_2$ having a fixed axis or direction relative to the unmanned aerial vehicle 110.

Upon receiving data regarding one or more returns of reflections of the transmitted light, the range sensor 130-1 may determine an angle from the aerial vehicle 110 (e.g., from the range sensor 130-1) to an object (e.g., an obstacle), based on the angular interval by which the returns of the reflected light were received, as well as a distance to the object, based on an elapsed time between the transmission and the return, or in any other manner.

As is also shown in FIG. 1D, the aerial vehicle 110 may be configured to monitor predetermined or selected sectors, areas or zones about the aerial vehicle 110 for the presence of any objects. For example, the aerial vehicle 110 may be configured to capture data using the range sensors 130-1, 130-2, and interpret the data to determine whether any objects are present about an entire perimeter or circumferential range around the aerial vehicle 110, or within a portion of the perimeter or circumferential range.

Alternatively, the aerial vehicle 110 may be configured to capture data using the range sensors 130-1, 130-2, and interpret the data to determine whether any objects are present within a first zone or area defined by a predetermined range or distance forward of the aerial vehicle 110, and within a first arc or sector that has a radius of the predetermined range or distance and subtends an angle $\theta_1$ on either side of the flight direction of approximately twenty to thirty degrees, or any other angle. In some implementations, the aerial vehicle 110 may be further configured to interpret the data to determine whether any objects are present within a second area or zone defined by a predetermined range or distance aft of the aerial vehicle 110, or behind the aerial vehicle 110, and within a second arc or a sector that has a radius of the predetermined range or distance and subtends an angle $\theta_2$ on either side opposite the flight direction of approximately sixty degrees, or any other angle. Alternatively, the aerial vehicle 110 may be configured to determine whether any objects are present within any other area or zone defined by any range or distance and at any angle or direction with respect to the flight direction of the aerial vehicle 110.

Figure 1E:
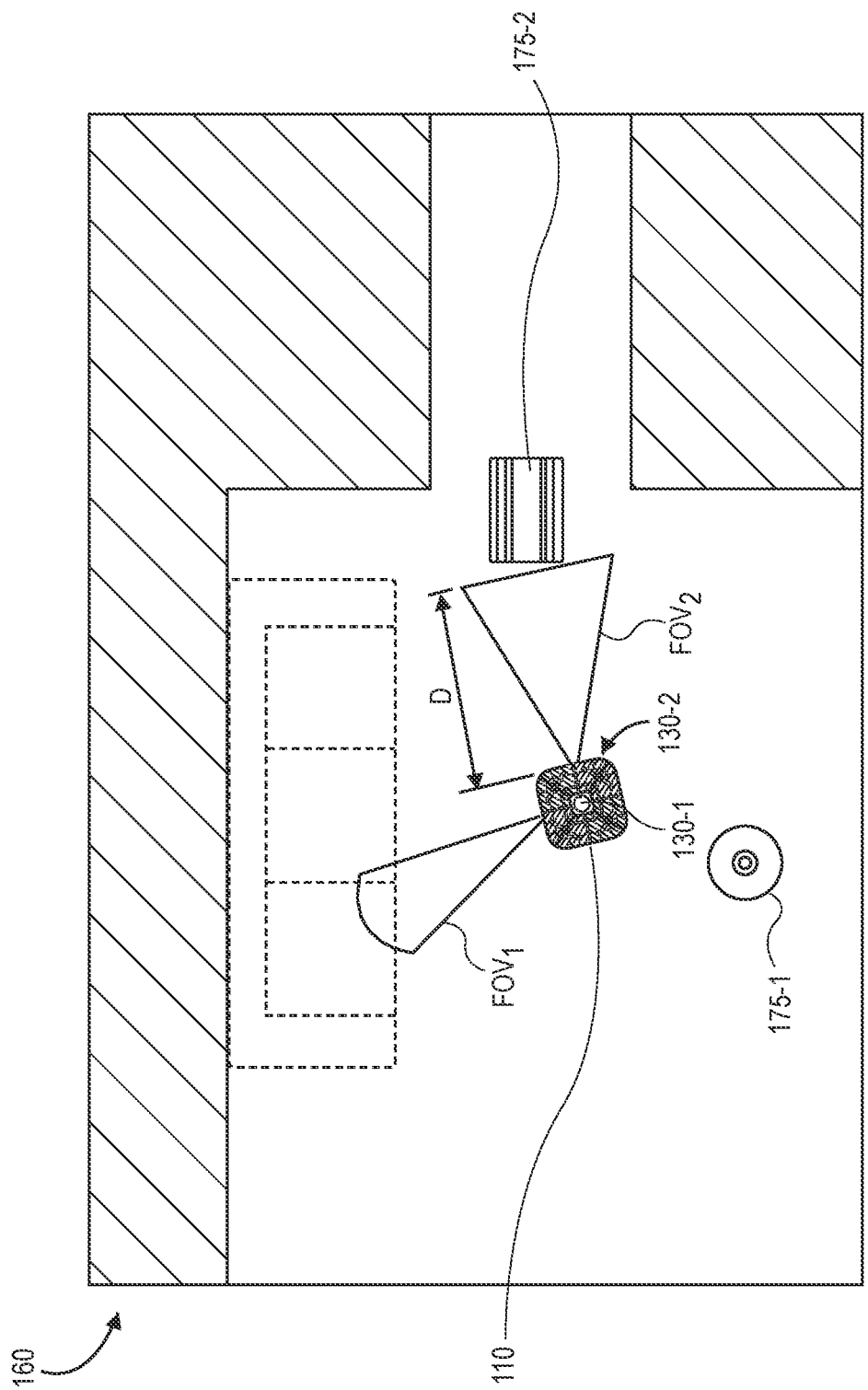

As is shown in FIG. 1E, when engaged in flight operations within the space 160, the aerial vehicle 110 detects the ladder 175-2 at a predetermined range (or distance) D forward of the aerial vehicle 110, based on returns within the field of view $FOV_1$ of the range sensor 130-1 or within the field of view $FOV_2$ of the range sensor 130-2. In some implementations, the predetermined range D may have a single fixed value, e.g., approximately one meter (1 m), or one hundred centimeters (100 cm). Alternatively, the predetermined range D may have multiple values, such as a first value where no objects have been detected forward of the aerial vehicle 110, e.g., approximately one meter (1 m), or one hundred centimeters (100 cm), and a second value where one or more other objects have been detected forward of the aerial vehicle 110, or approximately 0.3 to 0.5 meters (0.3-0.5 m), or thirty to fifty centimeters (30-50 cm). Alternatively, the predetermined range D may be defined by one or more limitations of the range sensors 130-1, 130-2.

The aerial vehicle 110 may determine a position of the ladder 175-2 in three-dimensional space, e.g., based on the navigation map 165, or in any other manner, and store the position of the ladder 175-2 in one or more data stores. In some implementations, a position of the ladder 175-2 may be determined based on times associated with reflections or returns of light from the ladder 175-2 by one or both of the range sensor 130-1 or the range sensor 130-2. For example, a two-dimensional point cloud or other representation determined by the range sensor 130-1 may be fused or combined with a three-dimensional depth image or other representation determined by the range sensor 130-2, to determine a position in three-dimensional space of the ladder 175-2, where a pose (e.g., a position or an orientation) of the aerial vehicle 110 are known.

Figure 1F:
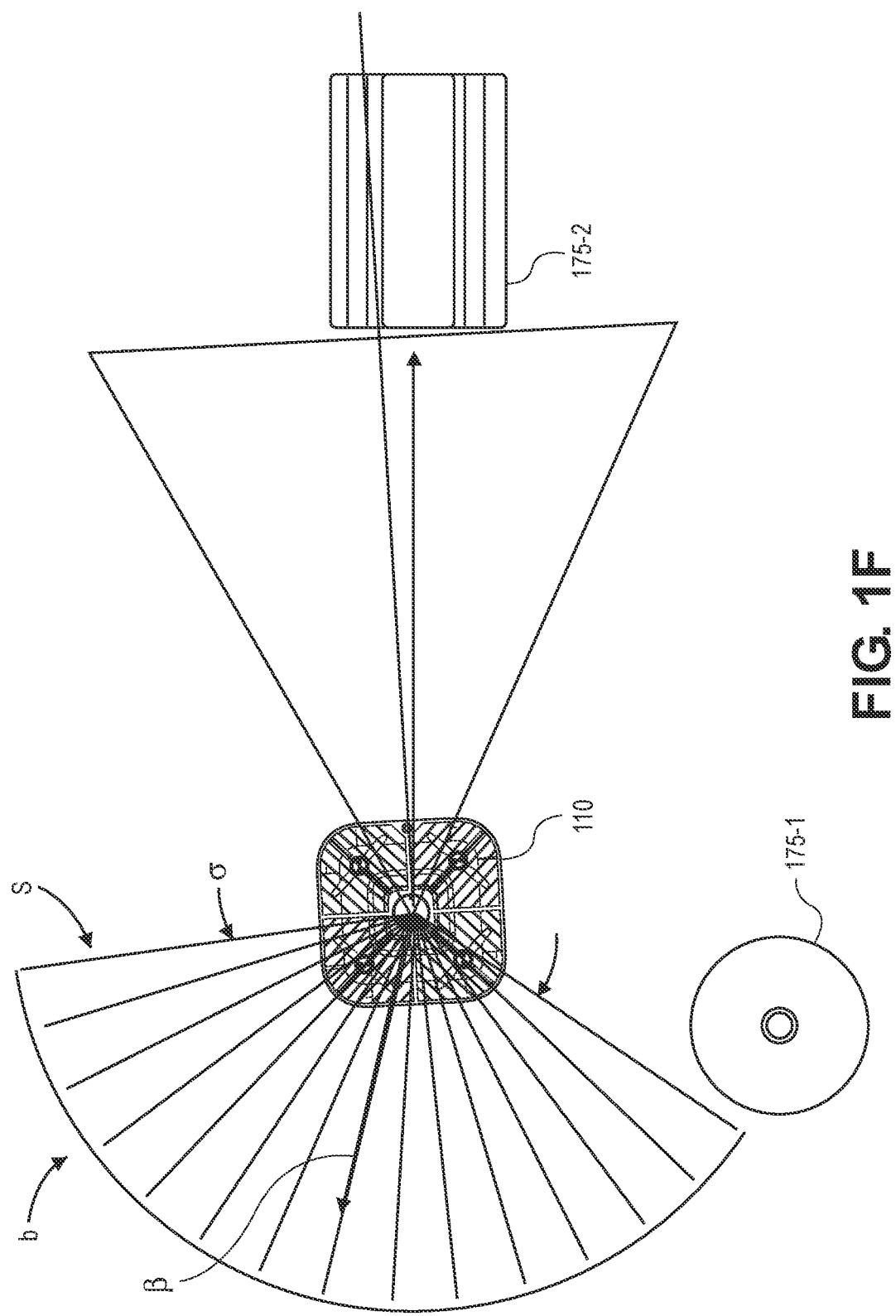

As is shown in FIG. 1F, upon detecting the ladder 175-2, the aerial vehicle 110 determines that a set S of b sectors defining an angle σ around the aerial vehicle 110 is free and clear of objects, or does not have any objects such as walls, ceilings or floors of the facility 160, or any other fixed or airborne objects such as the lamp 175-1, the ladder 175-2, or any other objects, such as aerial vehicles, within a predetermined range. The set S of the b sectors includes a portion of an area or a zone behind the aerial vehicle 110, or opposite a direction of travel of the aerial vehicle 110, but does not include an area or a zone in which the lamp 175-1 is located. A bearing β associated with the set S of the b sectors extends from a centroid of the aerial vehicle 110 to approximately a midpoint of the set S of the b sectors, which may correspond to a middle sector of the b sectors, or to two or more of such sectors.

In some implementations, a sector or a bearing to the sector may be defined relative to a location that is not coincident with a centroid of the aerial vehicle 110. For example, in some implementations, data generated by a range sensor that defines a location or bearing relative to the range sensor may be converted, transformed, or translated to define a location or bearing relative to a centroid of the aerial vehicle 110, or relative to any configured portion of an aerial vehicle.

In some implementations, the aerial vehicle 110 may determine that the set S is free and clear of objects beyond a predetermined range based on data received by the range sensor 130-1. For example, where the range sensor 130-1 is a LIDAR sensor, the aerial vehicle 110 may collect beams received by the range sensor 130-1 in the form of reflections from objects around the aerial vehicle 110, such as behind the aerial vehicle 110, or within the arc or sector subtending the angle $\theta_2$ opposite the flight direction as shown in FIG. 1D. The aerial vehicle 110 may downsample or decimate the collected data into sectors, e.g., the b sectors or (e.g., bins), having predefined angular widths or resolutions, such as five degrees. For each of the b sectors, a value of a minimum distance measurement may be determined from the collected data and stored in association with the respective sectors. To the extent that minimum distance measurements of two or more adjacent sectors exceed a predetermined value, a set of adjacent ones of the b sectors may be identified, and a bearing associated with the set, e.g., the bearing β, may be identified based on one or more sectors at or near a midpoint of the set.

Figure 1G:
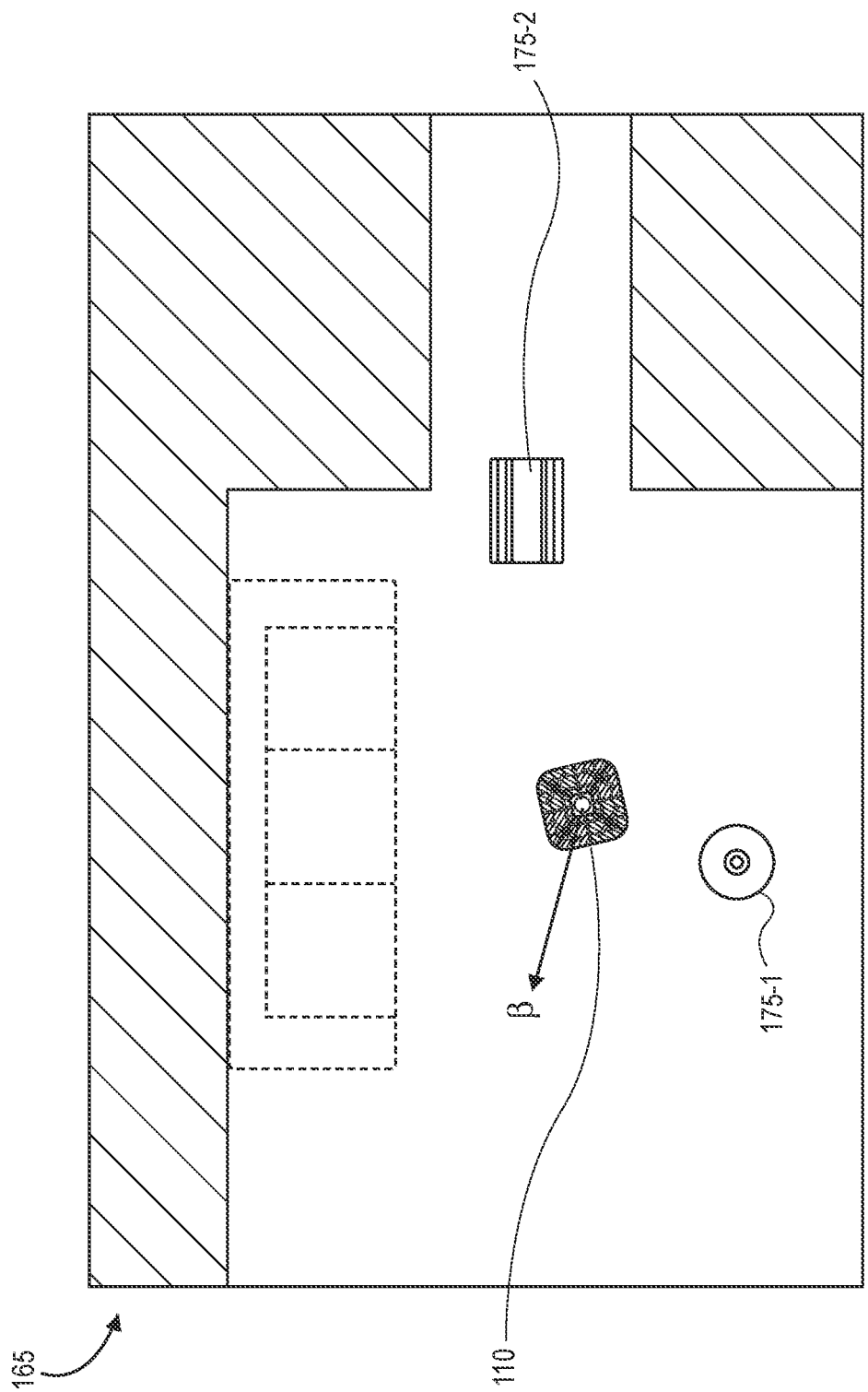

As is shown in FIG. 1G, after detecting the ladder 175-2, and determining that the set S of the b sectors is substantially free and clear of objects, the aerial vehicle 110 executes a braking maneuver, and decelerates and turns in a direction defined by the bearing ß at the center of the set S. For example, to brake or to otherwise avoid the obstacle, the aerial vehicle 110 may be programmed to insert an intervening waypoint immediately behind the aerial vehicle 110, and to generate a new trajectory based on the newly inserted intervening waypoint, and to execute one or more instructions for traveling along the newly generated trajectory.

The aerial vehicle 110 executes the braking maneuver to safely avoid contacting not only the ladder 175-2 but also any other objects that are located at other bearings or in other directions with respect to the aerial vehicle 110, such as the lamp 175-1. The aerial vehicle 110 may then slow to a stop, e.g., to hover or land, or select another destination, and calculate a trajectory for traveling to the other destination.

The systems and methods of the present disclosure are directed to the indoor navigation and obstacle avoidance by aerial vehicles (e.g., unmanned aerial vehicles, or drones). The aerial vehicles of the present disclosure may be of any type or form, and may include but need not be limited to low-power drones that may be configured for efficient path planning, adaptive speed modification, and obstacle avoidance techniques during operations within indoor spaces.

In some implementations, an aerial vehicle traveling on a selected course, at a selected attitude and at a selected speed may continuously determine distances to objects around a perimeter of the aerial vehicle, e.g., using a continuously rotating two-dimensional LIDAR sensor, one or more time-of-flight sensors, or any other sensors, e.g., imaging devices, radar sensors, sonar sensors. The aerial vehicle may calculate or otherwise determine distances at angles about the perimeter of the aerial vehicle, e.g., based on returns received by a LIDAR sensor, a time-of-flight sensor, or others, and aggregate sets of the distance measurements for angular sectors about the perimeter. Such sectors may have any angular width, e.g., five degrees, or others. Minimum distances to objects within each of the angular sectors may be determined and stored in one or more memory components of the aerial vehicle. Where a set of adjacent angular sectors having minimum distances above a predetermined threshold are identified, a bearing associated with the set of adjacent angular sectors (e.g., a bearing to an angular center of the set) and the minimum distance measurement of the set are stored in a memory component of the aerial vehicle. Any number of sets of adjacent angular sectors may be identified in this manner, and bearings and minimum distance measurements of each of such sets may be stored by the aerial vehicle.

Subsequently, when an obstacle is detected within a flight path of the aerial vehicle, or it is otherwise determined that traveling on a current trajectory will cause the aerial vehicle to contact the obstacle, the aerial vehicle may automatically execute a braking maneuver, and select one of the sets of adjacent angular sectors on any basis. The aerial vehicle may generate or execute one or more instructions for decelerating and turning toward a bearing associated with the selected one of the sets of adjacent angular sectors, e.g., by inserting an intervening waypoint along the bearing, thereby reducing a risk that the aerial vehicle will contact the obstacle or any other objects during the braking maneuver. Distances to surrounding objects may be continuously determined while the aerial vehicle is engaged in flight operations, and sets of adjacent angular sectors may be identified or updated accordingly based on such distances.

In some implementations, an aerial vehicle may determine whether a path or a trajectory would cause the aerial vehicle to come into contact with one or more objects while traveling between waypoints. If the aerial vehicle determines that the path or the trajectory could cause the aerial vehicle to come into contact with or pass unacceptably close to any objects between any pair of waypoints, the aerial vehicle may insert an additional waypoint (e.g., an intervening waypoint at a midpoint between the pair of waypoints), and recalculate a trajectory that causes the aerial vehicle to pass through the additional waypoint. If the recalculated trajectory would cause the aerial vehicle to pass the obstacle at a safe distance, the aerial vehicle may proceed along the recalculated trajectory.

In some implementations, an aerial vehicle may be outfitted or equipped with one or more modules, e.g., hardware components or software applications to be executed by one or more hardware components. Such modules may include an obstacle detection module that may assess relative positions of obstacles in a given environment according to any local or global coordinate system, using temporal information to fuse data received from range sensors provided aboard the aerial vehicle, e.g., a rotating two-dimensional LIDAR sensor and time-of-flight sensors provided in fixed orientations with respect to a fuselage or other component of the aerial vehicle. Additionally, a range map, a point cloud or another representation may be subject to pixelization to determine whether any obstacles are present, and to minimize computation resources and processing power.

Additionally, in some implementations, an aerial vehicle may be configured to determine a state of risk that the aerial vehicle may collide with one or more objects, and to select a speed of the aerial vehicle based on the state of risk. For example, where the aerial vehicle does not detect any obstacles within a first predetermined range in a direction of travel of the aerial vehicle (or on a heading of the aerial vehicle), the aerial vehicle may travel at a maximum speed, or at any other safe speed, along the direction of travel, consistent with a state of low or insignificant risk. Alternatively, where the aerial vehicle detects one or more obstacles within the first predetermined range in the direction of travel, the aerial vehicle may execute an immediate braking maneuver, and may slow to a predetermined speed that may be a fraction of the maximum speed, consistent with a state of high or significant risk. For example, in some implementations, in order to immediately brake, an aerial vehicle may insert an intervening waypoint that is directly behind a position of the aerial vehicle, and calculate a trajectory that would cause the aerial vehicle to attempt to return to the intervening waypoint, e.g., by operating one or more motors or control surfaces, and to effectively brake as a result.

The aerial vehicle may recalculate a trajectory for the aerial vehicle at the reduced speed, and continue to determine whether any obstacles are present along the trajectory of the aerial vehicle within a second predetermined range that may be shorter than the first predetermined range, subject to any adjustments compensating for the motion of the aerial vehicle along the direction of travel. If an obstacle is present within the second predetermined range, the aerial vehicle may execute an emergency maneuver, e.g., to brake or to otherwise avoid the obstacle, such as by inserting an intervening waypoint or any other position immediately behind the aerial vehicle or in any other location with respect to a direction of travel or flight path of the aerial vehicle. If no obstacles are detected within the second predetermined range, then the aerial vehicle may continue to proceed at the predetermined reduced speed before accelerating to the maximum speed again upon confirming that the aerial vehicle is at a state of acceptable risk.

In accordance with some embodiments of the present disclosure, an aerial vehicle may be programmed or configured to generate one or more environment maps of spaces within a facility using images or other data captured by one or more onboard sensors. Such sensors may include digital cameras (e.g., visual or depth cameras) or other imaging devices, which may be aligned with fields of view or axes of orientation extending in any direction, e.g., forward, aft, port, starboard, up, down, or in any other direction as well as radar sensors, sonar sensors or others. For example, the imaging devices may have fields of view or axes of orientation that are aligned along or parallel to yaw, pitch or roll axes of an aerial vehicle, e.g., principal axes of the aerial vehicle, or at any other angle.

In some embodiments, an aerial vehicle may include one or more depth cameras or range sensors, such as LIDAR sensors or time-of-flight sensors, that are aligned at any angle with respect to an orientation or configuration of an aerial vehicle. For example, the aerial vehicle may include depth cameras or range sensors with fields of view or orientations pointing vertically upward or downward, as well as depth cameras or range sensors having fields of view or orientations that vary with respect to an orientation or configuration of the aerial vehicle. In some embodiments, an aerial vehicle may include one or more imaging devices such as depth cameras or range sensors (e.g., LIDAR sensors or other time-of-flight sensors) that are configured to determine ranges based on any number of pixels of data, e.g., grids of four pixels by four pixels, or eight pixels by eight pixels, or the like. In some embodiments, an aerial vehicle may include one or more imaging devices such as depth cameras or range sensors that are configured to determine ranges based on single pixels of data, e.g., a single-pixel LIDAR sensor or other sensor. Moreover, the aerial vehicle may include one or more depth cameras, range sensors or other systems that are aligned with fixed orientations, or with variable orientations (e.g., rotating or shifting orientations).

In some implementations, an aerial vehicle may include one or more time-of-flight sensors that are configured to generate distance data in a plurality of zones in a grid layout, e.g., a 4×4 grid of zones or an 8×8 grid of zones. For example, in such implementations, a time-of-flight sensor may comprise a VCSEL and diffractive optical elements that allow a square field of view to be projected onto a scene, as well as a SPAD array, and a receiver lens that focuses light onto the SPAD array.

The aerial vehicles of the present disclosure may be outfitted with one or more processors, components, transceivers, sensors or other systems for engaging in communications with aspects of a facility (e.g., appliances, lighting, environmental or other systems), as well as any persons within the facility. For example, an aerial vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth, radio frequency identification (or "RFID"), near-field communication (or "NFC") readers, or any other type of systems or protocols. For example, the aerial vehicles may further include any number of audio or video sensors, including but not limited to one or more imaging devices (e.g., digital cameras) and/or microphones, or any other type of sensors, embedded or incorporated therein.

Additionally, an aerial vehicle may further include any number of sensors, such as imaging devices (e.g., cameras configured to capture visual or depth data), temperature sensors, magnetometers, Wi-Fi receivers, Bluetooth receivers, or others, and may be programmed or configured to travel throughout one or more spaces of a facility and to capture data using such sensors. Based on the captured data, an environment map of such spaces or the facility may be generated. The environment map may identify or depict one or more boundaries (e.g., walls, ceilings, floors) or other aspects of such spaces, as well as the respective dimensions of such spaces, or the respective surfaces or textures of such boundaries. In some embodiments, an aerial vehicle may autonomously travel throughout one or more spaces of a facility in order to capture data using one or more sensors, and such data may be utilized in generating an environment map of the spaces of the facility. In some other embodiments, an aerial vehicle may be transported (e.g., carried) or escorted by a human actor throughout such spaces, and may capture data using one or more sensors as the aerial vehicle is transported or escorted throughout such spaces. Data captured as the aerial vehicle is escorted may be utilized in generating an environment map of the spaces of the facility. Additionally, in some embodiments, the aerial vehicle may selectively operate one or more propulsion motors as the aerial vehicle is transported or otherwise escorted throughout such spaces, in order to maintain altitude and/or tilt control. Furthermore, in some embodiments, data captured by the aerial vehicle as the aerial vehicle travels throughout the spaces of the facility may be adjusted to account for presence of one or more body parts of a human actor that is transporting or otherwise escorting the aerial vehicle through the facility.

In accordance with some embodiments of the present disclosure, an aerial vehicle may be configured to operate along with one or more stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

Moreover, aerial vehicles of the present disclosure may be configured for use or operation within facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

Figure 2:
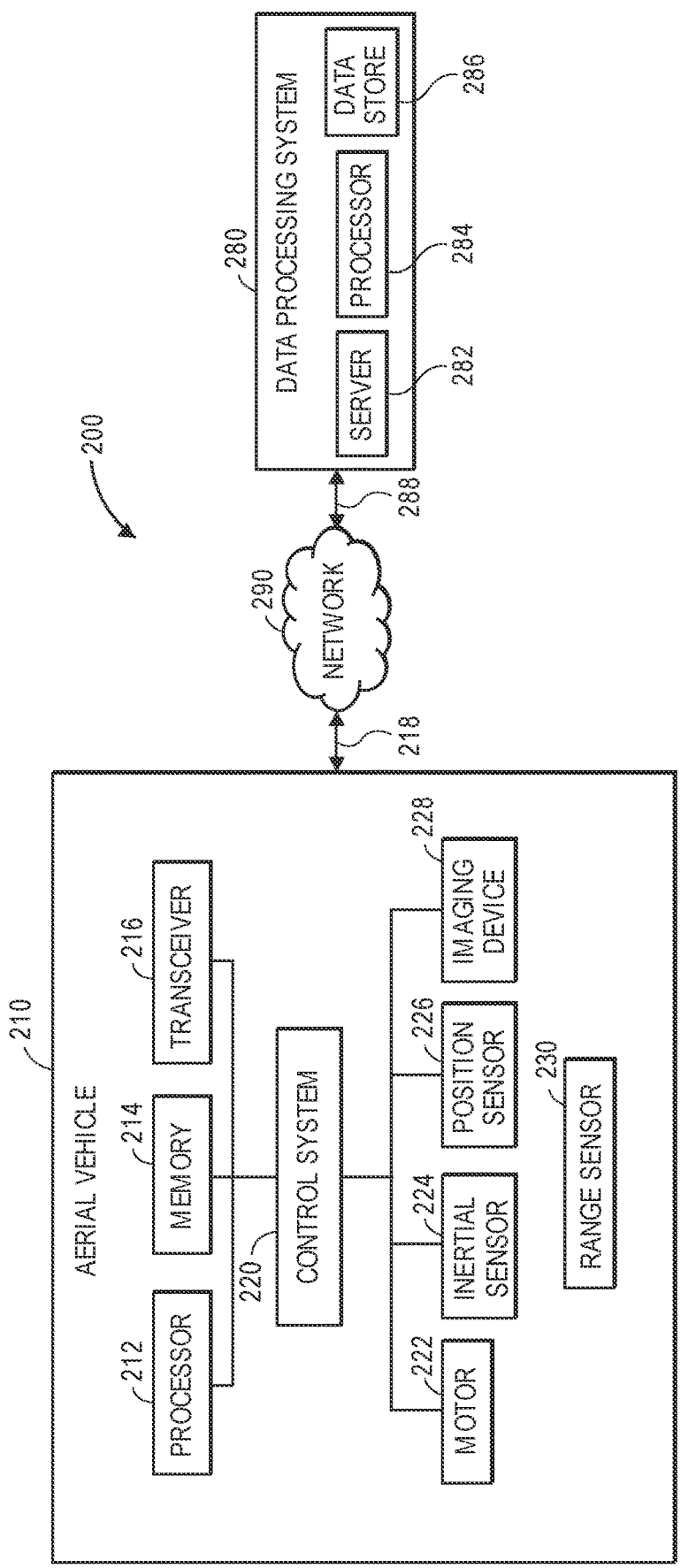
FIG. 2 is a block diagram of one system in accordance with embodiments of the present disclosure.

Referring to FIG. 2, a block diagram of one system in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

The aerial vehicle 210 includes a processor 212, a memory 214 and a transceiver 216. The aerial vehicle 210 further includes a control system 220, a plurality of propulsion motors 222, an inertial sensor 224, a position sensor 226 and an imaging device 228. The aerial vehicle 210 also includes one or more range sensors 230 that may be mounted or coupled to surfaces of the aerial vehicle 210.

The processor 212 may be configured to perform any type or form of computing function associated with the operation of the aerial vehicle 210, including but not limited to the execution of one or more algorithms or techniques, such as for calculating delay times for the transmission and receipt of one or more signals by the transmitter, or for determining bearings or angles from which reflected energy originated based on one or more signals received. The processor 212 may also be configured to execute any other algorithms or techniques (e.g., object detection or recognition algorithms or techniques) associated with any number of applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the inertial sensor 224, the position sensor 226 and/or the imaging device 228.

The processor 212 may also control the operation of one or more control systems or modules, such as the control system 220, for generating instructions for conducting operations of one or more of the propulsion motors 222, the inertial sensor 224, the position sensor 226 and/or the imaging device 228, or for interpreting information or data captured by one or more onboard sensors, e.g., the inertial sensor 224, the position sensor 226 and/or the imaging device 228, or others (not shown). Such control systems (or modules) 220 may be associated with one or more other computing devices or machines, and may communicate with the data processing system 280 or one or more other computer devices or aerial vehicles (not shown) over the network 290, through the sending and receiving of digital data, as indicated by line 218.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a central processing unit ("CPU"), graphics processing unit ("GPU") or a neural processing unit ("NPU") having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store information or data regarding energy transmitted by the range sensors 230, information or data regarding energy captured by the range sensors 230, or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (or "PCI") bus standard or the USB standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216, and configured to receive commands or generate and provide status updates of propeller speeds, as well as times and lengths of any adjustments.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The inertial sensor 224 may include one or more components for measuring linear and/or angular motion of the aerial vehicle 210. The inertial sensor 224 may include one or more gyroscopes (e.g., mechanical or electrical components or instruments for determining an orientation), one or more accelerometers (e.g., mechanical or electrical components or instruments for sensing or measuring accelerations), one or more compasses or other magnetometers (e.g., mechanical or electrical components or instruments for determining one or more directions with respect to a frame of reference that is fixed with respect to the surface of the Earth), or other components.

The position sensor 226 may be any device, component, system or instrument adapted to receive signals (e.g., trilateration data or information) relating to a position of the aerial vehicle 210 according to any local or global coordinate system, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

The range sensors 230 may be any devices or systems for determining ranges or distances between the aerial vehicle 210 and one or more objects. In some implementations, the range sensors 230 may include one or more time-of-flight sensors, which may comprise illuminators or other light sources (e.g., modulated light sources) that are configured to transmit light along axes or directions that are normal to and extend radially outward from surfaces of the aerial vehicle 210, and receivers that are configured to capture reflections of the light off one or more of such surfaces. Reflected light captured by the range sensors 230 may be interpreted to generate a depth image or range profile of distances between the range sensors 230 and the one or more surfaces, several times per second.

In some embodiments, one or more of the range sensors 230 may be configured to rotate an illuminator, or an axis or a direction along which the range sensors 230 transmit light, e.g., about an axis along which a geometric center or centroid of the aerial vehicle 210 or a fuselage thereof are coaligned. By rotating the illuminator or the transmissions of light about the axis, one or more of the range sensors 230 may be used to generate depth images, range profiles or other sets of distances covering three hundred sixty degrees around the aerial vehicle 210.

The range sensors 230 may also include illuminators or other light sources (e.g., modulated light sources) that are configured to transmit light along axes that are parallel to the axis along which the geometric center or centroid of the aerial vehicle 210 or a fuselage thereof are coaligned, and in opposite directions, e.g., up and down. The range sensors 230 may be further configured to capture reflections of the light transmitted thereby off one or more surfaces above or below the aerial vehicle 210, and to interpret such reflections in order to generate depth images, range profiles or other sets of distances between the range sensors 230 and the one or more surfaces, several times per second.

Alternatively, the range sensors 230 may be configured to emit acoustic signals in a single direction, or in multiple directions. For example, in some embodiments, the range sensors 230 may be configured to transmit continuous-wave (or "CW") pulses, e.g., pings, which may take the form of phase-coded transmit signals having bandwidths determined by the phase coding or frequency spread of the signals. Alternatively, in some other embodiments, the range sensors 230 may be configured to emit electromagnetic signals in one or more waves or pulses. The range sensors 230 may be configured to transmit signals at any power level, frequency (e.g., center frequency), wavelength or bandwidth, and within any total frequency range. The range sensors 230 may further include one or more receivers (or receiving elements) for receiving energy (e.g., acoustic energy or, alternatively, electromagnetic energy), or capturing information or data relating to received energy, that are configured to be mounted to a surface, e.g., one or more surfaces of the aerial vehicle 210. The range sensors 230 may be configured to receive energy at any power level, frequency (e.g., center frequency), wavelength or bandwidth, and within any total frequency range.

In addition to the inertial sensors 224, the position sensor 226, the imaging device 228, or the range sensors 230, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of the system 200 shown in FIG. 2 includes a single box for a propulsion motor 222, a single box for an altimeter 224, a single box for a position sensor 226, a single box for an imaging device 228, and a single box for a range sensor 230, those of ordinary skill in the pertinent arts will recognize that any number or type of propulsion motors, altimeters, position sensors, imaging devices or range sensors may be provided aboard the aerial vehicle 210 in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to signals transmitted by the aerial vehicle 210, along with times and relative distances to objects or estimated positions of the aerial vehicle 210 at which energy including reflections of such signals was received, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding maps, cartographic representations, or statuses of propellers or sensors, for any purpose.

The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to generate two-dimensional or three-dimensional maps or other representations of locations of objects, as determined based on angles at which signals are transmitted by the range sensors 230, or bearings or angles to objects from which energy including reflections of the signals are captured by the range sensors 230. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, or any other intrinsic or extrinsic factors, such as according to one or more traditional shortest path or shortest route algorithms.

The aerial vehicle 210 and/or the data processing system 280 may use any applications, features, or techniques to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU, a GPU or an NPU), cause the processor to perform all or a portion of the functions, services and/or methods described herein. Such computer-executable instructions, programs, software, and the like may be loaded into the memory of one or more computers using a drive mechanism associated with the computer-readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMS, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the functions, calculations, determinations or other processing steps described herein may be performed locally, e.g., by one or more computer processors provided aboard an aerial vehicle, or remotely, e.g., by one or more computer systems in communication with an aerial vehicle. For example, in some implementations, one or more processors provided aboard an aerial vehicle, e.g., the processors 212, may interpret acoustic data captured by one or more microphones provided aboard the aerial vehicle, and calculate distances, bearings or ranges to objects based on the acoustic data. In some other implementations, one or more processors provided in association with an external computer system in communication with an aerial vehicle, e.g., the servers 282, may interpret distances, bearings or ranges to objects and construct an environment map (or internal representation) of a space or area in which the aerial vehicle operated based on such distances, bearings or ranges. Alternatively, any of such functions, calculations, determinations or other processing steps may be performed aboard the aerial vehicle or by one or more back-end systems.

Figure 3A:
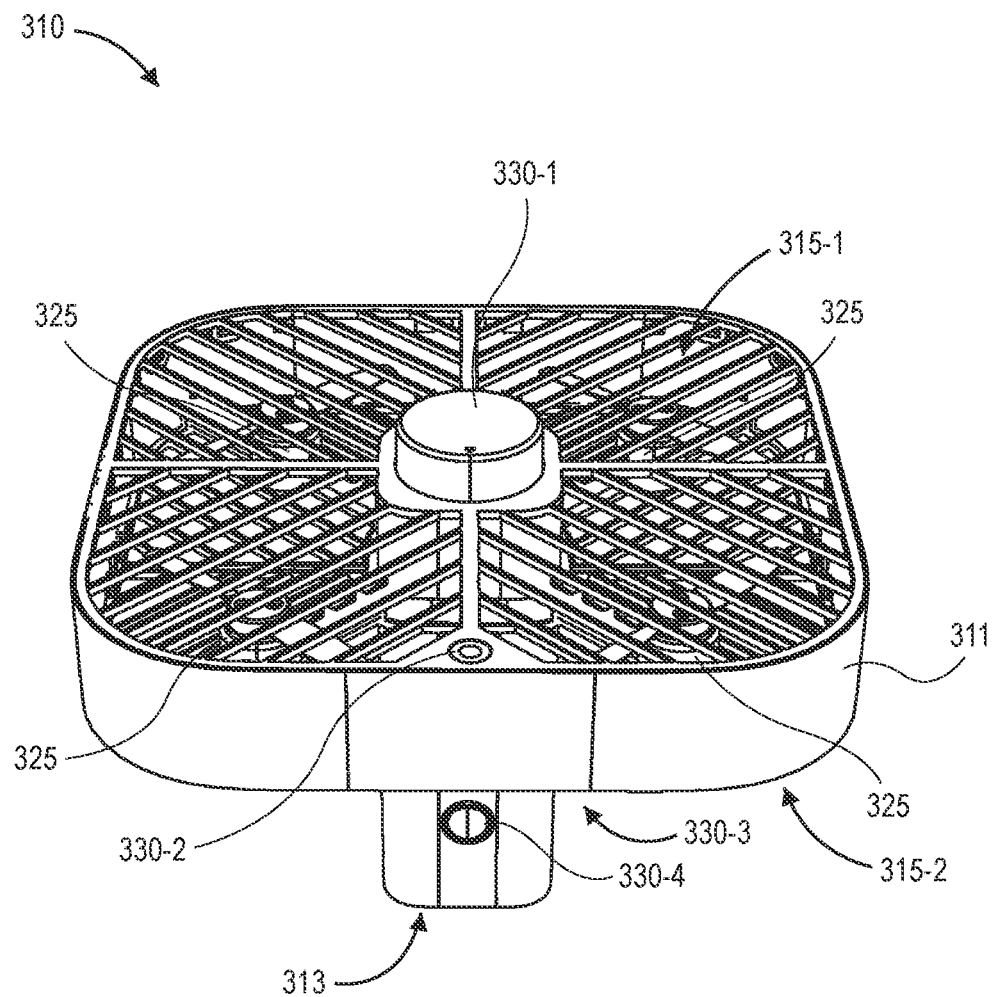
FIGS. 3A through 3C are views of aspects of one system in accordance with embodiments of the present disclosure.
Figure 3B:
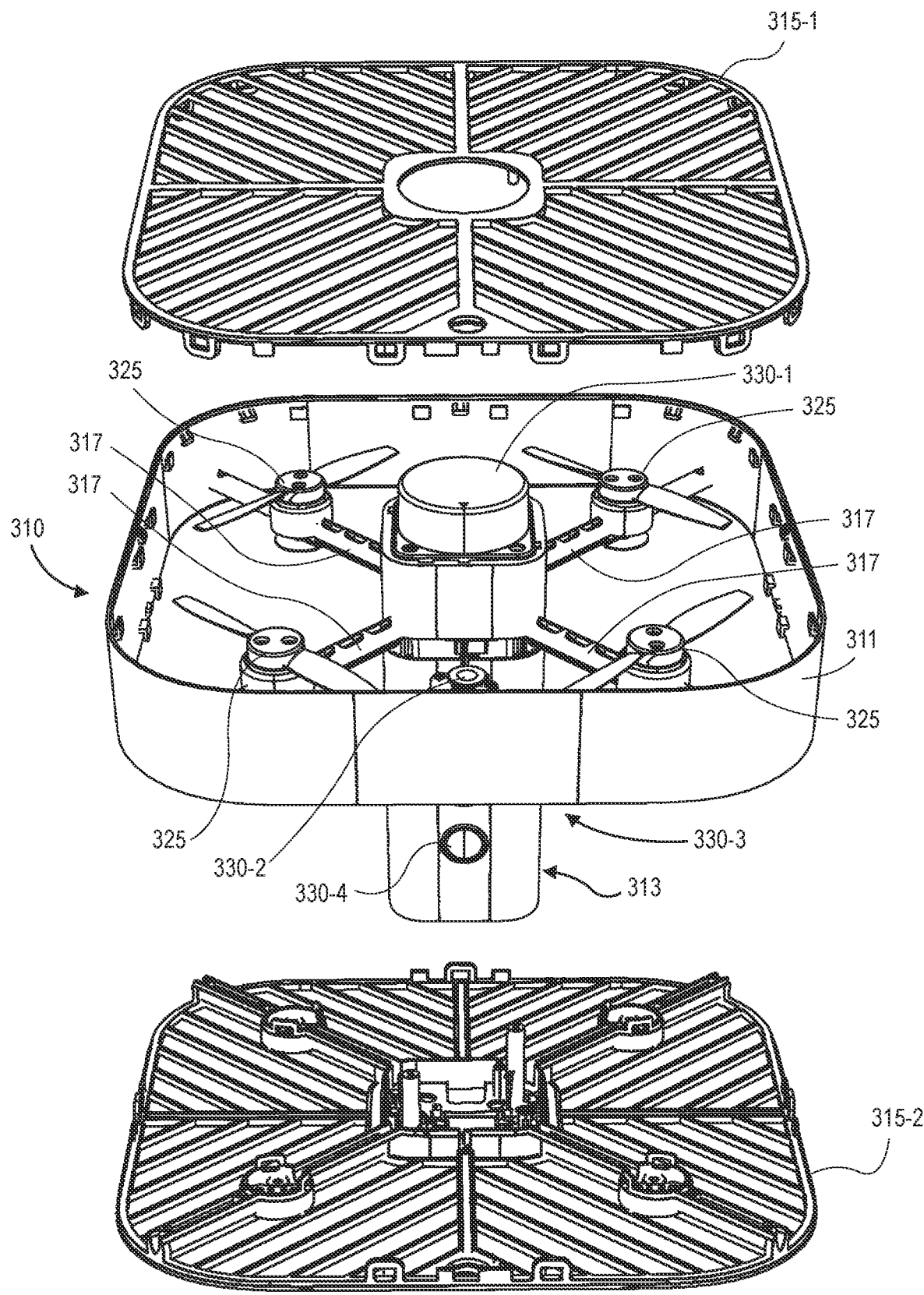
Figure 3C:
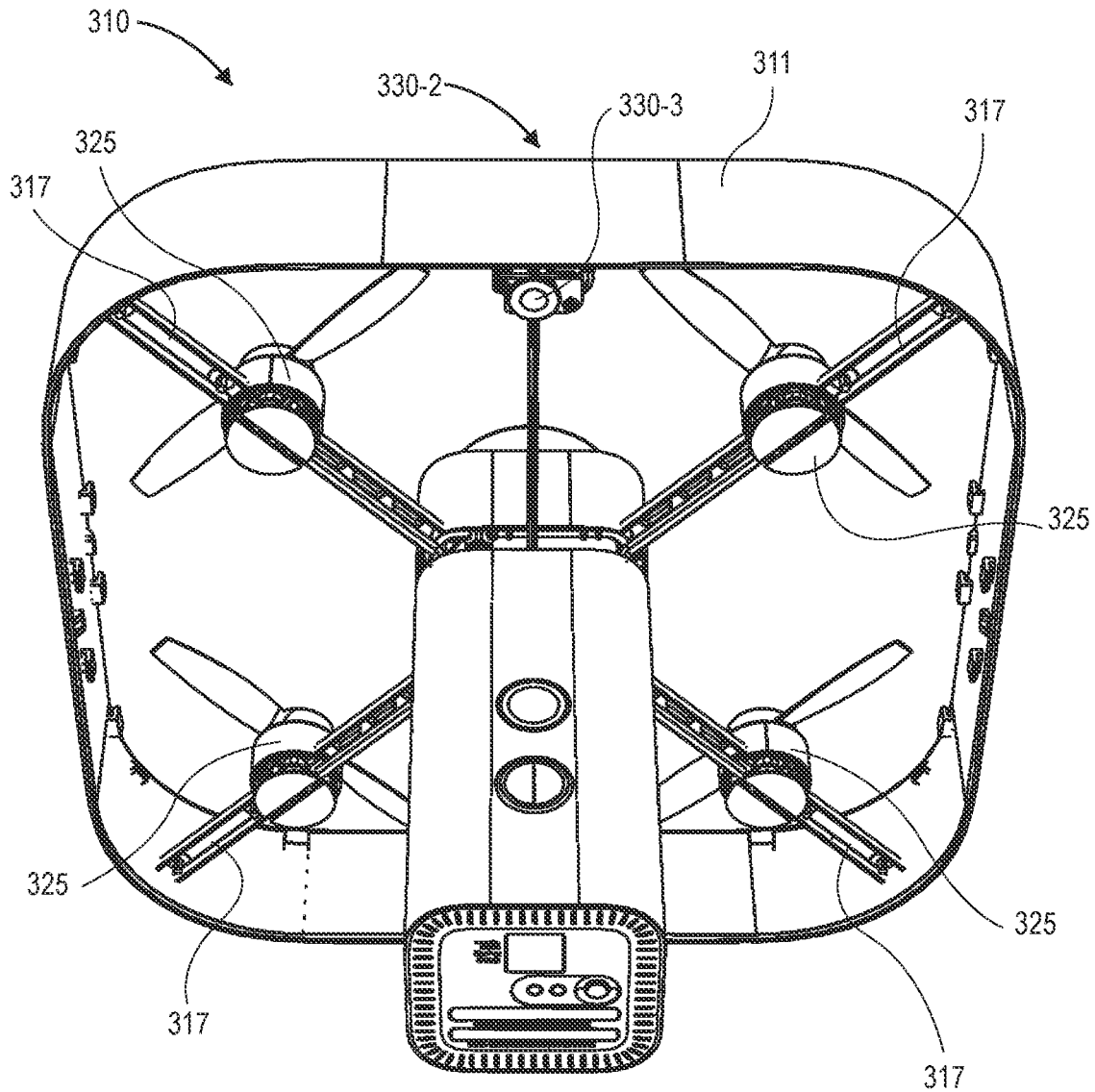

Referring to FIGS. 3A through 3C, views of aspects of one system (e.g., an unmanned aerial vehicle 310) in accordance with embodiments of the present disclosure are shown. Except where otherwise noted, reference numerals preceded by the number "3" shown in FIGS. 3A through 3C indicate components or features that are similar to components or features having reference numerals preceded by the number "2" shown in FIG. 2 or by the number "1" shown in FIGS. 1A through 1G.

FIG. 3A is a top perspective view of the aerial vehicle 310 with a top cover 315-1 and a bottom cover 315-2 mounted thereto. FIG. 3B is an exploded view of the top perspective view of the aerial vehicle 310 with the covers 315-1, 315-2 detached from the aerial vehicle 310. FIG. 3C is a bottom view of the aerial vehicle 310 with the covers 315-1, 315-2 removed therefrom.

As is shown in FIG. 3A, the aerial vehicle 310 includes a frame 311, a fuselage 313, and the pair of covers 315-1, 315-2. The frame 311 is defined by a plurality of sides (e.g., four sides) and has a common height. For example, as is shown in FIG. 3A, the frame 311 has a substantially square cross-section, e.g., a cross-section in the shape of a square with rounded corners or edges, or a squircle, with a constant height.

The fuselage 313 comprises a housing or chamber having a shape that is also defined by a plurality of sides (e.g., four sides) and a common height. For example, as is shown in FIG. 3A, the fuselage 313 also has a substantially square cross-section, e.g., a cross-section in the shape of a square with rounded corners or edges, or a squircle, with a constant height.

As is also shown in FIG. 3A, a height of the fuselage 313 is greater than a height of the frame 311. As is further shown in FIG. 3A, a length or width of the frame 311 is greater than a length or width of the fuselage 313. Alternatively, in some embodiments, the frame 311 and the fuselage 313 may have cross-sections of any other sizes or shapes, e.g., rectangles other than squares, triangles, or any other polygons, or circles or any other curvilinear shapes. In some embodiments, the frame 311 and the fuselage 313 may have the same or similar shapes, such as is shown in FIG. 3A, where each of the four sides of the frame 311 is parallel to at least one of the sides of the fuselage 313. In some other embodiments, however, the frame 311 and the fuselage 313 may have different or dissimilar shapes.

The frame 311 and the fuselage 313 are mounted to one another in a manner that causes a geometric center or centroid of a cross-section of the frame 311 to be aligned along a common axis with a geometric center or centroid of a cross-section of the fuselage 313. As is shown in FIG. 3A, the aerial vehicle 310 further includes a time-of-flight sensor module 330-1 provided at an upper end of the fuselage 313, at least partially above the frame 311, as well as a time-of-flight sensor module 330-2 provided at an upper edge of the fuselage 313, and a time-of-flight sensor module 330-3 provided at a lower edge of the fuselage 313.

The time-of-flight sensor module 330-1 may comprise an illuminator or other light source (e.g., a modulated light source) that is configured to transmit light along axes or directions that are normal to, and extend radially outward from, the axis along which the geometric center or centroid of the frame 311 and the geometric center or centroid of the fuselage 313 are coaligned. The time-of-flight sensor module 330-1 is further configured to capture reflections of the light off one or more surfaces. Reflected light captured by the time-of-flight sensor module 330-1 may be interpreted to generate a depth image or range profile of distances between the time-of-flight sensor module 330-1, and the one or more surfaces, several times per second.

In some embodiments, the time-of-flight sensor module 330-1 may be configured to rotate an illuminator, or the axis or the direction along which the time-of-flight sensor module 330-1 transmits light, about the axis along with the geometric center or centroid of the frame 311 and the geometric center or centroid of the fuselage 313 are coaligned. By rotating the illuminator or the transmissions of light about the axis along with the geometric center or centroid of the frame 311, and the geometric center or centroid of the fuselage 313 are coaligned, the time-of-flight sensor module 330-1 may be used to generate depth images, range profiles or other sets of distances covering three hundred sixty degrees around the aerial vehicle 310.

The time-of-flight sensors 330-2, 330-3 also include illuminators or other light sources (e.g., modulated light sources) that are configured to transmit light along axes that are parallel to the axis along which the geometric center or centroid of the frame 311 and the geometric center or centroid of the fuselage 313 are coaligned, and in opposite directions, e.g., up and down, with respect to the orientation of the aerial vehicle 310 as shown in FIG. 3A. The time-of-flight sensor modules 330-2, 330-3 are further configured to capture reflections of the light transmitted thereby off one or more surfaces above or below the aerial vehicle 310, and to interpret such reflections in order to generate depth images, range profiles or other sets of distances between the time-of-flight sensor modules 330-2, 330-3, and the one or more surfaces, several times per second.

The aerial vehicle 310 includes a visual camera 330-4 or other imaging device embedded or installed within the housing or chamber defined by the fuselage 313. The visual camera 330-4 has a lens and an image sensor defining a field of view extending normal to one of the sides of the fuselage 313. Alternatively, the aerial vehicle may include any number of the visual cameras 330-4, which may be provided on the same side of the fuselage 313, or on different sides of the fuselage 313. In some embodiments, the aerial vehicle 310 may include at least one visual camera 330-4 provided on each of the sides of the fuselage 313, thereby covering three hundred sixty degrees around the aerial vehicle 310. Alternatively, in some other embodiments, one or more visual cameras 330-4 may be mounted in association with the frame 311 or in any other location on the aerial vehicle 310. The housing or chamber defined by the fuselage 313 may further include any number of other components therein, including but not limited to processors, control systems, memory components, batteries or other power sources, transceivers, circuitry, or other sensors.

As is shown in FIGS. 3A and 3B, the aerial vehicle 310 further includes the top cover 315-1 and the bottom cover 315-2, which are mounted to upper and lower edges of the frame 311, respectively. The cross-sections of the covers 315-1, 315-2 have substantially the same size and shape as the frame 311, and may be joined to the upper and lower edges of the frame 311 in any manner. The covers 315-1, 315-2 may include grill-like or grated structures or features such as bars or other extensions that are distributed within planes of the covers and inhibit objects from entering into a cavity defined by the frame 311 from above or below the aerial vehicle 310. The covers 315-1, 315-2 may be aligned or provided in any manner. For example, as is shown in FIG. 3B, each of the covers 315-1, 315-2 includes four primary bars extending radially outward from a geometric center or centroid of the covers, or from the axis along which the geometric center or centroid of the frame 311 and the geometric center or centroid of the fuselage 313 are coaligned. The four primary bars are separated by approximately ninety degrees within planes defined by the respective covers 315-1, 315-2, and thereby divide such covers 315-1, 315-2 into quadrants of substantially equal area and shape.

As is also shown in FIG. 3B, the covers 315-1, 315-2 also feature secondary bars within each of the quadrants defined by the primary bars. Although secondary bars shown in FIG. 3B are aligned at forty-five degree angles with respect to the primary bars, the secondary bars of the covers 315-1, 315-2 may be aligned at any angle with respect to the primary bars, including parallel, perpendicular, or any other angle, in accordance with the present disclosure. As is further shown in FIG. 3B, the covers 315-1, 315-2 further include holes or other openings that enable light to be transmitted above or below the aerial vehicle 310 through such holes by the time-of-flight sensor modules 330-2, 330-3, and enable reflections of such light to be received through such holes by the time-of-flight sensor modules 330-2, 330-3.

As is also shown in FIGS. 3B and 3C, the aerial vehicle 310 further includes a plurality of struts 317 that join the frame 311 and the fuselage 313. For example, as is shown in FIG. 3B, each of the struts 317 includes a proximal end joined to an external surface of one of the rounded corners of the fuselage 313 and a distal end joined to an interior surface of one of the rounded corners of the frame 311. As is shown in FIGS. 3B and 3C, each of the struts 317 is of approximately equal length, and maintains the geometric center or centroid of the frame 311 in coalignment with the geometric center or centroid of the fuselage 313.

As is further shown in FIGS. 3A, 3B and 3C, the aerial vehicle 310 further includes a plurality of propulsion motors 325 that are provided within a cavity or volume defined by interior surfaces of the frame 311, exterior surfaces of the fuselage 313, and the covers 315-1, 315-2. The propulsion motors 325 may be any type or form of motors or prime movers that are configured to rotate propellers at a desired speed within the cavity or volume, thereby providing forces of lift or thrust to the aerial vehicle 310.

In accordance with embodiments of the present disclosure, the top cover 315-1 and the bottom cover 315-2 may be mounted to the upper and lower edges of the frame 311 in any manner, such as by clips, screws, bolts, snap-fit connections, or any other features. Alternatively, or additionally, the covers 315-1, 315-2 may be mounted to the fuselage 313, the struts 317, the propulsion motors 325, the time-of-flight sensor modules 330-1, 330-2, 330-3 or any other portion of the aerial vehicle 310 in any manner. Moreover, as is further shown in FIGS. 3A and 3B, the top cover 315-1 includes a substantially circular hole (or bore, or other opening) at a geometric center or centroid, thereby enabling the top cover 315-1 to be placed over and coupled to an upper edge of the frame 311, with the hole or other opening encircled around or surrounding a circumference of the time-of-flight sensor module 330-1.

As is further shown in FIGS. 3B and 3C, the propulsion motors 325 includes housings or other features that are mounted to the struts 317, at locations between the proximal ends of the struts 317 joined to the rounded corners of the fuselage 313 and the distal ends of the struts 317 joined to the rounded corners of the frame 311. The propulsion motors 325 may be any type or form of motor, including but not limited to electric, gasoline-powered or other types of motors, that are capable of generating sufficient rotational speeds of one or more propellers or other components and providing thrust and/or lift forces to the aerial vehicle 310. In some embodiments, one or more of the propulsion motors 325 may be a brushless direct current ("DC") multi-phase motor such as an outrunner brushless motor or an inrunner brushless motor. In some embodiments, one or more of the propulsion motors 325 may be a brushed DC motor.

Furthermore, the frame 311, the fuselage 313, the covers 315-1, 315-2 and the struts 317, or external portions of housings of the propulsion motors 325, or any other components of the aerial vehicle 310, may be formed as single pieces, or as two or more pieces, that may be joined together or combined to form such components. For example, as is shown in FIG. 3B, the struts 317 may be substantially hollow or open channels that are closed or defined at least in part when the bottom cover 315-2 is mated with an upper portion of the fuselage 313. As is also shown in FIG. 3B, in some embodiments, the bottom cover 315-2 forms a portion of the housings of each of the propulsion motors 325. In some other embodiments, however, the struts 317 may be closed channels that extend between the fuselage 313 and the housings of the propulsion motors 325 or the frame 311.

In some embodiments, the top cover 315-1, the bottom cover 315-2 and one or more portions of the fuselage 313 may be mated together in a manner that defines a cavity or volume that includes the propulsion motors 325 and any rotating propellers therein. For example, as is shown in FIG. 3B, the top cover 315-1 and the bottom cover 315-2 may be configured for mounting to an upper portion of the fuselage 313, thereby defining the cavity or the volume within which the propulsion motors 325 may operate to rotate one or more propellers. A lower portion of the fuselage 313 including the visual camera 330-4 and any number of other components therein, e.g., processors, control systems, memory components, batteries or other power sources, transceivers, circuitry, or other sensors, may be mounted to an underside of the bottom cover 315-2. Alternatively, in some embodiments, the fuselage 313 may be formed as a single, integral unit. In such embodiments, the bottom cover 315-2 may include a substantially square hole (or bore, or other opening) at a geometric center or centroid, thereby enabling the bottom cover 315-2 to be placed over the fuselage 313, such that the fuselage 313 is inserted through the hole, prior to coupling the bottom cover 315-2 to a lower edge of the frame 311.

The unmanned aerial vehicles of the present disclosure may be formed from materials of any type or form. For example, in some embodiments, one or more of the frame 311, the fuselage 313, the covers 315-1, 315-2 and the struts 317, or external portions of housings of the propulsion motors 325, may be formed from one or more polycarbonates, or from one or more styrenes, e.g., polystyrenes or acrylonitrile butadiene styrenes (or "ABS"), or blends thereof, including but not limited to blends of polycarbonates and ABS. Alternatively, or additionally, one or more of the frame 311, the fuselage 313, the covers 315-1, 315-2 and the struts 317, or external portions of housings of the propulsion motors 325, may be formed from any other lightweight, durable materials such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

Figure 4A:
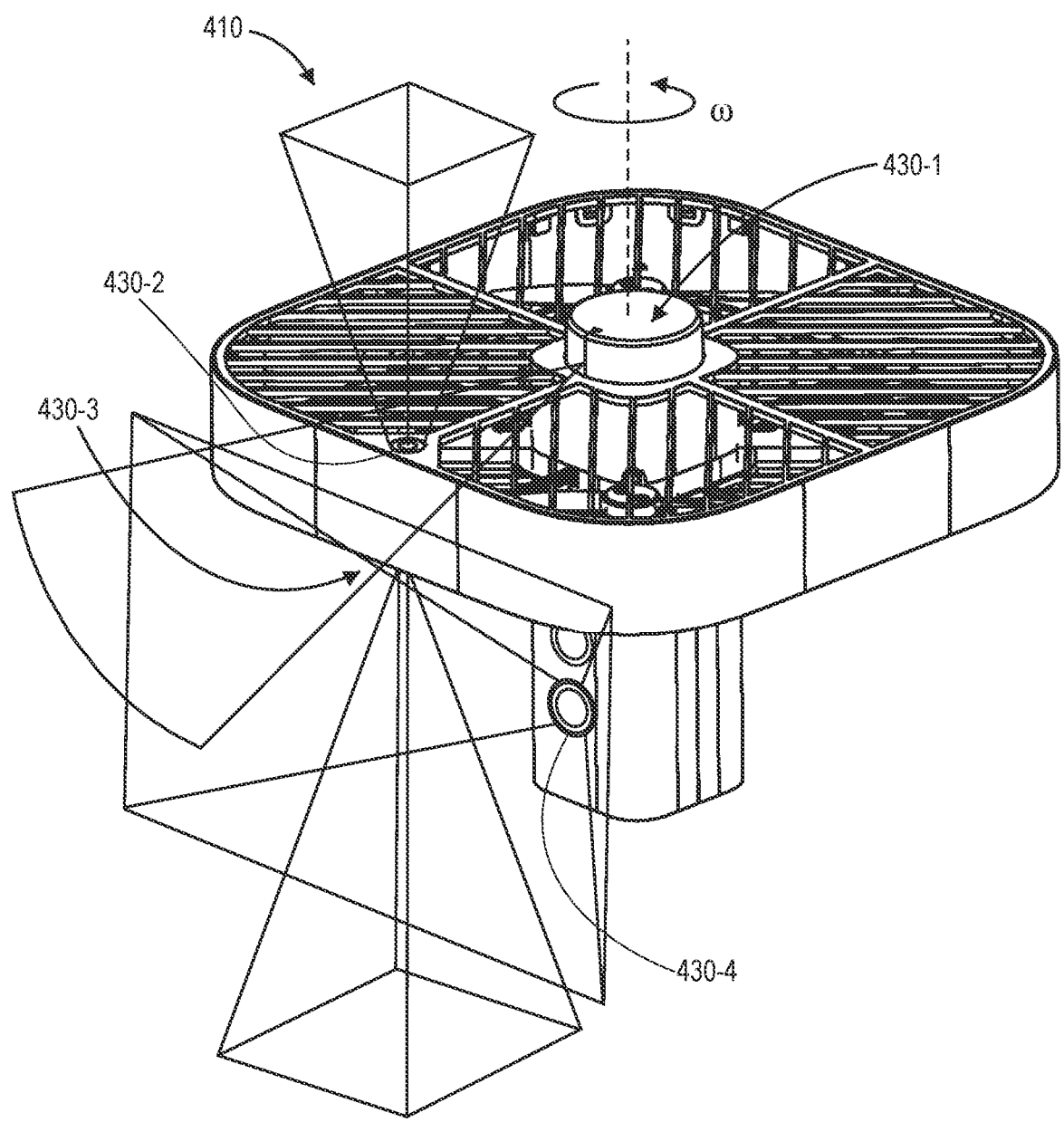
FIGS. 4A through 4C are views of aspects of one system in accordance with embodiments of the present disclosure.
Figure 4B:
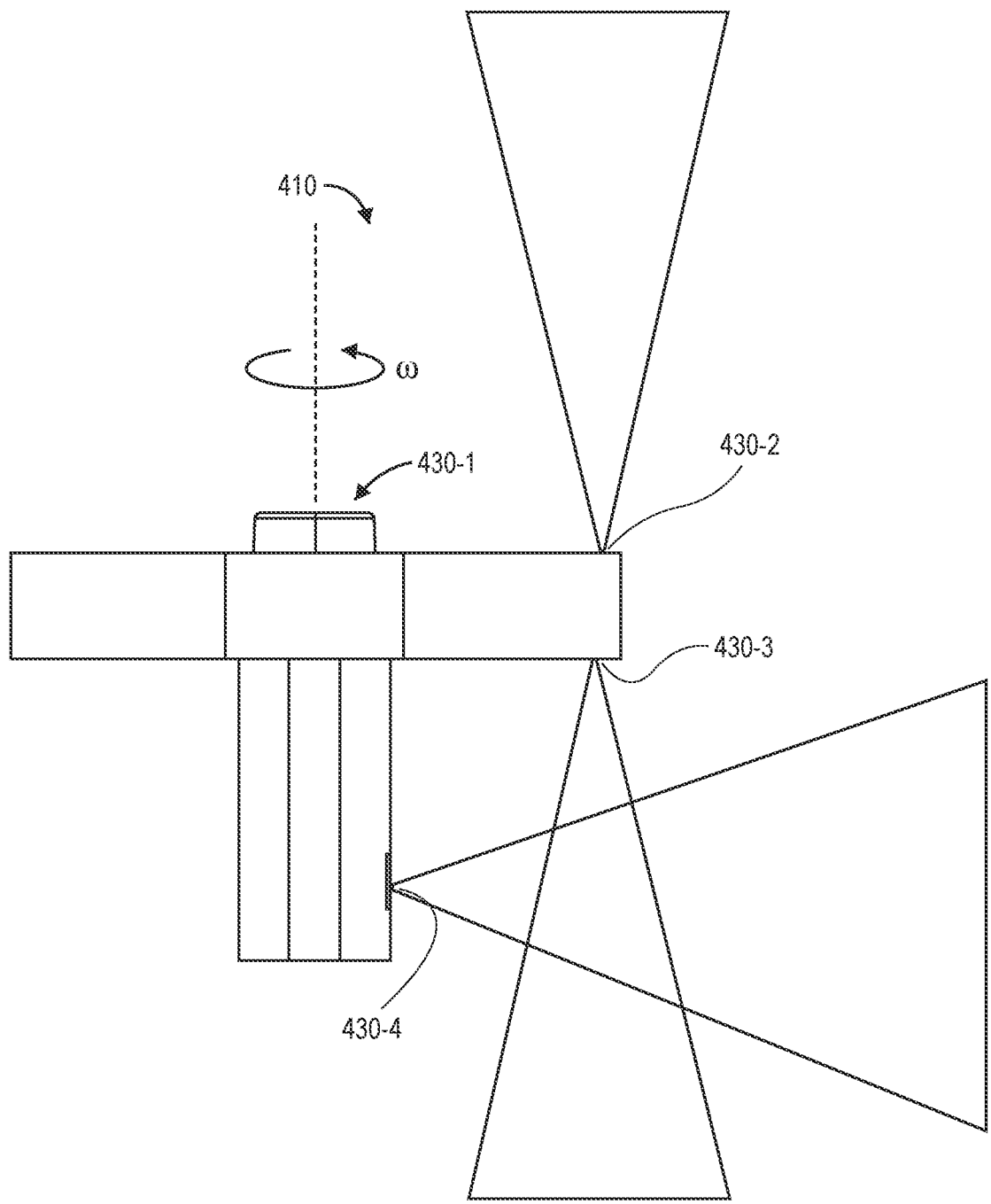
Figure 4C:
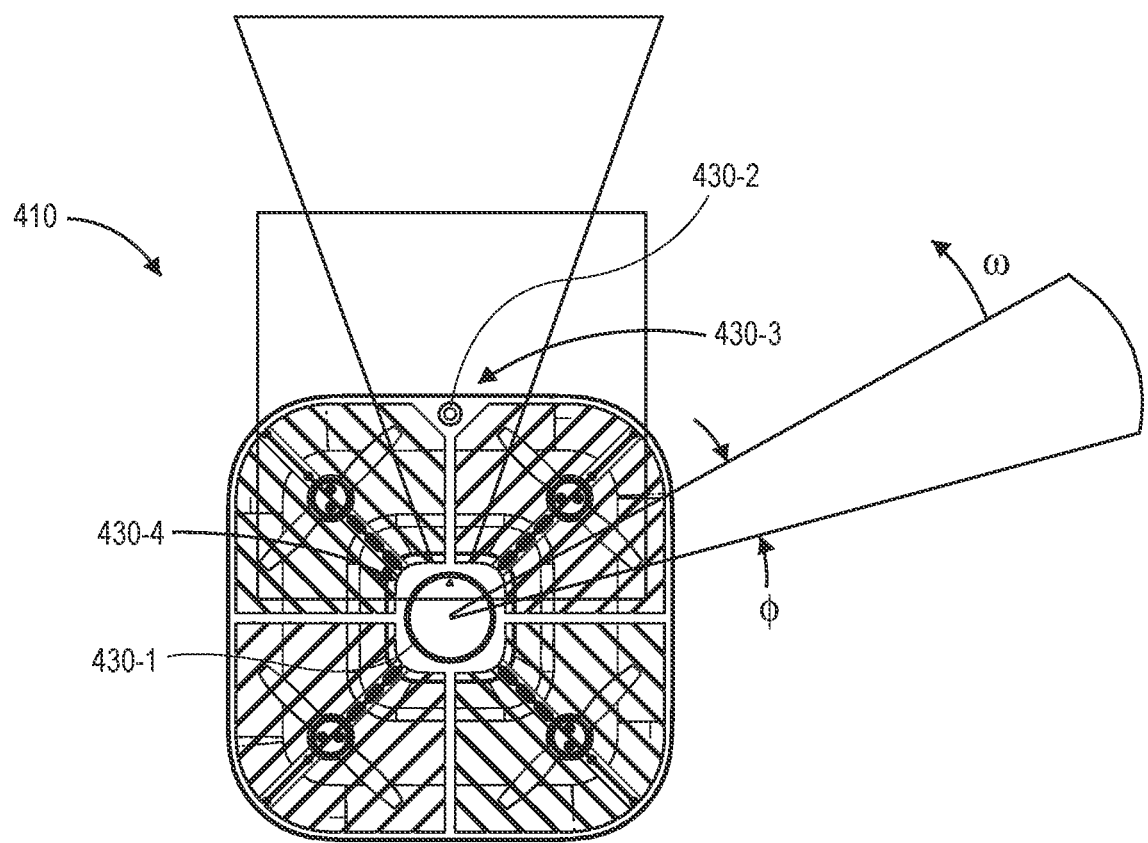

Aerial vehicles of the present disclosure may be operated in any manner to capture information or data, e.g., distances or ranges to surfaces of objects above, below or around the aerial vehicles, as well as images of their surroundings, or any other information or data. Referring to FIGS. 4A through 4C, views of aspects of one system (e.g., an aerial vehicle 410) in accordance with embodiments of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A through 3C, by the number "2" shown in FIG. 2 or by the number "1" shown in FIGS. 1A through 1G.

As is shown in FIGS. 4A through 4C, the aerial vehicle 410 includes range sensors 430-1, 430-2, 430-3, 430-4. One or more of the range sensors 430-1, 430-2, 430-3, 430-4 may be a time-of-flight sensor, a LIDAR sensor, an imaging device, a radar sensor, a sonar sensor, or any other type or form of sensors.

The range sensor 430-1 extends above the aerial vehicle 410 and is configured to transmit light on axes or directions that may rotate at any angular velocity @, such as ten revolutions per second, relative to the fuselage 413. The range sensors 430-2, 430-3 are configured to transmit light in fixed axes or directions above and below the aerial vehicle 410, respectively. The range sensor 430-4 extends radially outward from the fuselage 413, and is configured to transmit light on a fixed axis or direction relative to the fuselage 413. In some implementations, one or more of the range sensors 430-1, 430-2, 430-3, 430-4 may be or include additional sensors or components. Alternatively, one or more of the range sensors 430-1, 430-2, 430-3, 430-4 may be replaced by other sensors or components.

In some implementations, fields of view of the range sensors 430-2, 430-3, 430-4 may define any angles with respect to their axes of orientation. For example, in some implementations, the fields of view may extend from the respective range sensors 430-2, 430-3, 430-4 at angles of twenty to thirty degrees on either side of their respective axes of orientation. The range sensors 430-2, 430-3, 430-4 may thus define image planes in the shapes of squares having sides of approximately sixteen centimeters (16 cm) each at a distance of twenty centimeters (20 cm) from the respective sensors, or sides of approximately twenty-eight centimeters (28 cm) each at a distance of thirty-five centimeters (35 cm) from the respective sensors. Alternatively, the sensors 430-2, 430-3, 430-4 may define fields of view having any other angles, and with any other dimensions, in accordance with implementations of the present disclosure.

Reflections of light captured by the range sensors 430-1, 430-2, 430-3, 430-4 may be interpreted to construct depth images, range profiles or other sets of distances between the range sensors 430-1, 430-2, 430-3, 430-4 and one or more surfaces above, below or around the aerial vehicle 410, or forward of the aerial vehicle 410, several times per second.

Thus, as is shown in FIGS. 4A through 4C, the aerial vehicle 410 may be operated to travel in any direction and on any course, at any speed, and at any altitude, and may capture imaging data, e.g., reflections of light or visual images, regarding its surroundings. In some embodiments, the aerial vehicle 410 may include any other type or form of sensors, including but not limited to Wi-Fi or Bluetooth receivers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors, and may capture any type or form of information or data as the aerial vehicle 410 travels on any course, at any speed, and at any altitude.

Figure 5:
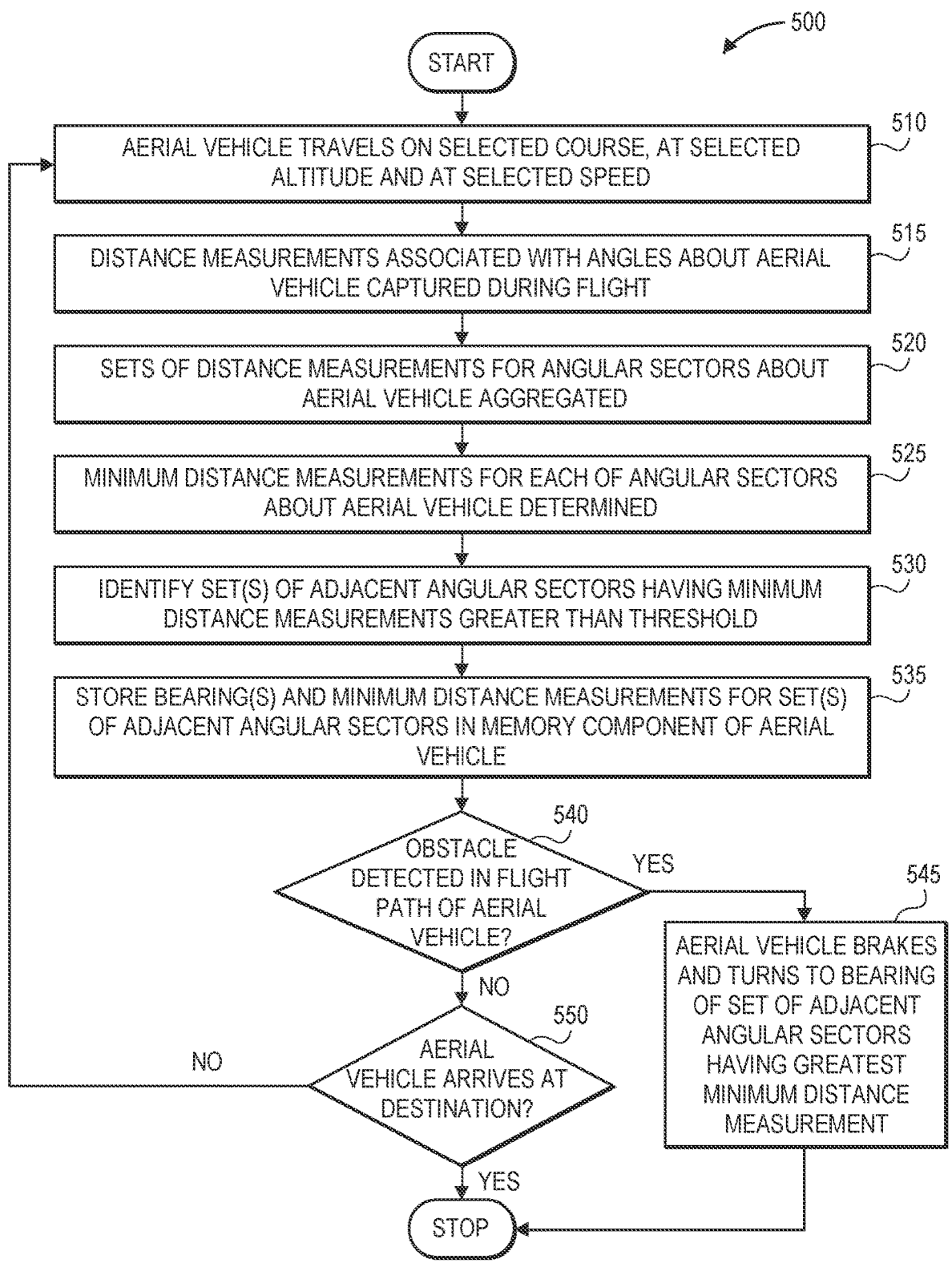
FIG. 5 is a flow chart of one process in accordance with embodiments of the present disclosure.

Referring to FIG. 5, a flow chart 500 of one process in accordance with embodiments of the present disclosure is shown.

At box 510, an aerial vehicle travels in flight on a selected course, at a selected altitude and at a selected speed. For example, the aerial vehicle may be programmed with a plurality of waypoints for traveling within one or more indoor spaces, and such waypoints may be represented in any manner, e.g., by waypoint data or spatial point data including one or more sets of coordinates in three-dimensional space. The waypoints may be associated with any mission to be executed by aerial vehicles within the indoor spaces in general, or by the aerial vehicle in particular.

The aerial vehicle may calculate a trajectory for traveling along paths between the plurality of waypoints, e.g., to minimize snap at a safe speed. For example, the aerial vehicle may calculate a trajectory that calls for travel at a safe speed, beginning from a velocity of zero at a position in three-dimensional space corresponding to an initial waypoint and ending at a velocity of zero at a position in three-dimensional space corresponding to the final waypoint. A trajectory may also include, for each defined point in three-dimensional space forming part of the trajectory, a time value indicating a time at which the trajectory passes through that point (e.g., a time at which an aerial vehicle following that trajectory should pass through that point). Thus, a trajectory may be characterized as defining points in four-dimensional space-time.

A control system or another processor-driven system aboard the aerial vehicle may then generate and transmit one or more instructions or commands for causing the aerial vehicle to travel on a calculated trajectory, e.g., at one or more selected courses, speeds or altitudes. In some implementations, the aerial vehicle may generate commands or instructions at any rate or frequency, e.g., ten times per second, or at ten Hertz (10 Hz), and execute such commands or instructions to operate one or more motors or control surfaces accordingly.

At box 515, distance measurements around the aerial vehicle are determined based on data captured by the aerial vehicle in flight. In some implementations, the aerial vehicle may be outfitted or equipped with one or more range sensors, such as LIDAR sensors, imaging devices, radar sensors, sonar sensors, or others, that are configured to calculate distances to objects at an angular range of three hundred sixty degrees about the respective sensors, and at any maximum measuring radii, e.g., twelve meters (12 m) or more. Such range sensors may be configured to transmit light at any measurement frequency, e.g., up to 4,500 Hertz (or 4,500 measurements per second), and the transmitted light may be infrared light, or light at any other wavelength or frequency. The range sensors may transmit light in single directions, and capture or receive reflections of the light from one or more objects. Differences between times at which light is transmitted, and times at which reflections of the light are received, are commonly called "times-of-flight," and may be used with the speed of light to calculate distances to objects from which the light was reflected. Such range sensors may emit light at wavelengths of approximately 905 nanometers, e.g., within an infrared band, and at a power of approximately twenty-five milliwatts (25 mW), or at any other wavelengths or power levels.

The distance measurements may be stored in one or more memory components of the aerial vehicle in association with a state of the aerial vehicle, e.g., a velocity at which the aerial vehicle is traveling when the distance measurements are determined, or a position where the aerial vehicle is located when the distance measurements are determined. In some implementations, the distance measurements may be determined for an entire perimeter or circumference around the aerial vehicle. Alternatively, the distance measurements may be determined for less than the entire perimeter or circumference around the aerial vehicle, e.g., for one or more sectors, areas or zones that may be located or defined with respect to a direction of travel of the aerial vehicle, or with respect to one or more principal axes of the aerial vehicle, e.g., a range sensor access generally parallel to a yaw axis of the aerial vehicle. In some implementations, the distance measurements may be determined for an area or zone defined by a predetermined range or distance forward or aft of the aerial vehicle, and within an arc or a sector having a radius of the predetermined range or distance that subtends a predetermined angle on either side of a direction of travel of the aerial vehicle, or with respect to one or more principal axes of the aerial vehicle, e.g., a roll axis or a pitch axis of the aerial vehicle. For example, in some implementations, distance measurements may be determined for an area or zone that extends behind the aerial vehicle and is defined by a distance within a range of twenty-five to fifty centimeters (25-50 cm), and an arc or sector subtending an angle of one hundred twenty degrees (120°), or sixty degrees (60°) on either side of a predetermined axis extending opposite a direction of travel of the aerial vehicle.

Alternatively, the aerial vehicle may be configured to determine or calculate distance measurements around the aerial vehicle in any other manner. For example, in some implementations, the aerial vehicle may include one or more speakers (or other acoustic emitters) and microphones (or other acoustic sensors) provided in any location. The speakers may be configured to convert electrical signals into acoustic energy of any intensity and across any or all frequencies, which may be emitted as sound or other acoustic energy, and reflected or scattered on any surfaces of objects, while the microphones may capture and interpret reflections of the acoustic energy. Distances between the aerial vehicle and objects from which the reflections are received may be determined by dividing a product of one half of a speed of sound in air, and a difference between times at which sounds were emitted and times at which reflections of the sounds were captured. The aerial vehicle may include any number of other systems or sensors for determining distances to objects in accordance with implementations of the present disclosure.

In some implementations, reflections of light captured by a range sensor may be determined and clustered based on their respective ranges and angles from positions of the aerial vehicle. A position of an object may be determined based on the clusters, with respect to their positions according to any local or global coordinate system. Where distance measurements are determined based on returns captured by a sensor (e.g., a LIDAR sensor) having a field of view that rotates relative to the aerial vehicle, clusters of returns that are detected in one pass, sweep or other operation of the sensor may be compared to clusters of returns that are detected in subsequent passes, sweeps or operations of the sensor. Where clusters of returns are substantially similar, e.g., in both range and angle, the clusters may be identified as representing a common object. Moreover, where clusters of returns identified in consecutive passes, sweeps or operations of a sensor have substantially similar shapes or sizes, the clusters may be identified as representing a common object. In some implementations, an object from which the clusters of returns are received may be classified or identified based on a shape or a size of returns received from the object. For example, where returns from an object have a shape or a size consistent with a shape or a size of a body part of a human or another animal, the object may be classified accordingly. Conversely, where a single return or a cluster of fewer than a predetermined number of returns detected in one pass, sweep or operation of a sensor is not detected in a subsequent pass, sweep or operation of the sensor, the return or returns may be disregarded as corresponding to a "phantom" object.

At box 520, sets of distance measurements for angular sectors about the aerial vehicle are aggregated. The angular sectors may be defined as having any widths or resolutions, such as one degree (1°), five degrees (5°), ten degrees (10°), or any other width or resolution. For example, where the aerial vehicle is outfitted with a LIDAR sensor having a planar field of view with a fixed angular width that may rotate at any angular velocity relative to one or more principal axes of the aerial vehicle, returns of reflected light may be downsampled or decimated into bins or other angular sectors having five-degree (5°) widths.

In some implementations, the sets of distance measurements for angular sectors may be determined or aggregated following a single pass, sweep or operation of a LIDAR sensor. Alternatively, in some other implementations, sets of distance measurements for angular sectors may be determined or aggregated following a predetermined number of passes, sweeps or operations of a LIDAR sensor, e.g., based on a common set of consecutive returns for each of such sectors.

At box 525, minimum distance measurements are determined for each of the angular sectors about the aerial vehicle. For example, where distance measurements are determined based on returns of reflected light captured by a LIDAR sensor, a minimum distance measurement within each of the respective bins or other angular sectors may be identified and stored in association with the respective bins or angular sectors, e.g., in one or more memory compartments of the aerial vehicle.

At box 530, one or more sets of adjacent angular sectors having minimum distance measurements above a predetermined threshold are identified. For example, in some implementations, sets of adjacent angular sectors or bins may be defined as having minimum distances in excess of a single predetermined threshold, e.g., thirty centimeters (30 cm), or any other thresholds. Alternatively, sets of adjacent angular sectors or bins may be defined as having minimum distances in excess of other predetermined thresholds, e.g., not only thirty centimeters (30 cm) but also twenty centimeters (20 cm), ten centimeters (10 cm), or any other threshold. Moreover, based on the distances associated with the respective angular sectors or bins, positions of any number of objects may be determined with respect to a position of the aerial vehicle, e.g., ranges and angles, according to any local or global coordinate system.

At box 535, bearings and minimum distance measurements for the sets of adjacent angular sectors identified at box 530 are stored in one or more memory components of the aerial vehicle. For example, a set of adjacent angular sectors or bins may be defined between a bearing corresponding to a first angular sector or bin of the set, and a bearing corresponding to a last angular sector of the set. A bearing for a set of adjacent angular sectors or bins may be defined based on a center or middle angular sector or bin of the set, or a line bisecting an angle between bearings corresponding to first and last angular sectors of the set. Moreover, a minimum distance measurement of a set of adjacent angular sectors may be identified as the smallest minimum distance of any of the angular sectors or bins of the set.

At box 540, whether an object is detected in a flight path of the aerial vehicle is determined. An aerial vehicle may detect one or more stationary or mobile objects in any manner. For example, in some implementations, an object may be detected where a predetermined number of returns from a range sensor indicate that the object is within a predetermined range of the aerial vehicle. A range sensor by which an object is detected may be the same sensor from which distance measurements were determined at box 515, or a different sensor. In some implementations, an object may be detected where a predetermined number of consecutive returns indicates the presence of the object within the predetermined range, e.g., ten returns at a ten Hertz (10 Hz) frequency, or for one second. Alternatively, the object may be detected using an imaging device, or any other sensor.

In some implementations, an object may be detected in accordance with an algorithm that considers or defines multiple states of risk or readiness for the aerial vehicle. For example, the aerial vehicle may be determined to be in a first state, e.g., a low-risk state, where no objects are detected within a first range or distance, e.g., a maximum range or distance, and may operate in an unrestricted manner while in the first state. Alternatively, the aerial vehicle may be determined to be in a second state, e.g., a medium-risk state, where one or more objects are detected within the first range or distance, but beyond a second range or distance, e.g., a minimum range or distance, for a predetermined number of consecutive passes, sweeps or operations of a sensor. The aerial vehicle may operate subject to one or more restrictions on speed or altitude, or any other aspect of operations, while in the second state. The aerial vehicle may be determined to be in a third state, a high-risk state, where one or more objects are within the second range or distance, which may be defined based on a maximum speed and latency of the aerial vehicle. The aerial vehicle may operate only as necessary, and with strict restrictions on speed or altitude, or any other aspect of operations, while in the third state. Alternatively, any number of states may be defined with respect to any levels of risk or readiness for the aerial vehicle, and the aerial vehicle may operate subject to any restrictions associated with such states.

Additionally, where a position and a velocity of the aerial vehicle are known at a time that an object is detected, a position of the object may be determined based on a distance or range and angle to the object. Positions of objects may be stored in one or more memory components provided aboard the aerial vehicle, or transmitted to one or more external systems, which may be provided in one or more alternate or virtual locations, e.g., in a "cloud"-based environment. Furthermore, aspects of motions of an object, e.g., velocities or accelerations, or others, may be determined where the object is represented in a cluster of returns and detected within consecutive or multiple passes, sweeps or operations of a sensor.

If an object is not detected in the flight path of the aerial vehicle, then the process advances to box 550, where whether the aerial vehicle has arrived at a destination is determined. If the aerial vehicle has arrived at the destination, then the process ends. If the aerial vehicle has not arrived at the destination, however, then the process returns to box 510, where the aerial vehicle continues to travel on a selected course, at a selected altitude and at a selected speed, and to box 515, where distance measurements around the aerial vehicle are determined based on data captured by the aerial vehicle in flight.

If an object is detected in the flight path of the aerial vehicle, then the process advances to box 545, where the aerial vehicle brakes and turns to a bearing of the set of adjacent angular sectors having a greatest minimum distance measurement, and the process ends. Where information regarding the sets of adjacent angular sectors or bins including their respective minimum distances and bearings is known, and the aerial vehicle detects an object within its flight path, the aerial vehicle may select one of the sets of adjacent angular sectors or bins having the greatest minimum distance, and execute one or more instructions for causing the aerial vehicle to execute a braking maneuver in order to decelerate and turn in a direction of a bearing of the selected one of the sets of adjacent angular sectors or bins. For example, in some implementations, the aerial vehicle may insert an intervening waypoint along the bearing of the selected one of the sets of adjacent angular sectors and calculate a new trajectory that calls for traveling to or through the intervening waypoint. The aerial vehicle may then execute any number of instructions for causing one or more propulsion motors, control surfaces or other features of the aerial vehicle to operate to cause the aerial vehicle to travel along the newly calculated trajectory.

Alternatively, a set of adjacent angular sectors or bins may be selected on any other basis. For example, in some implementations, a set of adjacent angular sectors may be selected based on an angular width, such that the aerial vehicle is caused to travel on a bearing toward a widest one of the sets of adjacent angular sectors.

In some implementations, the aerial vehicle may select the set of adjacent angular sectors or bins in an iterative manner. For example, where information regarding the sets of adjacent angular sectors or bins including their respective minimum distances and bearings is known, and the aerial vehicle detects an object within its flight path, the aerial vehicle may determine whether any of the sets of adjacent angular sectors has a minimum distance measurement greater than a first threshold, e.g., thirty centimeters (30 cm), and select the one of the sets having the greatest minimum distance measurement of such sets. If none of the sets has a minimum distance measurement greater than the first threshold, however, then the aerial vehicle may identify a second threshold, smaller than the first threshold, e.g., twenty-five centimeters (25 cm), and determine whether any of the sets of adjacent angular sectors has a minimum distance measurement greater than the second threshold. The thresholds may be selectively reduced, e.g., by an iterative step amount, such as five centimeters (5 cm), ten centimeters (10 cm), or others, until one of the sets of adjacent angular sectors in excess of a threshold is identified.

In some implementations, one or more steps of the flow chart 500 of FIG. 5 may be performed continuously as an aerial vehicle is engaged in flight operations. A set of adjacent angular sectors or bins may be stored in one or more memory components of the aerial vehicle and continuously updated based on data captured using one or more range sensors. When an object is detected within a flight path of the aerial vehicle, one of the sets of adjacent angular sectors may be selected, and the aerial vehicle may be caused to travel along a bearing of the selected one of the sets of adjacent angular sectors. Alternatively, in some implementations, one or more steps of the flow chart 500 of FIG. 5 may be performed upon detecting an object within a flight path of the aerial vehicle, e.g., in real time or near-real time.

Referring to FIGS. 6A through 6E, views of aspects of one system in accordance with embodiments of the present disclosure are shown. Except where otherwise noted, reference numerals preceded by the number "6" shown in FIGS. 6A through 6E indicate components or features that are similar to components or features having reference numerals preceded by the number "4" shown in FIGS. 4A through 4C, by the number "3" shown in FIGS. 3A through 3C, by the number "2" shown in FIG. 2 or by the number "1" shown in FIGS. 1A through 1G.

Figure 6A:
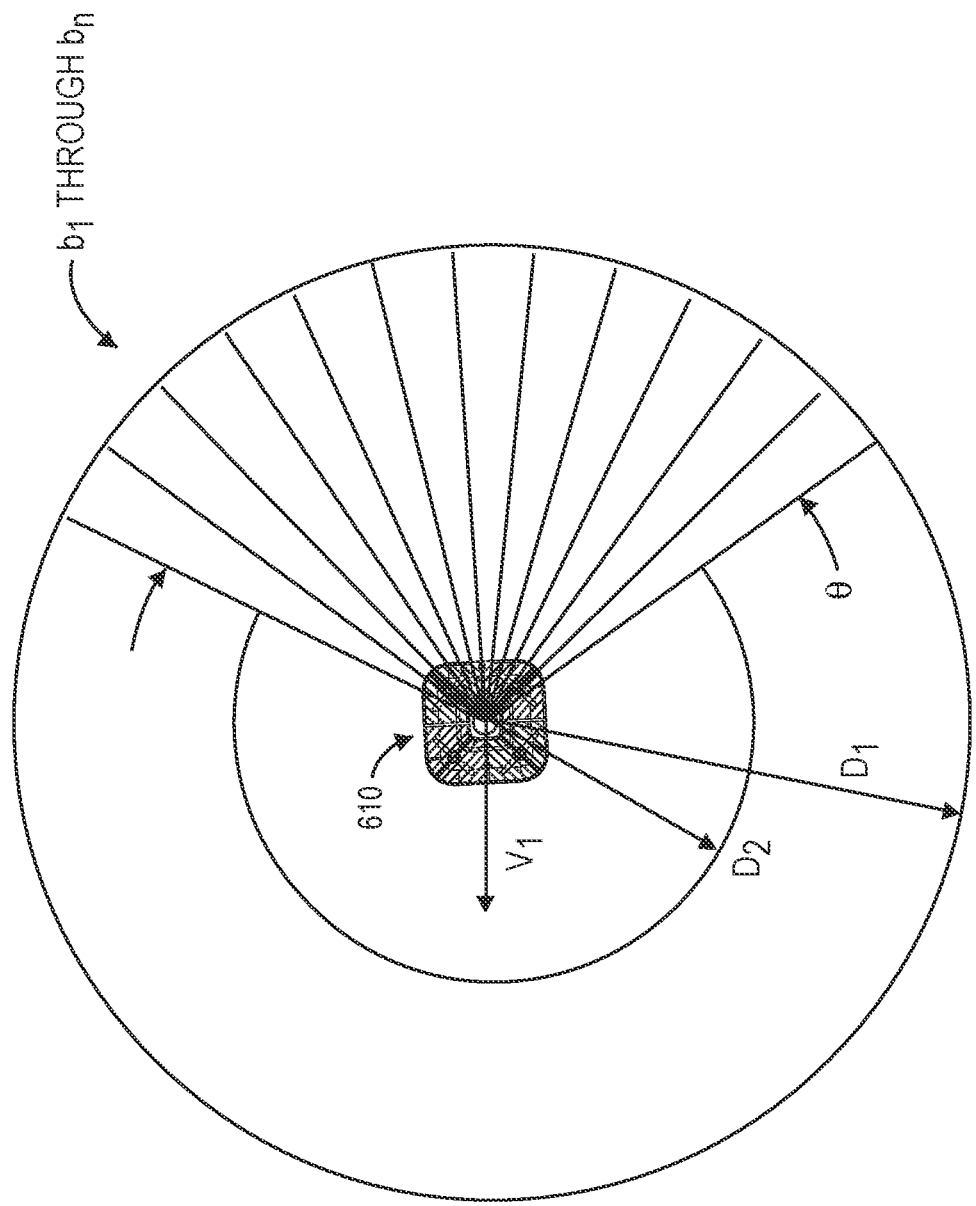

As is shown in FIG. 6A, an aerial vehicle 610 (e.g., an unmanned aerial vehicle, or drone) is traveling at a velocity $V_1$. The aerial vehicle 610 may be outfitted or equipped with one or more sensors for determining whether any stationary or mobile objects are located within a flight path of the aerial vehicle 610, e.g., based on information or data captured using one or more sensors, such as range sensors, imaging devices, radar sensors, sonar sensors, or other sensors. Additionally, the aerial vehicle 610 may be configured to monitor an area or a zone behind the aerial vehicle 610, which may be defined by an arc or sector subtending an angle θ centered on an axis opposite a direction of travel of the aerial vehicle 610, and may include a plurality of sectors, viz., $b_1$ through $b_n$.

The aerial vehicle 610 may be configured to execute any number of instructions upon detecting an object from any number of sensors. For example, upon determining that an object is detected within a predetermined range (or distance) $D_1$, the aerial vehicle 610 may begin determining distance measurements for each of a plurality of sectors within the area or zone behind the aerial vehicle 610, and identifying sets of adjacent sectors having distances above a predetermined threshold. The aerial vehicle 610 may also execute one or more instructions for reducing its speed, or for taking any other actions. Upon determining that an object is detected within a predetermined range (or distance) $D_2$ of the aerial vehicle 610, the aerial vehicle 610 may be configured to select one of the sets of adjacent sectors and execute one or more instructions for braking and turning toward a bearing of the selected one of the sets of adjacent sectors.

Figure 6B:
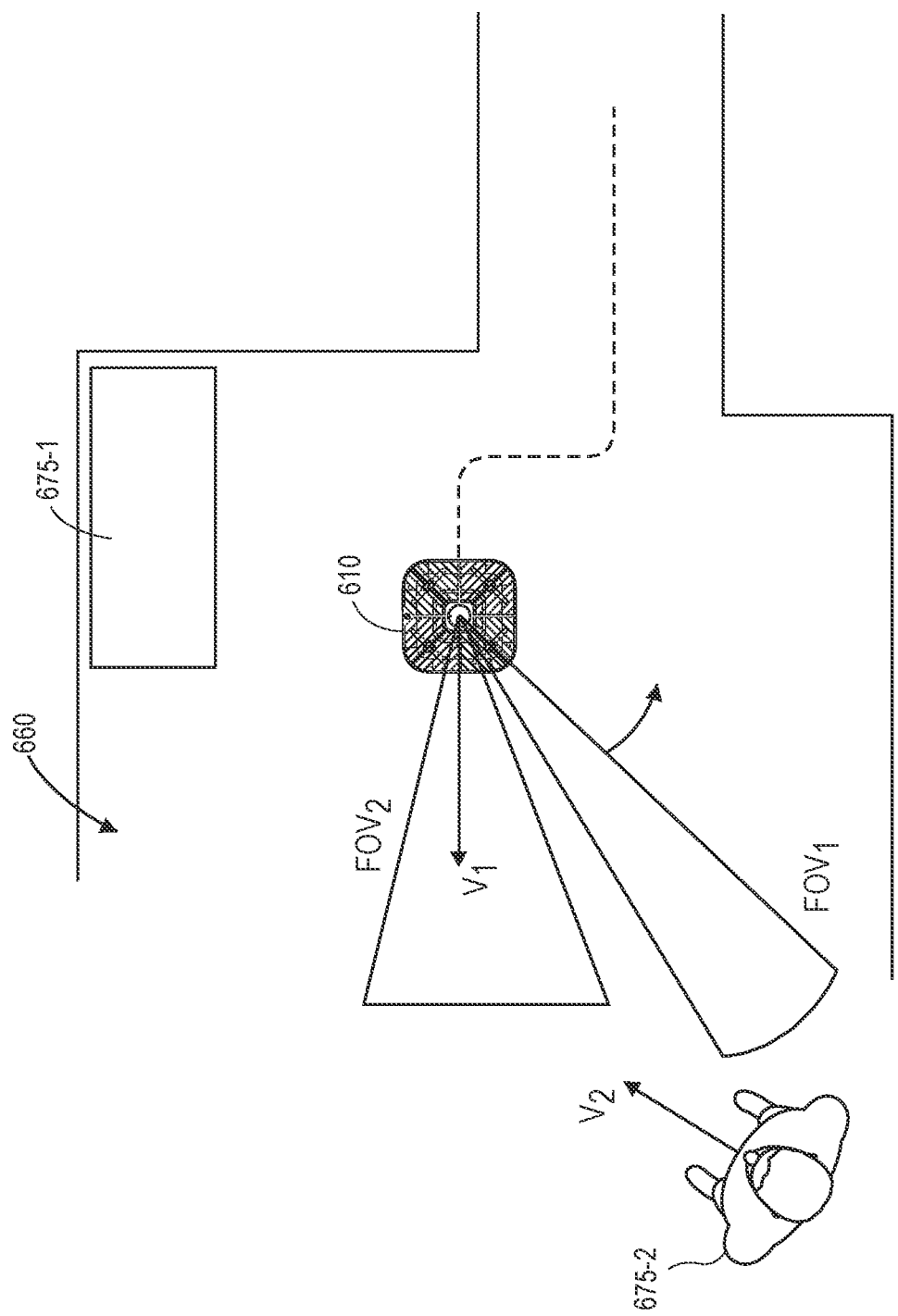

As is shown in FIG. 6B, the aerial vehicle 610 travels at the velocity $V_1$ and another obstacle 675-2 travels at a velocity $V_2$ throughout an indoor space 660 (e.g., a room and a passageway). The indoor space 660 further includes one or more obstacles, including a stationary obstacle 675-1 (e.g., a bookcase or another set of shelves) and a mobile obstacle 675-2 (e.g., a human or another animal). With the aerial vehicle 610 operating in flight, the aerial vehicle 610 searches for objects around a perimeter or circumference of the aerial vehicle 610 using the range sensor 630-1 and forward of the aerial vehicle 610 using the range sensor 630-2.

As is further shown in FIG. 6B, the aerial vehicle 610 may be outfitted with a range sensor 630-1 including a LIDAR sensor that extends above the aerial vehicle 610 and is configured to transmit light within a planar field of view $FOV_1$ having a fixed angular width that may rotate at any angular velocity relative to one or more principal axes of the aerial vehicle 610. The range sensor 630-1 may be configured to calculate distances to objects at an angular range of three hundred sixty degrees about the range sensor 630-1, and at any maximum measuring radius, e.g., twelve meters (12 m) or more. The range sensor 630-2 may be a time-of-flight sensor provided in association with a surface of a fuselage or another component of the aerial vehicle 610. The range sensor 630-2 may be configured to transmit light within a substantially pyramidal field of view $FOV_2$ having a fixed axis or direction relative to the aerial vehicle 610. Alternatively, either or both of the range sensors 630-1, 630-2 may be a time-of-flight sensor, a LIDAR sensor, an imaging device, or any other type or form of sensor, and the aerial vehicle 610 may include any number of other sensors (not shown), in any locations, axes or directions relative to the aerial vehicle 610.

Figure 6C:
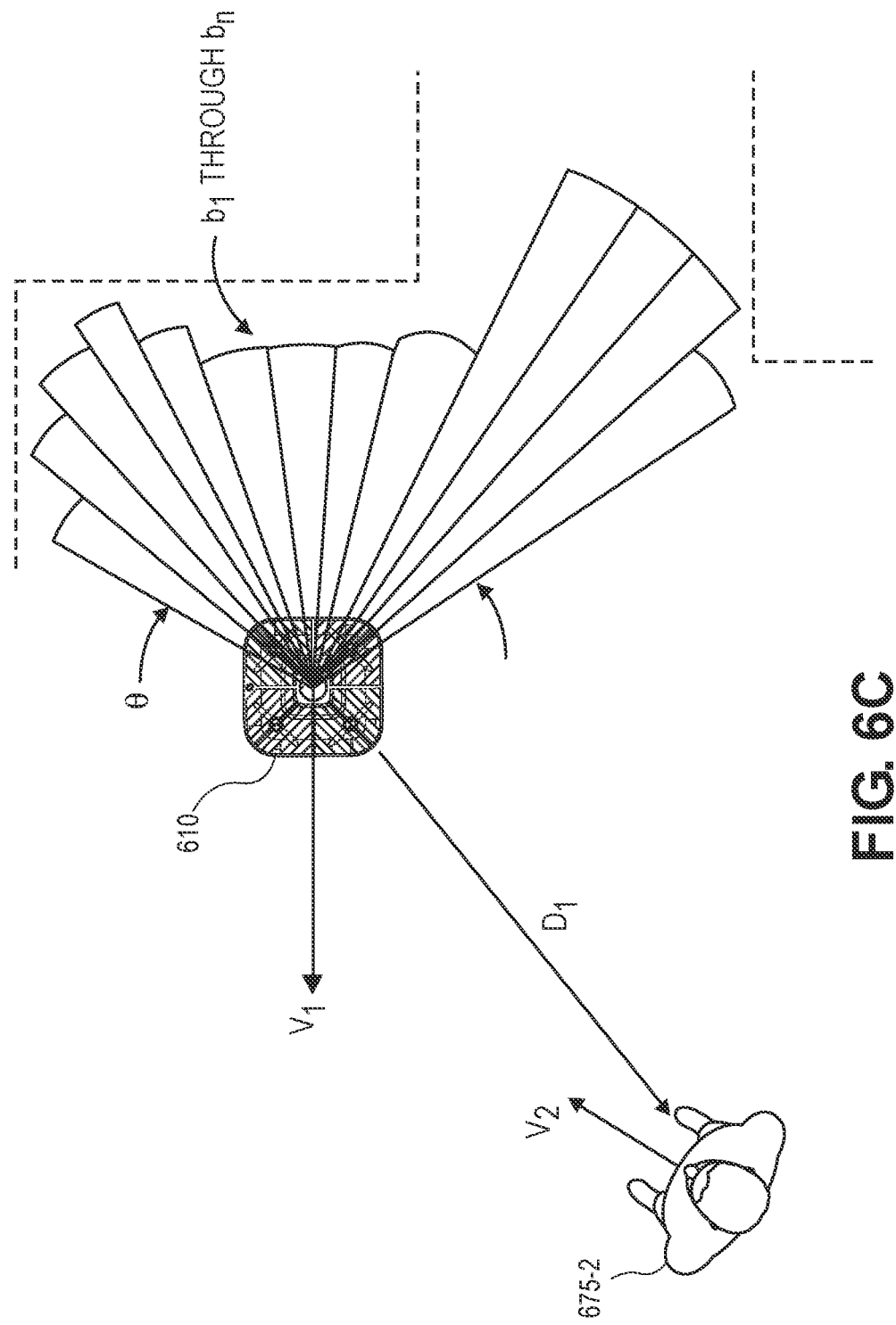

As is shown in FIG. 6C, upon determining that an object, viz., the obstacle 675-2, is within the predetermined range $D_1$, the aerial vehicle 610 determines minimum distances for each of the sectors $b_1$ through $b_n$ within the area or the zone behind the aerial vehicle 610 defined by the arc or sector subtending the angle $\theta$. For example, the aerial vehicle 610 may capture data regarding of reflected light and downsample or decimate the returns into the sectors $b_1$ through $b_n$, which may have widths of any angle, e.g., five degrees (5°). For each of the sectors $b_1$ through $b_n$, a value of a minimum distance measurement may be determined from the collected data, and stored in association with respective ones of the sectors $b_1$ through $b_n$.

Figure 6D:
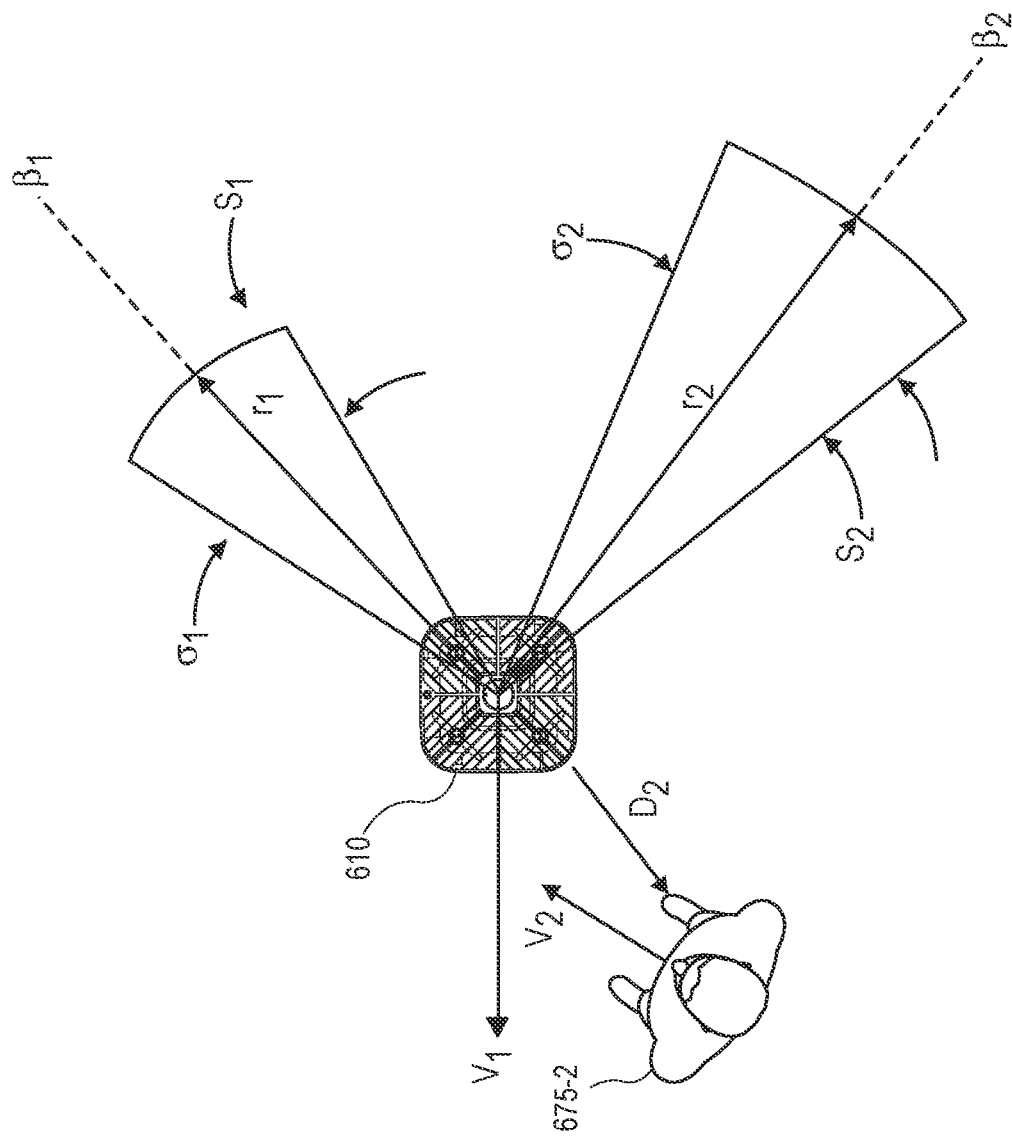

As is shown in FIG. 6D, upon determining that the object, viz., the obstacle 675-2, is within the predetermined range $D_1$, the aerial vehicle 610 identifies sets of adjacent ones of the sectors $b_1$ through $b_n$ having distances beyond a predetermined threshold. For example, as is shown in FIG. 6D, the aerial vehicle 610 determines that a set $S_1$ of the sectors $b_1$ through $b_n$ defining an angle $\sigma_1$ on a starboard side of the aerial vehicle 610 is free and clear of objects to a range (or distance) $r_1$ and identifies a bearing $\beta_1$ corresponding to the set $S_1$. The aerial vehicle 610 also determines that a set $S_2$ of the sectors $b_1$ through $b_n$ defining an angle $\theta_2$ on a port side of the aerial vehicle 610 is free and clear of objects to a range (or distance) $r_2$ and identifies a bearing $\beta_2$ corresponding to the set $S_2$. The range $r_2$ of the set $S_2$ is greater than the range $r_1$ of the set $S_1$, and the angle $\sigma_2$ of the set $S_2$ is wider than the angle $\sigma_1$ of the set $S_1$.

Subsequently, as is shown in FIG. 6E, the aerial vehicle 610 selects one of the sets $S_1$, $S_2$ of the sectors $b_1$ through $b_n$ to avoid a collision with the obstacle 675-2, viz., the set $S_2$. The aerial vehicle 610 may select the set $S_2$ on any basis, such as the range $r_2$, which is greater than the range $r_1$ of the set $S_1$, or the angle $\sigma_2$, which is wider than the angle of $\sigma_1$ the set $S_1$. The aerial vehicle 610 then executes one or more instructions for braking and turning toward the bearing $\beta_2$ corresponding to the set $S_2$ and traveling on a velocity $V_3$ in a direction of the bearing $\beta_2$. For example, where the aerial vehicle 610 is traveling on a trajectory, the aerial vehicle 610 may insert an intervening waypoint on the bearing $\beta_2$ and calculate a new trajectory that calls for traveling to or through the intervening waypoint. Alternatively, or additionally, the aerial vehicle 610 may select the velocity $V_3$ on any basis. For example, the aerial vehicle 610 may then slow to a stop, e.g., to a velocity $V_3$ of zero, or select another destination, and calculate a trajectory for traveling at the velocity $V_3$ to the other destination.

Figure 7:
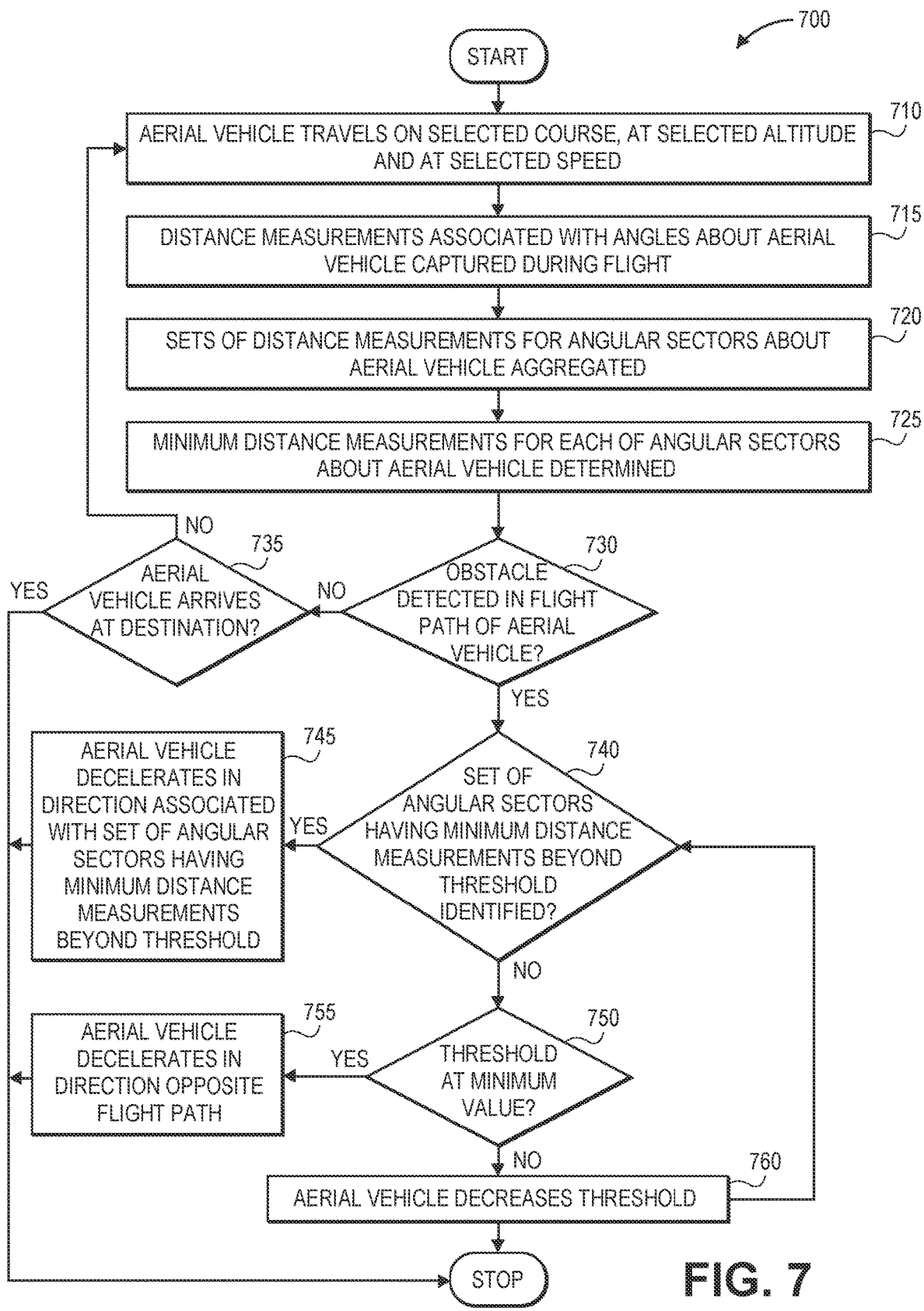
FIG. 7 is a flow chart of one process in accordance with embodiments of the present disclosure.

Referring to FIG. 7, a flow chart 700 of one process in accordance with embodiments of the present disclosure is shown.

At box 710, an aerial vehicle travels in flight on a selected course, at a selected altitude and at a selected speed. For example, the aerial vehicle may be programmed with a plurality of waypoints for traveling within one or more indoor spaces and configured to calculate a trajectory for traveling along paths between such waypoints. The aerial vehicle may further include a control system or another processor-driven system configured to generate and transmit one or more instructions or commands for causing the aerial vehicle to travel on a trajectory, and the aerial vehicle may execute such commands or instructions to operate one or more motors or control surfaces accordingly.

At box 715, distance measurements around the aerial vehicle are determined based on data captured by the aerial vehicle in flight. In some implementations, the aerial vehicle may be outfitted or equipped with one or more range sensors that are configured to calculate measurements of distances to objects around the aerial vehicle, and such distance measurements may be stored in one or more memory components of the aerial vehicle, e.g., in association with a state of the aerial vehicle. In some implementations, the distance measurements may be determined for an entire perimeter or circumference around the aerial vehicle. Alternatively, the distance measurements may be determined for less than the entire perimeter or circumference around the aerial vehicle, e.g., for one or more sectors, areas or zones that may be located or defined with respect to a direction of travel of the aerial vehicle, or with respect to one or more principal axes of the aerial vehicle, e.g., a yaw axis of the aerial vehicle.

At box 720, sets of distance measurements for angular sectors about the aerial vehicle are aggregated. The angular sectors may be defined as having any widths or resolutions, such as one degree (1°), five degrees (5°), ten degrees (10°), or any other width or resolution. For example, where the aerial vehicle is outfitted with a LIDAR sensor having a planar field of view with a fixed angular width that may rotate at any angular velocity relative to one or more principal axes of the aerial vehicle, returns of reflected light may be downsampled or decimated into bins or other angular sectors having five-degree (5°) widths.

In some implementations, the sets of distance measurements for angular sectors may be determined or aggregated following a single pass, sweep or operation of a LIDAR sensor. Alternatively, in some other implementations, sets of distance measurements for angular sectors may be determined or aggregated following a predetermined number of passes, sweeps or operations of a LIDAR sensor, e.g., based on a common set of consecutive returns for each of such sectors.

At box 725, minimum distance measurements are determined for each of the angular sectors about the aerial vehicle. For example, where distance measurements are determined based on returns of reflected light captured by a LIDAR sensor, a minimum distance measurement within each of the respective bins or other angular sectors may be identified and stored in association with the respective bins or angular sectors, e.g., in one or more memory compartments of the aerial vehicle.

At box 730, whether an object is detected in a flight path of the aerial vehicle is determined. An aerial vehicle may detect one or more stationary or mobile objects in any manner, such as where a predetermined number of returns from a range sensor indicate that the object is within a predetermined range of the aerial vehicle and in a direction of the flight path of the aerial vehicle.

If an object is not detected in the flight path of the aerial vehicle, then the process advances to box 735, where whether the aerial vehicle has arrived at a destination is determined. If the aerial vehicle has arrived at the destination, then the process ends. If the aerial vehicle has not arrived at the destination, however, then the process returns to box 710, where the aerial vehicle continues to travel on a selected course, at a selected altitude and at a selected speed, and to box 715, where distance measurements around the aerial vehicle are determined based on data captured by the aerial vehicle in flight.

If the arial vehicle has detected an object in the flight path, however, then the process advances to box 740, where whether a set of angular sectors having minimum distance measurements in excess of a threshold has been identified is determined. For example, the minimum distance measurements determined at box 725 may be compared to one another to determine whether minimum distance measurements of any adjacent angular sectors, e.g., two or more of such sectors, exceed the threshold.

If any sets of angular sectors having minimum distance measurements in excess of the threshold are identified, then the process advances to box 745, where the aerial vehicle decelerates in a direction associated with a set of the angular sectors having minimum distance measurements beyond the threshold. For example, the aerial vehicle may execute a braking maneuver or otherwise decelerate in a direction associated with the set of the angular sectors having minimum distance measurements beyond the threshold, such as by identifying an intervening waypoint or another position along a bearing associated with the set and calculating a trajectory for traveling to or through the waypoint or the other position. Where two or more of such sets of angular sectors are identified, one of the sets may be identified or selected in any manner or on any basis. For example, a set of sectors having a greatest minimum distance, or a set defining a widest angle, may be identified and selected.

If no sets of angular sectors having minimum distance measurements in excess of the threshold are identified, however, then the process advances to box 750, where whether the threshold is at a minimum value is determined. For example, in some implementations, a minimum distance required for the aerial vehicle to brake or otherwise decelerate, or turn to a direction associated with a predetermined bearing, may be identified, and set as a minimum value of the threshold.

If the threshold is at the minimum value of the threshold, then the process advances to box 755, where the aerial vehicle decelerates in a direction associated opposite the flight path of the aerial vehicle. For example, upon failing to identify any sets of angular sectors having minimum distance measurements in excess of the threshold, the aerial vehicle may be configured to turn to or travel toward a default bearing or position, e.g., opposite the flight path of the aerial vehicle, such as by executing one or more braking maneuvers.

If the threshold is not at the minimum value of the threshold, however, then the process advances to box 760, where the aerial vehicle decreases (or decrements) the threshold, before returning to box 740, where whether a set of angular sectors having minimum distance measurements in excess of a threshold has been identified is determined. For example, in some implementations, upon determining that an object is present within a flight path of the aerial vehicle, the aerial vehicle may be programmed or configured to determine whether any sets of adjacent angular sectors having minimum distance measurements beyond a first threshold, e.g., a comparatively larger threshold, such as thirty centimeters (30 cm). In the event that no such sets are identified, the aerial vehicle may be configured to decrease or decrement the first threshold, e.g., by a predetermined amount, such as five centimeters (5 cm) or ten centimeters (10 cm), to a second threshold. Subsequently, whether any sets of adjacent angular sectors having minimum distance measurements beyond the second threshold may be determined and, in the event that no such sets are identified, the second threshold may be further decreased or decremented until the minimum value is reached.

In some implementations, reflections of light captured by a range sensor may be determined and clustered based on their respective ranges and angles from positions of the aerial vehicle. A position of an object may be determined based on the clusters, with respect to their positions according to any local or global coordinate system. Where distance measurements are determined based on returns captured by a LIDAR sensor having a field of view that rotates relative to the aerial vehicle, clusters of returns that are detected in one pass or sweep of the LIDAR sensor may be compared to clusters of returns that are detected in subsequent passes or sweeps of the LIDAR sensor. Where the clusters are substantially similar, the clusters may be identified as representing a common object. Conversely, where a single return or a cluster of fewer than a predetermined number of returns detected in one pass or sweep of the LIDAR sensor is not detected in a subsequent pass or sweep of the LIDAR sensor, the return or returns may be disregarded as corresponding to a "phantom" object.

In some implementations, a fast-clustering algorithm may be utilized to cluster data, such as LIDAR data, which may include one or more returns or distance measurements. For example, a sensor may be characterized as performing scans comprising a transmission of plurality of beams of light, e.g., approximately 430 beams, any of which may produce a return from one or more objects. A system may determine, for each beam or return, a distance measurement and an angle associated with the beam or return. In accordance with one or more preferred implementations, a clustering algorithm may determine, for each beam or return, a distance difference (or distance delta) representing an absolute value of a difference between a distance measurement for that beam or return and a distance measurement for the immediately preceding beam or return, and an angle difference (or angle delta) representing an absolute value of a difference between an angle associated with that beam or return and an angle associated with the immediately previous beam or return. The clustering algorithm compares the determined distance difference to a first distance threshold and compares the determined angle difference to a second angle threshold. If each of the distance difference and the angle difference is below (e.g., is less than or equal to) a corresponding threshold, the beam or return is assigned to the same cluster as the immediately previous beam or return. Otherwise, if either of the distance difference or the angle difference is not below (e.g., is greater than or equal to) a corresponding threshold, a new cluster is started, and the beam or return is assigned to the new cluster.

In accordance with one or more preferred implementations, an algorithm is utilized to determine that a cluster for a current scan corresponds to a cluster from a previous scan (e.g., to track or monitor an object that the cluster represents). In accordance with one or more preferred implementations, an algorithm operates, for one or more clusters in a scan (e.g., in a brute force approach, on each cluster in a scan), to compare the one or more clusters to stored clusters from previous scans (e.g., in a brute force approach, on each stored cluster from one or more previous scans).

In accordance with one or more preferred implementations, for each cluster, a center distance is determined representing a distance from an aerial vehicle or a sensor (e.g., a LIDAR sensors) to a center of a cluster. In accordance with one or more preferred implementations, for each cluster, a center angle is determined representing an angle from an aerial vehicle or sensor to a center of a cluster. In accordance with one or more preferred implementations, an algorithm compares a respective current cluster in a scan and a respective previous cluster of a previous scan by determining a center distance difference (or center distance delta) representing an absolute value of a difference between a center distance for the respective current cluster and a center distance for the respective previous cluster, and a center angle difference (or center angle delta) representing an absolute value of a difference between a center angle for the respective current cluster and a center angle for the respective previous cluster. The center distance difference is compared to a center distance threshold and the center angle difference is compared to a center angle threshold. If each of a center distance difference and a center angle difference is below (e.g., is less than or equal to) a corresponding threshold, a respective current cluster is determined to be the "same" cluster as a respective previous cluster, and one or more records may be updated to indicate that the respective current cluster is the respective previous cluster.

In accordance with one or more preferred implementations, determining whether a cluster for a current scan corresponds to a cluster from a previous scan may also consider a comparison of shapes of each of the clusters.

In accordance with one or more preferred implementations, a distance variance value for each cluster is determined (e.g., as a greatest difference, a total difference, or an average distance between two or more distance measurements in a cluster). In accordance with one or more preferred implementations, an angular sweep or field of view for each cluster is determined (e.g., a difference between a maximum angle for a distance measurement in the cluster and a minimum angle for a distance measurement in the cluster). In accordance with one or more preferred implementations, a scale value for a respective current cluster in a scan as compared to a respective previous cluster of a previous scan is determined by dividing a center distance for the respective current cluster by a center distance for the respective previous cluster.

In accordance with one or more preferred implementations, a shape comparison algorithm compares a respective current cluster in a scan and a respective previous cluster of a previous scan by determining a distance variance difference (or distance variance delta) representing an absolute value of a difference between a distance variance value for the respective current cluster and a distance variance value for the respective previous cluster, and a field of view difference (or field of view delta) representing an absolute value of a difference between an angular sweep or field of view for the respective current cluster multiplied by a determined scale value for the respective current cluster as compared to the respective previous cluster, and an angular sweep or field of view for the respective previous cluster. If each of these difference values is below (e.g., is less than or equal to) a corresponding threshold, the respective current cluster and the respective previous cluster are determined to have the same shape.

In accordance with one or more preferred implementations, an algorithm compares a respective current cluster in a scan and a respective previous cluster of a previous scan by determining a center distance difference (or a center distance delta) representing an absolute value of a difference between a center distance for the respective current cluster and a center distance for the respective previous cluster, a center angle difference (or a center angle delta) representing an absolute value of a difference between a center angle for the respective current cluster and a center angle for the respective previous cluster, and determines whether the respective current cluster and the respective previous cluster have the same shape. The center distance difference is compared to a center distance threshold and the center angle difference is compared to a center angle threshold. If each of these difference values is below (e.g., is than or equal to) a corresponding threshold and the clusters are determined to have the same shape, a respective current cluster is determined to be the "same" cluster as a respective previous cluster, and one or more records may be updated to indicate that the respective current cluster is the respective previous cluster.

In accordance with one or more preferred implementations of a clustering algorithm, one or more data structures are utilized to reduce time complexity, e.g., using a K-dimensional tree approach.

The contents of U.S. patent application Ser. Nos. 16/584,721 and 17/029,688, and International Patent Application No. PCT/US2020/052268, are incorporated by reference herein in their entireties.

Although some embodiments of the present disclosure show the use of unmanned aerial vehicles in support of one or more applications or functions at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function. Likewise, the systems and methods of the present disclosure may be utilized in connection with any aerial vehicle, including aerial vehicles that are manned or unmanned during operations.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 5 or 7, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   one or more sensors, wherein the one or more sensors include a LIDAR sensor;
   a plurality of propulsion motors, wherein each of the propulsion motors is configured to rotate a propeller at one or more rotational speeds;
   one or more processors; and
   one or more computer-readable media having computer-executable instructions stored on the one or more computer-readable media,
   wherein the instructions, when executed by the one or more processors, cause the unmanned aerial vehicle to perform operations comprising:
      detecting, based on sensor data generated by the one or more sensors, an object in a flight path of the unmanned aerial vehicle;
      receiving, from the LIDAR sensor, data comprising a plurality of distance measurements, wherein each of the distance measurements is associated with an angle about a sensor axis, and wherein the sensor axis is parallel to a yaw axis of the unmanned aerial vehicle;
      determining, based at least in part on the LIDAR data, a plurality of LIDAR bins, wherein each of the plurality of LIDAR bins is associated with one of a plurality of angular sectors, and wherein each of the plurality of LIDAR bins comprises a set of the distance measurements associated with angles about the sensor axis within one of the plurality of angular sectors;

determining, for each of the plurality of angular sectors, a minimum distance measurement of the set of the distance measurements within that one of the plurality of angular sectors;

defining a first set of the plurality of angular sectors, wherein each of the angular sectors of the first set is adjacent to another of the angular sectors of the first set, and wherein each of the angular sectors of the first set has a minimum distance measurement greater than a threshold; and causing the unmanned aerial vehicle to decelerate in a direction associated with the first set of the plurality of angular sectors.

2. The unmanned aerial vehicle of claim 1, wherein the first set of the plurality of angular sectors subtends an angle, and wherein the direction bisects the angle subtended by the first set of the plurality of angular sectors.

3. The unmanned aerial vehicle of claim 1, wherein the operations further comprise:

determining a first position in a first coordinate system based at least in part on the angular sectors of the first set, wherein the direction is associated with the first position.

4. A method comprising:

detecting an object in a flight path of an aerial vehicle, wherein the object is detected by at least one processor provided aboard the aerial vehicle based at least in part on sensor data generated by at least one of a plurality of sensors provided aboard the aerial vehicle;

determining a first set of distance measurements around the aerial vehicle, wherein each of the first set of distance measurements is determined by the at least one processor based at least in part on data generated by at least one of the plurality of sensors;

defining a plurality of sectors around at least a portion of the aerial vehicle, wherein each of the plurality of sectors includes at least one of the first set of distance measurements;

determining that a first distance measurement of a first sector of the plurality of sectors satisfies a first threshold;

determining that a second distance measurement of a second sector of the plurality of sectors satisfies the first threshold, wherein the second sector is adjacent to the first sector;

defining a first set of sectors, wherein the first set of sectors comprises the first sector and the second sector; and causing the aerial vehicle to decelerate in a direction associated with the first set of sectors.

5. The method of claim 4, wherein at least one of the plurality of sensors is a LIDAR sensor having a field of view that is configured to rotate about a sensor axis, wherein the sensor axis is parallel to a yaw axis of the aerial vehicle, and wherein each of the first set of distance measurements is determined based at least in part on data generated by the LIDAR sensor.

6. The method of claim 5, further comprising:

determining, based at least in part on the data generated by the LIDAR sensor, a plurality of LIDAR bins, wherein each of the plurality of LIDAR bins comprises at least some of the first set of distance measurements within one of the plurality of sectors.

7. The method of claim 4, wherein each of the plurality of sectors subtends an angle of approximately five degrees.

8. The method of claim 4, wherein the portion of the aerial vehicle defines an angle of approximately one hundred twenty degrees, and wherein the angle is bisected by an axis opposite the flight path of the aerial vehicle.

9. The method of claim 4, wherein the first set of sectors further comprises a third sector of the plurality of sectors, and wherein a third distance measurement of the third sector satisfies the first threshold.

10. The method of claim 4, further comprising:

determining, for each of the plurality of sectors, a minimum distance measurement of the first set of distance measurements within respective ones of the plurality of sectors, wherein the first distance measurement is the minimum distance measurement of the first sector, and wherein the second distance measurement is the minimum distance measurement of the second sector.

11. The method of claim 4, further comprising:

determining that a third distance measurement of a third sector of the plurality of sectors satisfies the first threshold;

determining that a fourth distance measurement of a fourth sector of the plurality of sectors satisfies the first threshold, wherein the fourth sector is adjacent to the third sector; and defining a second set of sectors, wherein the second set of sectors comprises the first sector and the second sector.

12. The method of claim 11, further comprising:

determining that a first angle defined by sectors of the first set is greater than a second angle defined by sectors of the second set, wherein the aerial vehicle is caused to decelerate in the direction associated with the first set of sectors in response to determining that the first angle is greater than the second angle.

13. The method of claim 11, further comprising:

determining a first number of distance measurements of the sectors of the first set, wherein each of the first number of distance measurements satisfies the first threshold;

determining a second number of distance measurements of the sectors of the second set, wherein each of the second number of distance measurements satisfies the first threshold; and determining that the first number is greater than the second number, wherein the aerial vehicle is caused to decelerate in the direction associated with the first set of sectors in response to determining that the first number is greater than the second number.

14. The method of claim 11, further comprising:

determining a first number of sectors of the first set, wherein each of the sectors of the first set has at least one distance measurement that satisfies the first threshold;

determining a second number of sectors of the second set, wherein each of the sectors of the second set has at least one distance measurement that satisfies the first threshold; and determining that the first number is greater than the second number, wherein the aerial vehicle is caused to decelerate in the direction associated with the first set of sectors in response to determining that the first number is greater than the second number.

15. The method of claim 4, further comprising:

determining a first position in a first coordinate system associated with at least one of the first sector or the second sector, wherein the direction is associated with the first position.

16. The method of claim 15, wherein causing the aerial vehicle to decelerate in the direction associated with the first set of sectors comprises:

providing at least the first position to a control system of the aerial vehicle.

17. The method of claim 4, further comprising:

determining a first angle associated with at least one of the first sector or the second sector, wherein the direction is associated with the first angle.

18. The method of claim 17, wherein the first set of sectors comprises a plurality of sectors, wherein one of the first sector or the second sector is a center sector of the plurality of sectors, and wherein the first angle is an angle to the center sector of the plurality of sectors.

19. The method of claim 17, further comprising:

selecting the first distance measurement based on a position of the first distance measurement relative to other distance measurements of sectors of the first set, wherein the first angle is associated with the first distance measurement.

20. An unmanned aerial vehicle comprising:

a first range sensor, wherein the first range sensor is a LIDAR sensor;

a second range sensor;

a plurality of propulsion motors, wherein each of the propulsion motors is configured to rotate a propeller at one or more rotational speeds;

one or more processors; and one or more computer-readable media having computer-executable instructions stored on the one or more computer-readable media, wherein the instructions, when executed by the one or more processors, cause the unmanned aerial vehicle to perform operations comprising:

detecting, based on first sensor data generated by one of the first range sensor or the second range sensor, an obstacle in a flight path of the unmanned aerial vehicle, determining, based on second sensor data generated by the first range sensor, a plurality of distance measurements around the unmanned aerial vehicle, defining a first sector corresponding to a first set of the plurality of distance measurements, wherein the first set of the plurality of distance measurements comprises a first distance measurement and a second distance measurement; and determining that at least one of the first distance measurement or the second distance measurement does not satisfy a first threshold, in response to determining that the first magnitude value associated with the first connected area does not satisfy the first threshold, defining a second sector corresponding to a second set of the plurality of distance measurements, wherein the second set of the plurality of distance measurements comprises a third distance measurement and a fourth distance measurement; and determining that each of the third distance measurement and the fourth distance measurement is greater than a second threshold; and in response to determining that each of the third distance measurement and the fourth distance measurement is greater than the second threshold, causing the unmanned aerial vehicle to decelerate in a direction of the second sector.

* * * * *